United States Patent
Eberle et al.

(10) Patent No.: US 6,940,953 B1
(45) Date of Patent: Sep. 6, 2005

(54) SYSTEM AND METHOD FOR THE CREATION AND AUTOMATIC DEPLOYMENT OF PERSONALIZED, DYNAMIC AND INTERACTIVE VOICE SERVICES INCLUDING MODULE FOR GENERATING AND FORMATTING VOICE SERVICES

(75) Inventors: Hannes Eberle, Arlington, VA (US); Christopher S. Leon, Washington, DC (US); Bodo Maass, Arlington, VA (US); Anurag Patnaik, Arlington, VA (US); Alberto Santa Ana, Falls Church, VA (US); Michael Zirngibl, Washington, DC (US)

(73) Assignee: MicroStrategy, Inc., McLean, VA (US)

( * ) Notice: Subject to any disclaimer, the term of this patent is extended or adjusted under 35 U.S.C. 154(b) by 44 days.

(21) Appl. No.: 09/661,188

(22) Filed: Sep. 13, 2000

Related U.S. Application Data
(60) Provisional application No. 60/153,222, filed on Sep. 13, 1999.

(51) Int. Cl.$^7$ .......................... H04M 11/00; H04M 1/64; G10L 13/08
(52) U.S. Cl. ............................... 379/88.13; 379/88.17; 704/260
(58) Field of Search .......................... 379/88.13–88.17, 379/88.11; 704/260, 270, 246; 709/200, 201; 345/752

(56) References Cited

U.S. PATENT DOCUMENTS

| | | | |
|---|---|---|---|
| 4,156,868 A | 5/1979 | Levinson | |
| 4,554,418 A | 11/1985 | Toy | |
| 4,757,525 A | 7/1988 | Matthews et al. | |
| 4,775,936 A | 10/1988 | Jung | |

(Continued)

FOREIGN PATENT DOCUMENTS

| | | |
|---|---|---|
| EP | 0878948 | 11/1998 |
| EP | 0889627 | 1/1999 |

OTHER PUBLICATIONS

"United EasyUpdate", United Airlines, printed from http://www.ual.com/page/article/0.1360.1974.00.html, printed Nov. 30, 2002, 4 pages.

General Magic, Inc. website, printed from http://www.genmagic.com, printed Nov. 30, 2002, 16 pages.

(Continued)

*Primary Examiner*—Fan Tsang
*Assistant Examiner*—Joseph T. Phan
(74) *Attorney, Agent, or Firm*—Pillsbury Winthrop Shaw Pittman, LLP

(57) ABSTRACT

A method and system for generating TML (an XML based language) and formatting reports is disclosed. The method and system of the present invention operate in conjunction with an interactive voice broadcasting system and are used to develop active voice pages—TML documents that are to used generate dynamic voice menus that drive the interaction between a user and an interactive voice broadcasting system.

16 Claims, 16 Drawing Sheets

U.S. PATENT DOCUMENTS

| | | | |
|---|---|---|---|
| 4,785,408 A | 11/1988 | Britton et al. |
| 4,788,643 A | 11/1988 | Trippe et al. |
| 4,811,379 A | 3/1989 | Grandfield |
| 4,812,843 A | 3/1989 | Champion, III et al. |
| 4,837,798 A | 6/1989 | Cohen et al. |
| 4,868,866 A | 9/1989 | Williams, Jr. |
| 4,931,932 A | 6/1990 | Dalnekoff et al. |
| 4,941,168 A | 7/1990 | Kelly, Jr. |
| 4,942,616 A | 7/1990 | Linstroth et al. |
| 4,953,085 A | 8/1990 | Atkins |
| 4,972,504 A | 11/1990 | Daniel, Jr. et al. |
| 4,974,252 A | 11/1990 | Osborne |
| 4,989,141 A | 1/1991 | Lyons et al. |
| 5,021,953 A | 6/1991 | Webber et al. |
| 5,101,352 A | 3/1992 | Rembert |
| 5,128,861 A | 7/1992 | Kagami et al. |
| 5,131,020 A | 7/1992 | Liebesny et al. |
| 5,168,445 A | 12/1992 | Kawashima et al. |
| 5,187,735 A | 2/1993 | Herrero Garcia et al. |
| 5,189,608 A | 2/1993 | Lyons et al. |
| 5,195,086 A | 3/1993 | Baumgartner et al. |
| 5,204,821 A | 4/1993 | Inui et al. |
| 5,214,689 A | 5/1993 | O'Sullivan |
| 5,235,680 A | 8/1993 | Bijnagte |
| 5,237,499 A | 8/1993 | Garback |
| 5,255,184 A | 10/1993 | Hornick et al. |
| 5,270,922 A | 12/1993 | Higgins |
| 5,323,452 A | 6/1994 | Dickman et al. |
| 5,347,632 A | 9/1994 | Filepp et al. |
| 5,371,787 A | 12/1994 | Hamilton |
| 5,404,400 A | 4/1995 | Hamilton |
| 5,406,626 A | 4/1995 | Ryan |
| 5,444,768 A | 8/1995 | Lemaire et al. |
| 5,452,341 A | 9/1995 | Sattar |
| 5,457,904 A | 10/1995 | Colvin |
| 5,479,491 A | 12/1995 | Herrero Garcia et al. |
| 5,493,606 A | 2/1996 | Osder et al. |
| 5,500,793 A | 3/1996 | Deming, Jr. et al. |
| 5,502,637 A | 3/1996 | Beaulieu et al. |
| 5,524,051 A | 6/1996 | Ryan |
| 5,539,808 A | 7/1996 | Inniss et al. |
| 5,555,403 A | 9/1996 | Cambot et al. |
| 5,572,643 A | 11/1996 | Judson |
| 5,572,644 A | 11/1996 | Liaw et al. |
| 5,576,951 A | 11/1996 | Lockwood |
| 5,577,165 A | 11/1996 | Takebayashi et al. |
| 5,590,181 A | 12/1996 | Hogan et al. |
| 5,604,528 A | 2/1997 | Edwards et al. |
| 5,630,060 A | 5/1997 | Tang et al. |
| 5,638,424 A | 6/1997 | Denio et al. |
| 5,638,425 A | 6/1997 | Meador, III et al. |
| 5,664,115 A | 9/1997 | Fraser |
| 5,684,992 A | 11/1997 | Abrams et al. |
| 5,689,650 A | 11/1997 | McClelland et al. |
| 5,692,181 A | 11/1997 | Anand et al. |
| 5,701,451 A | 12/1997 | Rogers et al. |
| 5,706,442 A | 1/1998 | Anderson et al. |
| 5,710,889 A | 1/1998 | Clark et al. |
| 5,712,901 A | 1/1998 | Meermans |
| 5,715,370 A | 2/1998 | Luther et al. |
| 5,717,923 A | 2/1998 | Dedrick |
| 5,721,827 A | 2/1998 | Logan et al. |
| 5,724,410 A | 3/1998 | Parvulescu et al. |
| 5,724,525 A | 3/1998 | Beyers, II et al. |
| 5,732,216 A | 3/1998 | Logan et al. |
| 5,732,398 A | 3/1998 | Tagawa |
| 5,737,393 A | 4/1998 | Wolf |
| 5,740,429 A | 4/1998 | Wang et al. |
| 5,740,829 A | 4/1998 | Jacobs et al. |
| 5,742,775 A | 4/1998 | King |
| 5,748,959 A | 5/1998 | Reynolds |
| 5,751,790 A | 5/1998 | Makihata |
| 5,751,806 A | 5/1998 | Ryan |
| 5,754,858 A | 5/1998 | Broman et al. |
| 5,754,939 A | 5/1998 | Herz et al. |
| 5,757,644 A | 5/1998 | Jorgensen et al. |
| 5,758,088 A | 5/1998 | Bezaire et al. |
| 5,758,351 A | 5/1998 | Gibson et al. |
| 5,761,432 A | 6/1998 | Bergholm et al. |
| 5,764,736 A | 6/1998 | Shachar et al. |
| 5,765,028 A | 6/1998 | Gladden |
| 5,771,172 A | 6/1998 | Yamamoto et al. |
| 5,771,276 A | 6/1998 | Wolf |
| 5,781,735 A | 7/1998 | Southard |
| 5,781,886 A | 7/1998 | Tsujiuchi |
| 5,787,151 A | 7/1998 | Nakatsu et al. |
| 5,787,278 A | 7/1998 | Barton et al. |
| H1743 H | 8/1998 | Graves et al. |
| 5,790,936 A | 8/1998 | Dinkins |
| 5,793,980 A | 8/1998 | Glaser et al. |
| 5,794,246 A | 8/1998 | Sankaran et al. |
| 5,797,124 A | 8/1998 | Walsh et al. |
| 5,799,063 A | 8/1998 | Krane |
| 5,799,156 A | 8/1998 | Hogan et al. |
| 5,802,488 A | 9/1998 | Edatsune |
| 5,802,526 A | 9/1998 | Fawcett et al. |
| 5,806,050 A | 9/1998 | Shinn et al. |
| 5,809,415 A | 9/1998 | Rossmann |
| 5,809,483 A | 9/1998 | Broka et al. |
| 5,812,987 A | 9/1998 | Luskin et al. |
| 5,819,220 A | 10/1998 | Sarukkai et al. |
| 5,819,293 A | 10/1998 | Comer et al. |
| 5,822,405 A | 10/1998 | Astarabadi |
| 5,825,856 A | 10/1998 | Porter et al. |
| 5,832,451 A | 11/1998 | Flake et al. |
| 5,838,252 A | 11/1998 | Kikinis |
| 5,838,768 A | 11/1998 | Sumar et al. |
| 5,848,397 A | 12/1998 | Marsh et al. |
| 5,850,433 A | 12/1998 | Rondeau |
| 5,852,811 A | 12/1998 | Atkins |
| 5,852,819 A | 12/1998 | Beller |
| 5,854,746 A | 12/1998 | Yamamoto et al. |
| 5,857,191 A | 1/1999 | Blackwell, Jr. et al. |
| 5,864,605 A | 1/1999 | Keshav |
| 5,864,827 A | 1/1999 | Wilson |
| 5,864,828 A | 1/1999 | Atkins |
| 5,867,153 A | 2/1999 | Grandcolas et al. |
| 5,870,454 A | 2/1999 | Dahlen |
| 5,870,724 A | 2/1999 | Lawlor et al. |
| 5,870,746 A | 2/1999 | Knutson et al. |
| 5,872,921 A | 2/1999 | Zahariev et al. |
| 5,872,926 A | 2/1999 | Levac et al. |
| 5,878,403 A | 3/1999 | DeFrancesco et al. |
| 5,880,726 A | 3/1999 | Takiguchi et al. |
| 5,884,262 A | 3/1999 | Wise et al. |
| 5,884,266 A | 3/1999 | Dvorak |
| 5,884,285 A | 3/1999 | Atkins |
| 5,884,312 A | 3/1999 | Dustan et al. |
| 5,890,140 A | 3/1999 | Clark et al. |
| 5,893,079 A | 4/1999 | Cwenar |
| 5,893,905 A | 4/1999 | Main et al. |
| 5,907,598 A | 5/1999 | Mandalia et al. |
| 5,907,837 A | 5/1999 | Ferrel et al. |
| 5,911,135 A | 6/1999 | Atkins |
| 5,911,136 A | 6/1999 | Atkins |
| 5,913,195 A | 6/1999 | Weeren et al. |
| 5,913,202 A | 6/1999 | Motoyama |
| 5,914,878 A | 6/1999 | Yamamoto et al. |
| 5,915,001 A * | 6/1999 | Uppaluru ................ 379/88.17 |
| 5,915,238 A | 6/1999 | Tjaden |
| 5,918,213 A | 6/1999 | Bernard et al. |

| | | | | | |
|---|---|---|---|---|---|
| 5,918,217 A | 6/1999 | Maggioncalda et al. | 6,078,924 A | 6/2000 | Ainsbury et al. |
| 5,918,225 A | 6/1999 | White et al. | 6,078,994 A | 6/2000 | Carey |
| 5,918,232 A | 6/1999 | Pouschine et al. | 6,081,815 A | 6/2000 | Spitznagel et al. |
| 5,920,848 A | 7/1999 | Schutzer et al. | 6,094,651 A | 7/2000 | Agrawal et al. |
| 5,923,736 A | 7/1999 | Shachar | 6,094,655 A | 7/2000 | Rogers et al. |
| 5,924,068 A | 7/1999 | Richard et al. | 6,101,241 A | 8/2000 | Boyce et al. |
| 5,926,789 A | 7/1999 | Barbara et al. | 6,101,443 A | 8/2000 | Kato et al. |
| 5,931,900 A | 8/1999 | Notani et al. | 6,101,473 A | 8/2000 | Scott et al. |
| 5,931,908 A | 8/1999 | Gerba et al. | 6,108,686 A | 8/2000 | Williams, Jr. |
| 5,933,816 A | 8/1999 | Zeanah et al. | 6,115,686 A | 9/2000 | Chung et al. |
| 5,940,818 A | 8/1999 | Malloy et al. | 6,115,693 A | 9/2000 | McDonough et al. |
| 5,943,395 A | 8/1999 | Hansen | 6,119,095 A | 9/2000 | Morita |
| 5,943,399 A | 8/1999 | Bannister et al. | 6,122,628 A | 9/2000 | Castelli et al. |
| 5,943,410 A | 8/1999 | Shaffer et al. | 6,122,636 A | 9/2000 | Malloy et al. |
| 5,943,677 A | 8/1999 | Hicks | 6,125,376 A | 9/2000 | Klarlund et al. |
| 5,945,989 A | 8/1999 | Freishtat et al. | 6,131,184 A | 10/2000 | Weeren et al. |
| 5,946,485 A | 8/1999 | Weeren et al. | 6,134,563 A | 10/2000 | Clancey et al. |
| 5,946,666 A | 8/1999 | Nevo et al. | 6,144,848 A | 11/2000 | Walsh et al. |
| 5,946,711 A | 8/1999 | Donnelly | 6,151,582 A | 11/2000 | Huang et al. |
| 5,948,040 A | 9/1999 | DeLorme et al. | 6,151,601 A | 11/2000 | Papierniak et al. |
| 5,950,165 A | 9/1999 | Shaffer et al. | 6,154,527 A | 11/2000 | Porter et al. |
| 5,953,392 A * | 9/1999 | Rhie et al. ............ 379/88.13 | 6,154,766 A * | 11/2000 | Yost et al. ............ 707/100 |
| 5,953,406 A | 9/1999 | LaRue et al. | 6,157,705 A | 12/2000 | Perrone |
| 5,956,693 A | 9/1999 | Geerlings | 6,163,774 A | 12/2000 | Lore et al. |
| 5,960,437 A | 9/1999 | Krawchuk et al. | 6,167,379 A | 12/2000 | Dean et al. |
| 5,963,641 A | 10/1999 | Crandall et al. | 6,167,383 A | 12/2000 | Henson |
| 5,970,122 A | 10/1999 | LaPorta et al. | 6,173,266 B1 | 1/2001 | Marx et al. |
| 5,970,124 A | 10/1999 | Csaszar et al. | 6,173,310 B1 | 1/2001 | Yost et al. |
| 5,974,398 A | 10/1999 | Hanson et al. | 6,173,316 B1 * | 1/2001 | De Boor et al. ......... 709/218 |
| 5,974,406 A | 10/1999 | Bisdikian et al. | 6,178,446 B1 | 1/2001 | Gerszberg et al. |
| 5,974,441 A * | 10/1999 | Rogers et al. ............ 709/200 | 6,181,935 B1 | 1/2001 | Gossman et al. |
| 5,978,766 A | 11/1999 | Luciw | 6,182,052 B1 | 1/2001 | Fulton et al. |
| 5,978,796 A | 11/1999 | Malloy et al. | 6,182,053 B1 | 1/2001 | Rauber et al. |
| 5,983,184 A | 11/1999 | Noguchi | 6,182,153 B1 | 1/2001 | Hollberg et al. |
| 5,987,586 A | 11/1999 | Byers | 6,185,558 B1 | 2/2001 | Bowman et al. |
| 5,991,365 A | 11/1999 | Pizano et al. | 6,189,008 B1 | 2/2001 | Easty et al. |
| 5,995,945 A | 11/1999 | Notani et al. | 6,199,082 B1 | 3/2001 | Ferrel et al. |
| 5,996,006 A | 11/1999 | Speicher | 6,201,948 B1 | 3/2001 | Cook et al. |
| 5,999,526 A | 12/1999 | Garland et al. | 6,203,192 B1 | 3/2001 | Fortman |
| 6,003,009 A | 12/1999 | Nishimura | 6,209,026 B1 | 3/2001 | Ran et al. |
| 6,006,225 A | 12/1999 | Bowman et al. | 6,215,858 B1 | 4/2001 | Bartholomew et al. |
| 6,009,383 A | 12/1999 | Mony | 6,219,643 B1 | 4/2001 | Cohen et al. |
| 6,011,579 A | 1/2000 | Newlin ............ 348/15 | 6,223,983 B1 | 5/2001 | Kjonaas et al. |
| 6,011,844 A | 1/2000 | Uppaluru et al. | 6,233,609 B1 | 5/2001 | Mittal |
| 6,012,045 A | 1/2000 | Barzilai et al. | 6,236,977 B1 | 5/2001 | Verba et al. |
| 6,012,066 A | 1/2000 | Discount et al. | 6,240,391 B1 | 5/2001 | Ball et al. |
| 6,012,083 A | 1/2000 | Savitzky et al. | 6,243,092 B1 | 6/2001 | Okita et al. |
| 6,014,427 A | 1/2000 | Hanson et al. | 6,243,445 B1 | 6/2001 | Begeja et al. ............ 379/93.01 |
| 6,014,428 A | 1/2000 | Wolf | 6,246,672 B1 | 6/2001 | Lumelsky |
| 6,014,429 A | 1/2000 | LaPorta et al. | 6,246,981 B1 | 6/2001 | Papineni et al. |
| 6,016,335 A | 1/2000 | Lacy et al. | 6,253,146 B1 | 6/2001 | Hanson et al. |
| 6,016,336 A | 1/2000 | Hanson | 6,256,659 B1 | 7/2001 | McLain, Jr. et al. |
| 6,016,478 A | 1/2000 | Zhang et al. | 6,260,050 B1 | 7/2001 | Yost et al. |
| 6,018,710 A * | 1/2000 | Wynblatt et al. ......... 704/260 | 6,263,051 B1 | 7/2001 | Saylor et al. |
| 6,018,715 A | 1/2000 | Lynch et al. | 6,269,336 B1 * | 7/2001 | Ladd et al. ............ 379/88.22 |
| 6,021,181 A | 2/2000 | Miner et al. | 6,269,393 B1 | 7/2001 | Yost et al. |
| 6,021,397 A | 2/2000 | Jones et al. | 6,275,746 B1 | 8/2001 | Leatherman et al. |
| 6,023,714 A | 2/2000 | Hill et al. | 6,279,033 B1 | 8/2001 | Selvarajan et al. |
| 6,026,087 A | 2/2000 | Mirashrafi et al. | 6,279,038 B1 | 8/2001 | Hogan et al. |
| 6,029,195 A | 2/2000 | Herz | 6,286,030 B1 | 9/2001 | Wenig et al. |
| 6,031,836 A * | 2/2000 | Haserodt ............ 370/389 | 6,289,352 B1 | 9/2001 | Proctor |
| 6,038,561 A | 3/2000 | Snyder et al. | 6,292,811 B1 | 9/2001 | Clancey et al. |
| 6,044,134 A | 3/2000 | De La Huerga | 6,301,590 B1 | 10/2001 | Siow et al. |
| 6,047,327 A | 4/2000 | Tso et al. | 6,304,850 B1 | 10/2001 | Keller et al. |
| 6,055,513 A | 4/2000 | Katz et al. | 6,313,734 B1 | 11/2001 | Weiss et al. |
| 6,055,514 A | 4/2000 | Wren | 6,314,094 B1 | 11/2001 | Boys |
| 6,058,166 A | 5/2000 | Osder et al. | 6,314,402 B1 | 11/2001 | Monaco et al. |
| 6,061,433 A | 5/2000 | Polcyn et al. | 6,314,533 B1 | 11/2001 | Novik et al. |
| 6,064,980 A | 5/2000 | Jacobi et al. | 6,317,750 B1 | 11/2001 | Tortolani et al. |
| 6,067,348 A | 5/2000 | Hibbeler | 6,321,190 B1 | 11/2001 | Bernardes et al. |
| 6,067,535 A | 5/2000 | Hobson et al. | 6,321,198 B1 | 11/2001 | Hank et al. |

| | | | |
|---|---|---|---|
| 6,321,221 B1 | 11/2001 | Bieganski | |
| 6,327,343 B1 | 12/2001 | Epstein et al. | |
| 6,336,124 B1 | 1/2002 | Alam et al. | |
| 6,341,271 B1 | 1/2002 | Salvo et al. | |
| 6,360,139 B1 | 3/2002 | Jacobs | |
| 6,363,393 B1 | 3/2002 | Ribitzky | |
| 6,366,298 B1 | 4/2002 | Haitsuka et al. | |
| 6,385,191 B1 | 5/2002 | Coffman et al. | |
| 6,385,301 B1 | 5/2002 | Nolting et al. | |
| 6,385,583 B1 | 5/2002 | Ladd et al. | 704/270 |
| 6,389,398 B1 | 5/2002 | Lustgarten et al. | |
| 6,397,387 B1 | 5/2002 | Rosin et al. | |
| 6,400,804 B1 | 6/2002 | Bilder | |
| 6,404,858 B1 | 6/2002 | Farris et al. | 379/88.02 |
| 6,404,877 B1 | 6/2002 | Bolduc et al. | |
| 6,405,171 B1 | 6/2002 | Kelley | |
| 6,411,685 B1 * | 6/2002 | O'Neal | 379/88.14 |
| 6,412,012 B1 | 6/2002 | Bieganski et al. | |
| 6,434,524 B1 | 8/2002 | Weber | |
| 6,438,217 B1 | 8/2002 | Huna | |
| 6,442,560 B1 | 8/2002 | Berger et al. | |
| 6,442,598 B1 | 8/2002 | Wright et al. | |
| 6,456,699 B1 * | 9/2002 | Burg et al. | 379/88.17 |
| 6,456,974 B1 | 9/2002 | Baker et al. | |
| 6,459,774 B1 | 10/2002 | Ball et al. | |
| 6,466,654 B1 | 10/2002 | Cooper et al. | |
| 6,473,612 B1 | 10/2002 | Cox et al. | |
| 6,477,549 B1 | 11/2002 | Hishida et al. | |
| 6,480,842 B1 | 11/2002 | Agassi et al. | |
| 6,482,156 B2 | 11/2002 | Iliff | |
| 6,487,277 B2 | 11/2002 | Beyda et al. | |
| 6,487,533 B2 | 11/2002 | Hyde-Thomson et al. | |
| 6,490,564 B1 | 12/2002 | Dodrill et al. | |
| 6,490,593 B2 | 12/2002 | Proctor | |
| 6,493,685 B1 * | 12/2002 | Ensel et al. | 705/40 |
| 6,496,568 B1 | 12/2002 | Nelson | |
| 6,501,832 B1 * | 12/2002 | Saylor et al. | 379/88.04 |
| 6,507,817 B1 * | 1/2003 | Wolfe et al. | 704/260 |
| 6,513,019 B2 | 1/2003 | Lewis | |
| 6,539,359 B1 | 3/2003 | Ladd et al. | |
| 6,549,612 B2 * | 4/2003 | Gifford et al. | 379/67.1 |
| 6,567,796 B1 | 5/2003 | Yost et al. | |
| 6,578,000 B1 * | 6/2003 | Dodrill et al. | 704/270 |
| 6,587,547 B1 | 7/2003 | Zirngibl et al. | |
| 6,594,682 B2 | 7/2003 | Peterson et al. | |
| 6,606,596 B1 | 8/2003 | Zirngibl et al. | |
| 6,658,093 B1 | 12/2003 | Langseth et al. | |
| 6,658,432 B1 | 12/2003 | Alavi et al. | |
| 6,697,824 B1 | 2/2004 | Bowman-Amuah | |
| 6,697,964 B1 * | 2/2004 | Dodrill et al. | 714/38 |
| 6,741,995 B1 | 5/2004 | Chen et al. | |
| 2001/0012335 A1 | 8/2001 | Kaufman et al. | |
| 2002/0006126 A1 | 1/2002 | Johnson et al. | |
| 2002/0065752 A1 | 5/2002 | Lewis | |
| 2003/0088872 A1 | 5/2003 | Maissel et al. | |
| 2004/0128514 A1 | 7/2004 | Rhoads | |
| 2004/0133907 A1 | 7/2004 | Rodriguez et al. | |

OTHER PUBLICATIONS

Adali et al., "Query Caching and Optimization in Distributed Mediator Systems", SIGMOD '96, Jun. 1996, Montreal, Canada, pp. 137–148.

Alur et al., "Directory–Driven Information Delivery", Data Base Associates Int'l, Jul. 1996, printed from http://web.archive.org on Jan. 7, 2002, 12 pages.

Chawathe et al., "Prepresenting and Querying Changes in Semistructured Data", Proceedings of the 14$^{th}$ International Conference on Data Engineering, IEEE, Feb. 23–27, 1998, pp. 4–13.

Codd et al., "Providing OLAP (On–line Analytical Processing) to User–Analysts; an IT Mandate", San Jose, California, Codd and Date, 1993, 1 page.

Flohr, "Using Web–Based Applications to Perform On–Line Analytical Processing Builds on the Strengths of Both Technologies", *OLAP by Web*, Sep. 1997, 8 pages.

Gesmann et al., "A Remote Cooperation System Supporting Interoperability in Heterogeneous Environments", Proceedings of the Third International Workshop on Research Issued in Data Engineering, IEEE, Apr. 19–20, 1993, pp. 152–160.

Hackathorn, "Solutions to Overworked Networks and Unruly Software Distribution are Just Part of P&S.", *Publish or Perish*, Sep. 1997, 21 pages.

Liscano et al., "Integrating Multi–Modal Messages across Heterogeneous Networks", IEEE, 1997, pp. 45–53, Abstract.

Liu et al., "Differential Evaluation of Continual Queries", Proceedings of the 16$^{th}$ International Conference on Distributed Computing Systems, IEEE, May 27–30, 1996, pp. 458–465.

Newing, "Relational Databases Are Not Suitable for Management Information Systems: And That's Official", *Management Accounting*, London, Vol. 72, No. 8, Sep. 1994, 4 pages.

Raden, "Teraforming the Data Warehouse", Archer Decision Sciences, printed from http://www.archer–decision.com on Jan. 16, 2002, 13 pages.

Schreier et al., Alert: An Architecture for Transforming a Passive DBMS into an Active DBMS, Proceedings of the 17$^{th}$ International Conference on Very Large Data Bases, Sep. 3–6, 1991, pp. 469–478.

Schultz, "ADEPT—The Advanced Database Environment for Planning and Tracking", *Bell Labs Technical Journal*. Jul.–Sep. 1998, pp. 3–9.

Spofford, "Attack of the Killer APIs", Intelligent Enterprise's Database Online Programming and Design, printed from http://www.dbpd.com on Dec. 21, 2001, 10 pages.

Stonebraker et al., "On Rules, Procedures, Caching and Views in Data Base Systems", Proceedings of the 1990 ACM SIGMOD International Conference on Management of Data, May 23–25, 1990, pp. 281–290.

Terry et al., "Continous Queries over Append–Only Databases", Proceedings of the 1992 ACM SIGMOD International Conference on Management of Data, Jun. 2–5, 1992, pp. 321–330.

Search Results from Internet Archive Wayback Machine, searched for http://www.infoadvan.com, printed from http://web.archive.org on Dec. 19, 2001, 40 pages.

Search Results from Internet Archive Wayback Machine, searched for http://www.platinum.com, printed from http://web.archive.org on Dec. 21, 2001, 17 pages.

ROLAP Case Studies, 30 pages.

"Fast and Flexible Access to Databases", *Byte*, Aug. 1997, pp. 53–54.

"Distributed Application Development with PowerBuilder 6.0", Manning Publications Co., printed from http://www.manning.com on Jan. 15, 2002, 12 pages.

"PowerBuilder 6.0 Questions & Answer", Manning Publications Co., printed from http://www.manning.com on Jan. 15, 2002, 13 pages.

"PowerBuilder 6.0 Questions & Answers", Manning Publications Co., printed from http://www.manning.com on Jan. 17, 2002, 2 pages.

Cheshire, "Product News—A Sea of Opportunity", Intelligent Enterprise's Database Online Programming and Design, printed from http://www.dbpd.com on Jan. 17, 2002, 6 pages.

"Information Advantage—Business Intelligence", "Live Information Repository . . . ", printed from http://www.infoadvan.com, on Dec. 19, 2001, 5 pages.

"Objective Data Inc.—Computer Software Consultants", Client List, printed from http://objectivedata.com/clients.htm on Jan. 15, 2002, 5 pages.

"Online Analytical Processing", printed from http:/searchdatabase.techtarget.com on Jan. 18, 2002, 3 pages.

"Seagate Crystal Reports 8", printed from http://www.crystaluser.com on Dec. 28, 2001, 6 pages.

"Andyne Delivers Personal OLAP with PaBLO 4.0", Press Release, Mar. 31, 1997, Andyne Computing Limited, 5 pages.

"Andyne Announces Support for Microsoft's OLE DB for OLAP", Press Release, Sep. 10, 1997, Andyne Computing Limited, 4 pages.

"Andyne QMO—Manage Data Access", Andyne Computing, printed from http://web/archive.org on Jan. 3, 2002, 5 pages.

"The Andyne Vision—On the Road to the Integrated Solution", Andyne Computing, printed from http://web.archive.org on Jan. 3, 2002, 11 pages.

"Visual Information Access for Multidimensional Companies . . . ", Andyne Corporate Profile, 2 pages.

"MicroStrategy Announces DSS Web 5.0; DSS Web Introduces the Web–Cast of Decision Support", MicroStrategy, Jan. 5, 1998, printed Dec. 10, 2001, 2 pages.

"MicroStrategy Introduces DSS Web Standard Edition; Web Interface Provides powerful, Easy–to–Use DSS Tool for Mainstream End–User Market", MicroStrategy, Apr. 27, 1998, printed Dec. 10, 2001, 2 pages.

"MicroStrategy Advantages: Proven Multi–Tier, Architecture", printed from http://web.archive.org, 4 pages.

"MicroStrategy 'Comsumerizes' the Data Warehouse with Its New 4.0 Product Line", Press Release, Jun. 24, 1996, MicroStrategy, printed from http://web.archive.org on Dec. 8, 2001, 7 pages.

"MicroStrategy Announces DSS Server 3.0", Press Release, Aug. 8, 1995, MicroStrategy, printed from http://web.archive.org on Dec. 8, 2001, 5 pages.

"MicroStrategy Announces True Relational OLAP Product Line", Press Release, Aug. 8, 1995, MicroStrategy, printed from http://web.archive.org on Dec. 8, 2001, 5 pages.

"DSS Administrator Features Overview", MicroStrategy, No. 05090297, 2 pages.

"DSS Agent Features Overview", MicroStrategy, No. 05100896, 2 pages.

"DSS Server Features Overview", MicroStrategy, No. 05140896, 2 pages.

"Relational OLAP Interface", DSS Agent, MicroStrategy, 22 pages and 20 pages.

"Relational OLAP Interface for the Web", MicroStrategy DSS Web Brochure, 4 pages.

"Data Warehouse and DSS Management Tools", DSS Administrator, MicroStrategy, 17 pages and 16 pages.

"OLE API for Custom Application Development", DSS Objects, MicroStrategy, 4 pages and 4 pages.

"Arbor Software OLAP Products", Brochure, Arbor Software, 12 pages.

"Info Trac OneFile", *Database Programming & Design*, vol. 11, No. 7, Jul. 1998, 12 pages.

"Andyne GQL Version 3.3.2 Available Jul. $17^{th}$; Featuring Multi–Pass Reporting, Time Governors and Scripting", *Business Wire*, Jun. 26, 1995, Andyne Computing Limited, 4 pages.

"MicroStrategy Announces DSS Server 3.0; Three–Tier Architecture Results in Exceptional Performance and Scalability for DSS Applications", *Business Wire*, Aug. 8, 1995, MicroStrategy, 3 pages.

"Information Advantage Ships DecisionSuite 3.0 Business Analysis Applications for Data Warehouses", *Business Wire*, Nov. 9, 1995, 3 pages.

"Information Advantage Announces WebOLAP; First Structured Content analysis Server for the World Wide Web", *Business Wire*, Feb. 5, 1996, 3 pages.

"Andyne Delivers Second Stage of the Andyne Integrated Solution", *Canada NewsWire*, May 13, 1996, 3 pages.

"Andyne Computing Ltd is Shipping Version 3.3.2 of Its GQL Decision Support System", *CommunicationsWeek*, No. 566, Jul. 17, 1995, p. 16.

"Andyne Computing Introduces New Query Management Option as Companion Product to Andyne's GQL Product", *CommunicstionsWeek*, No. 592, Jan. 15, 1996, p. 16.

"Andyne Hopes to Benefit From Current Data Warehousing Hype with GQL Query Language", *Computergram International*, No. 2798, Nov. 22, 1995, 1 page.

"Andyne's GQL Makes It Easier—New Version of Reporting, Analysis Tool Unveiled", *Computer Reseller News*, No. 685, 1996, p. 79.

"The Right Tools", *Computer Weekly*, Aug. 29, 1996, 4 pages.

"4 OLAP Tools; The Common Thread is that OLAP Tools Drain Too Much Time and Energy Before You Get What You Need", *Computerworld*, Dec. 2, 1996, 4 pages/.

"GQL", *Data Management Review (DM Review)*, vol. 6, No. 5, May 1996, p. 47.

"DB2 Today Newsletter", Jun. 1999, 2 pages.

"GQL 3.2", *DBMS*, vol. 8 , No. 1, Jan. 1995, 2 pages.

"Everything's Coming Up Warehouse", *DBMS*, Oct. 1, 1995, 3 pages.

"Query, Reporting, and Analysis Tools", *DBMS*, vol. 9, No. 6, Jun. 15, 1996, 14 pages.

Brooks, "MCI Leverages Data Warehouse Technology to Strengthen its Marketing Campaigns", *DBMS*, Dec. 1996, 7 pages.

Dobson, "Data Binding in Dynamic HTML", *DBMS*, Mar. 1998, 12 pages.

Dodd, "Native is as Native Does", *HP Professional*, vol. 12, No. 12, Feb. 1998, 1 page.

"Banking's New Payoff: Speed", *InformationWeek*, Jan. 17, 1994, 3 pages.

"Nailing Down More Query Tools", *InformationWeek*, vol. 523, Apr. 17, 1995, 7 pages.

Raden, "Data, Data Everywhere", *Information Week*, Oct. 30, 1995, pp. 60–65.

"Back–to–Back Upgrades—Vendors Introduce Reporting, Query Tools", *InformationWeek*, No. 598, Sep. 23, 1996, 1 page.

"Desktop OLAP Tools—If the Tool Fits, Use It—Online Analytical Processing Tools Offer Ease of Use for Data Retrieval and Analysis with Minimal User Training", *InformationWeek*, No. 605, Nov. 11, 1996, 3 pages.

"Pilot Gets Serious About OLAP", *Information Week*, Jul. 20, 1998, pp. 55–59.

"Oracle Announces Next Generation Oracle Express Server 6.0", *M2 Presswire*, Aug. 7, 1996, 5 pages.

"Andyne Updates GQL", *Newsbytes*, Jul. 12, 1994, 1 page.

"Andyne Computing Has Released Version 3.2.2 of Its GQL Query Software for Macintosh, Windows and Unix Platforms", *Newbytes News Network*, Jul. 12, 1994, 4 pages.

"Data Access is Key to Warehousing Success", *Open Systems Today*, Oct. 3, 1994, 2 pages.

Phillips, "Crystal Eyes OLAP Engine", *PC Week*, vol. 13, No. 4, Jan. 29, 1996, 3 pages.

Dyck, "New Report Writer Spruces Up GQL", *PC Week*, vol. 14, No. 3, Jan. 20, 1997, 1 page.

"New Decision Suite 3.0 From Information Advantage Raises the Bar for Enterprise Decision Support", *Newswire*, Aug. 8, 1995, 3 pages.

"Andyne's Intranet Strategy Brings DSS to the Web; Company Aims to Dramatically Broaden Scope of Reporting, Online Analysis", *PR Newswire*, Sep. 18, 1996, 11 pages.

"NCR Adds OLAP Services to Extend and Expand Decision Support Capabilities of Teradata Database", *PR Newswire*, May 28, 1998, 3 pages.

"DecisionSuite 3.5", *SoftBase*, Sep. 12, 1996, 2 pages.

"IBM Acquires ITI's KnowledgeX Technology to Enhance Business Intelligence Solutions", *Software News*, Jul. 23, 1998, 1 page.

"Microstrategy Talks Crystal Balls", *Software Futures*, Apr. 1, 1997, 4 pages.

"Document Agent Administrator's Guide", Revision 3, BusinessObjects, Version 4.0, pp. 1–29.

"Document Agent Server Administrator's Guide", Revision 4, BusinessObjects, Version 4.1, pp. 1–33.

"Getting Started with Reports", Revision 2, BusinessObjects, Version 4.0, pp. 1–53.

"Getting Started with Reports", Revision 3, BusinessObjects, Version 4.1, pp. 1–53.

"User's Guide", Revision 3, BusinessObjects, Version 4.0, pp. 1–251.

"User's Guide", Revision 4, BusinessObjects, Version 4.1, pp. 1–287.

Advertisement for Progressive Telecommunications Corporation's OPUS (undated).

KnowledgeX Workgroup Edition Publication (undated).

Relational OLAP Server, MicroStrategy; DSS Server Brochure,1996.

Relational OLAP Interface for the Web, 1996.

"Andyne Introduces Greater Flexibility for Database Queries; New Query Management Option Provides Enhanced Management for Enterprise–Wide Queries," *Business Wire*, Jan. 3, 1996. Available from the Dow Jones Interactive Web Site http://Ptg.djnr.com.

Catalano, Carla, "*OLAP, Scheduling, Tuning for DBMSs,*" *Computer World*, Apr. 1, 1996. Available in Dow Jones Interactive, http://www.dowjonesinteractive.com.

*Andyne's Intranet Strategy Brings DSS to the Web; Company Aims to Dramatically Broaden Scope of Reporting, Online Analysis, PR Newswire*, Sep. 18, 1996. Available from the Dow Jones Interactive Web Site http://Ptg.djnr-.com.

Sachs et al., "*A First Step on the Path to Automated Flight Reservations,*" *Interactive Voice Technology for Telecommunications, 1996*.

Bennacef et al., "*Dialog in the RAILTEL Telephone–Based System,*" *Spoken Language*, 1996.

Brooks, Peter, "*Targeting Customer,*" *DBMS*, v9, n13, Dec. 1996, pp. 54–58.

"*Sterling Software Announces Alliance with Thinking Machines,*" *Business Wire*, Dec. 16, 1996. Available from the Dow Jones Interactive Web Site http://Ptg.djnr.com.

Gupta et al., "*Index Selection for OLAP,*" *Proceedings of the 13th International Conference on Data Engineering*, © 1997.

Ho et al., "*Partial–Sum Queries in OLAP Data Cubes Using Covering Codes,*" *PODS'97* Tucson, AZ USA.

Kilmartin et al., "*Real Time Stock Price Distribution Utilising the GSM Short Messaging Service*," 1997 IEEE International Conference on Personal Wireless, 1997, Abstract.

*Data Warehousing: Data Access and Delivery, Infobase Technology Database*, 1997, http://www.dbaint.com/oldinfobase/dwaccdel.html.

Gardner, Dana Marie, "*Cashing in With Data Warehouses and the Web,*" *Data Based Advisor*, v15, n2, Feb. 1997, pp. 60–63.

*Intrepid Systems Announces General Availability of DecisionMaster 4.1; Retailing's Premier Decision Support Software Enhancements Automate Information Delivery, Business Wire*, May 27, 1997. Available in Dow Jones Interactive, http://www.dowjonesinteractive.com.

*Blue Isle Software InTouch/2000 Product Overview*, Blue Isle Software, Inc. (archived Jul. 7, 1997), http://www-.blueisle.com. Available in Internet Archive Waybackmachine http://www.archive.org.

"*Blue Isle Software Teams with Arbor Software to Deliver Automated Systems Management Capabilities for Arbor Essbase,*" *Business Wire*, Oct. 29, 1997. Available in LEXIS, Nexis Library, ALLNWS file.

"*Early Warning: Compulogic's Dynamic Query Messenger,*" *Software Futures*, Nov. 1, 1997. Available in LEXIS, Nexis Library, ALLNSW file.

Kilmartin et al., "Development of an Interactive Voice Response System for a GSM SMS Based Share Price Server," DSP '97 Conference Proceedings 1997, Abstract.

Avnur et al., "CONTROL: Continuous Output and Navigation Technology with Refinement On–Line," © 1998.

Liang et al., "*Computing Mutlidimensional Aggregates in Parallel,*" 1998 International Conference on Parallel and Distributed Systems, IEEE.

Friel et al., *An Automated Stock Price Delivery System Based on the GSM Short Message Service*, ICC'98 1998 IEEE International Conference on Communications, 1998, Abstract.

Microstrategy Products and Services, 1998.

Personalized Information Broadcast Server, 1998.

"*Information Advantage Wins Product of the Year Award for Knowledge Management,*" *Business Wire*, Mar. 4, 1998. Available in LEXIS, Nexis Library, ALLNWS file.

Emigh, Jacqueline, "*Information Builders, Inc. Launches WebFocus Suit,*" *Newbytes*, Mar. 10, 1998. Available in Northern Light, http://www.northernlight.com, Doc. ID BS19980311010000172.

*MICROSTRATEGY: DSS Broadcaster—The Industry's First Information Broadcast Server, M2 Presswire*, Mar. 20, 1998. Available in Dow Jones Interactive http://www.djinteractive.com.

*Microstragegy Introduces DSS Broadcaster—The Industry's First Information Broadcast Server*, Mar. 23, 1998. http://strategy.com/newsandevent/New/PressRelease/1998/broadcaster.htm.

*Microstrategy Introduces DSS Broadcaster—The Industry's First Information Broadcast Server*, Mar. 23, 1998. http://www.strategy.com/newsandevents/News/PressReleases/1998/broadcaster.htm.

"MSNBC on the Internet Launches New Traffic Section; MSNBC.com and Sidewalk.com Team with TrafficStation for Production of Comprehensive Site for Drivers," *Financial News*, Redmond, Wash., Apr. 15, 1998.

Prospectus—4,000,000 Shares Microstrategy Class A Common Stock, Jun. 11, 1998.

"System for Telephone Access to Internet Applications—Uses Dial Tones and/or Voice with Interactive Voice Response Unit to Pass Request to Processor that Converts Requests to Communication Protocol Command Set," IBM, Patent No. RD 98412088. Jul. 20, 1998, Abstract.

Relational OLAP Interface, Programmer's Reference and SDK Guide, Version 5.0, Aug. 1998.

Data Warehouse Dossier, Fall 1998.

"*Microstrategy Announces Enhanced Versions of DSS Web and DSS Server*," Oct. 26, 1998, http://www.strategy.com/NewsandEvents/news/pressreleases/1998/server5.5.htm.

System Guide DSS Web Version 5.5, Feb. 1999.

Developer Guide DSS Web Version 5.5, Feb. 1999.

Media Output Book, v2.0, Feb. 16, 1999.

*Computer Telephony*, from www.telecomlibrary.com—Sep. 9, 1999.

Frequently Asked Questions About DSS Web, printed Feb. 23, 1999, http://www.strategy.com/products/Web/faq.htm.

"*Traffic Station Extends Service to Six New Markets in North America, Reaching its Goal of 20 Markets by the New Millennium,*" Business Editors/Multimedia & Transportation Writers, Los Angeles, Dec. 23, 1999.

Traffic Station Corporate Information, http://www.trafficstation.com/home/corporate.html, Jan. 10, 2001.

Newswire, "Net Phones to Outsell Laptops by 2002", Dec. 2, 1998, Dialog File #0365692.

RCR Radio Communications Report, "Comverse Developing Unified Applications for GSM Smartphone Marketplace", Feb. 23, 1998, V. 17, No. 8, p. 106, Dialog File #02078693.

America's Network, "Wireless Web Browsing: How Long Will Deployment Take? (There Will be 22 Mil Devices Other than PCs Accessing the Internet by 2000)", Dec. 15, 1996, vol. 100, No. 24, p. 30+, Dialog File #01708089.

MSRT142—Lehner, Wolfgang, "Modeling Large Scale OLAP Scenarios", University of Erlangen–Nuremberg, Dept. of Database Systems, Germany, 1998, pp. 1–15.

MSTR143—"Sybase Announces General Availability of Warehouse Studio", *PR Newswire*, New York, Jun. 23, 1998, two pages.

MSTR144—Schmandt, Chris, "Phoneshell: the Telephone as Computer Terminal", Proceedings of ACM Multimedia '93, New York, Aug. 1993, pp. 373–382.

MSTR145—Roy, Deb. K., et al., "NewsComm: A Hand-Held Interface for Interactive Access to Structured Audio", *CHI '96 Conference Proceedings*, Vancouver, Canada, Apr. 1996, pp. 173–180.

MSTR146—Roy, Deb Kumar, "NewsComm: A Hand–Held Device for Interactive Access to Structured Audio", Masters Thesis, *MIT Media Laboratory*, 1995.

MSTR147—Emnett, Keith, et al., "Synthetic News Radio", *IBM Systems Journal*, vol. 39, Nos. 3 & 4, 2000, pp. 646–659.

MSTR148—MicroStrategy: "MicroStrategy Announces the General Availability of DSS Broadcaster", *Business Wire*, Aug. 11, 1998, Proquest #32759243.

MSTR149—Intrepid Systems: "Intrepid Systems to Integrate DSS Broadcaster with Its "DecisionMaster" Decision Support Solution; Non–PC Users Benefit from Receiving High–Impact, Mission Critical Information", *Business Wire*, Aug. 11, 1998, Proquest #32760823.

MSTR150—MicroStrategy: "MicroStrategy's DSS Broadcaster Supports Personal Digital Assistants and Advanced Wireless Data Devices", *Business Wire*, Sep. 8, 1998, Proquest #33719588.

MSTR151—Mills, Mike, "Putting the Internet in Your Hand; Nokia's Phone/Palmtop Computer Offers a Glimpse of the Future", *The Washington Post*, Jun. 29, 1998, Proquest #30839088.

MSTR152—Spyglass Prism Concepts and Applications, 1997, Spyglass, Inc., pp. 1–8.

MSTR153—Spyglass White Paper; Spyglass Product Strategy: Making Devices work with the Web, 1997, Spyglass, Inc., pp. 1–9.

MSTR154—Kane, Margaret, "Microsoft Acquires Hotmail", *ZDNet News*, Dec. 30, 1997, 2 pages.

MSTR155—Emnett, Keith, et al., "Synthetic Audio Newscast", *The MIT Media Laboratory*, Dec. 1998, pp. 1–2.

MSTR156—KylÅnpÅÅ, Markku, "Mobile Multimedia White Paper ", http://www.vtt.fi/tte/projects/mobmulti/mobmulti.html, last modified Oct. 12, 1998, 8 pages.

MSTR157—Ewen, Edward F., et al., "Data Warehousing in an Integrated Health System; Building the Business Case", *Proceedings of the ACM First International Workshop on Data Warehousing and OLAP*, 1998, pp. 47–53.

MSTR158—Zaiane, Osmar R., et al., "Discovering Web Access Patterns and Trends by Applying OLAP and Data Mining Technology on Web Logs", *IEEE International Forum on Research and Technology Advances in Digital Libraries*, date unavailable, pp. 19–29.

MSTR159—Kurz, Andreas, et al., "Data Warehousing within Intranet: Prototype of a Web–Based Executive Informatin System", *Proceedings of the 8$^{th}$ International Workshop on Database and Expert Systems Applications*, 1997, pp. 627–632.

MSTR160—Lehn, Rémi, et al., "Data Warehousing Tool's Architecture: From Multidimensional Analysis to Data Mining", *IEEE Database and Expert Systems Applications*, date unavailable, pp. 636–643.

"*Sterling Software Announces Alliances with Thinking Machines,*" Business Wire, Dec. 16, 1996. Available from the Dow Jones Interactive Web Site http://ptq.djnr.com.

* cited by examiner

SYSTEM AND METHOD FOR THE CREATION AND AUTOMATIC DEPLOYMENT OF PERSONALIZED, DYNAMIC AND INTERACTIVE VOICE SERVICES INCLUDING MODULE FOR GENERATING AND FORMATTING VOICE SERVICES

RELATED APPLICATIONS

This application claims priority from U.S. Provisional Application Ser. No. 60/153,222, filed 13 Sep. 1999, entitled "SYSTEM AND METHOD FOR THE CREATION AND AUTOMATIC DEPLOYMENT OF PERSONALIZED, DYNAMIC AND INTERACTIVE VOICE SERVICES."

This application is also related by subject matter to the following U.S. Patent Applications: U.S. application Ser. No. 09/454,602, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES;" U.S. application Ser. No. 10/073,331, filed 13 Feb. 2002, entitled "SYSTEM AND METHOD FOR THE CREATION AND AUTOMATIC DEPLOYMENT OF PERSONALIZED, DYNAMIC AND INTERACTIVE VOICE SERVICES, WITH CLOSED LOOP TRANSACTION PROCESSING," which is a continuation of U.S. application Ser. No. 09/455,525, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, WITH CLOSED LOOP TRANSACTION PROCESSING," now abandoned; U.S. application Ser. No. 09/455,533, filed 7 Dec. 1999, entitled SYSTEM AND METHOD FOR THE CREATION AND AUTOMATIC DEPLOYMENT OF PERSONALIZED, DYNAMIC AND INTERACTIVE VOICE SERVICES WITH REAL-TIME DATABASE QUERIES;" U.S. application Ser. No. 09/455,529, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES WITH REAL-TIME DRILLING VIA TELEPHONE;" U.S. application Ser. No. 10/072,898, filed 12 Feb. 2002, entitled "SYSTEM AND METHOD FOR THE CREATION AND AUTOMATIC DEPLOYMENT OF PERSONALIZED, DYNAMIC AND INTERACTIVE VOICE SERVICES WITH CUSTOMIZED MESSAGE DEPENDING ON RECIPIENT," which is a continuation of U.S. application Ser. No. 09/455,527, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES WITH CUSTOMIZED MESSAGE DEPENDING ON RECIPIENT;" U.S. application Ser. No. 09/661,377, filed 13 Sep. 2000, entitled "SYSTEM AND METHOD FOR CREATING VOICE SERVICES FOR INTERACTIVE VOICE BROADCASTING;" U.S. application Ser. No. 09/661,375, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH SYSTEM AND METHOD THAT ENABLE ON-THE-FLY CONTENT AND SPEECH GENERATION;" U.S. application Ser. No. 09/496,357, filed 2 Feb. 2000, entitled "SYSTEM AND METHOD FOR PERSONALIZING INTERACTIVE VOICE BROADCASTS;" U.S. application Ser. No. 09/661,471, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES INCLUDING A MARKUP LANGUAGE FOR CREATING VOICE SERVICES;" U.S. application Ser. No. 09/454,604, filed 7 Dec. 1999, entitled "SYSTEM AND METHOD FOR VOICE SERVICE BUREAU," now U.S. Pat. No. 6,263,051, issued 17 Jul. 2001; U.S. application Ser. No. 09/496,356, filed 2 Feb. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH TELEPHONE-BASED SERVICE UTILIZATION AND CONTROL;" U.S. application Ser. No. 09/455,523, filed 7 Dec. 1999, entitled "SYSTEM AND METHOD FOR REAL-TIME, PERSONALIZED, DYNAMIC, INTERACTIVE VOICE SERVICES FOR INFORMATION RELATED TO EXISTING TRAVEL SCHEDULE;" U.S. application Ser. No. 09/454,601, filed 7 Dec. 1999, entitled "SYSTEM AND METHOD FOR REAL-TIME, PERSONALIZED, DYNAMIC, INTERACTIVE VOICE SERVICES FOR INVENTORY-RELATED INFORMATION;" U.S. application Ser. No. 09/454,597, filed 7 Dec. 1999, entitled "SYSTEM AND METHOD FOR REAL-TIME, PERSONALIZED, DYNAMIC, INTERACTIVE VOICE SERVICES FOR CORPORATE-ANALYSIS RELATED INFORMATION;" U.S. application Ser. No. 09/455,524, filed 7 Dec. 1999, entitled "SYSTEM AND METHOD FOR REAL-TIME, PERSONALIZED, DYNAMIC, INTERACTIVE VOICE SERVICES FOR INVESTMENT-RELATED INFORMATION;" U.S. application Ser. No. 09/454,603, filed 7 Dec 1999, entitled "SYSTEM AND METHOD FOR REAL-TIME, PERSONALIZED, DYNAMIC, INTERACTIVE VOICE SERVICES FOR ENTERTAINMENT-RELATED INFORMATION;" U.S. application Ser. No. 09/455,532, filed 7 Dec. 1999, entitled "SYSTEM AND METHOD FOR REAL-TIME, PERSONALIZED, DYNAMIC, INTERACTIVE VOICE SERVICES FOR PROPERTY-RELATED INFORMATION;" U.S. application Ser. No. 09/454,599, filed 7 Dec. 1999, entitled "SYSTEM AND METHOD FOR REAL-TIME, PERSONALIZED, DYNAMIC, INTERACTIVE VOICE SERVICES FOR RETAIL-RELATED INFORMATION;" U.S. application Ser. No. 09/455,530, filed 7 Dec. 1999, entitled "SYSTEM AND METHOD FOR REAL-TIME, PERSONALIZED, DYNAMIC, INTERACTIVE VOICE SERVICES FOR BOOK-RELATED INFORMATION;" U.S. application Ser. No. 09/455,526, filed 7 Dec. 1999, entitled "SYSTEM AND METHOD FOR REAL-TIME, PERSONALIZED DYNAMIC, INTERACTIVE VOICE SERVICES FOR TRAVEL AVAILABILITY INFORMATION;" U.S. Application Ser. No. 09/661,189, filed 13 Sep. 2000, entitled "SYSTEM AND METHOD FOR VOICE-ENABLED INPUT FOR USE IN THE CREATION AND AUTOMATIC DEPLOYMENT OF PERSONALIZED, DYNAMIC, AND INTERACTIVE VOICE SERVICES;" U.S. application Ser. No. 09/455,534, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, WITH INTEGRATED IN BOUND AND OUTBOUND VOICE SERVICES;" U.S. application Ser. No. 09/496,425, filed 2 Feb. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH THE DIRECT DELIVERY OF VOICE SERVICES TO NETWORKED VOICE MESSAGING SYSTEMS;" U.S. application Ser. No. 09/454,598, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, INCLUDING DEPLOYMENT THROUGH DIGITAL SOUND FILES;" U.S. application Ser. No. 09/454,600, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICE INCLUDING DEPLOYMENT THROUGH PERSONALIZED BROADCASTS;" and U.S. application Ser. No. 09/661,191, filed 13 Sep. 2000, entitled "SYSTEM AND METHOD FOR CREATION AND AUTOMATIC DEPLOYMENT OF PERSONALIZED, DYNAMIC AND INTERACTIVE VOICE SERVICES, WITH REAL-TIME INTERACTIVE VOICE DATABASE QUERIES.

FIELD OF THE INVENTION

This invention relates to a system and method for creation and automatic deployment of personalized, dynamic and interactive voice services, including information derived from on-line analytical processing (OLAP) systems and other data repositories, including a module for formatting output into a mark-up language, suitable for use with an interactive voice broadcasting system.

BACKGROUND OF THE INVENTION

Markup languages including extensible Markup Language (XML) are known. XML is a set of rules about how to compose markup languages. Any document that conforms to these rules is an XML document. XML is called extensible because it is possible to define other markup languages in XML. XML documents follow a tree structure, which consists of a set of hierarchically arranged nodes. There is a single top level node that contains all other nodes. Each node is marked by tags of the form <node> node body <node>. If a node does not have a body, it may also be written as <node>. Further, a node can have attributes: <node attr1= "first attribute" attr2="second attribute"/>. Attributes must be enclosed in quotes and preferably do not contain certain characters such as quotes, "<", ">" and "&".

The Extensible Stylesheet Language (XSL) is a language used to write stylesheets and that adheres to the XML format. XSL can be applied to any kind of XML-based S markup, even to XSL itself XSL can be used, for example, to transform XML documents into other XML documents or into plain text. An XSL document and processor, provide a mechanism for navigating through the nodes of an XML document and applying certain transformations to them. XSL also allows the use of scripts. Scripts are programs that can provide additional functionality that may not be possible with the standard XSL elements.

Generally, markup languages enable systems to present text based information on a visual display. Markup languages typically, however, do not enable information to be communicated to a voice enabled device.

SUMMARY OF THE INVENTION

An object of the invention is to overcome these and other drawbacks of existing systems.

Another object of the invention is to provide a system and method for generating a markup language document that enables information to be delivered to voice-enabled terminal devices and permits personalized, dynamic, interactive voice broadcasts.

According to one embodiment, the invention comprises a system and method for creation and automatic deployment of personalized, dynamic and interactive voice services, including information derived from on-line analytical processing (OLAP) systems and other data repositories, including a module for formatting output into a markup language suitable for use with an interactive voice broadcasting system (TML). TML is a unique mark-up language that is based on XML. The present invention provides a TML engine and report formatter that combines a voice service specification with static and dynamic content to generate active voice pages (AVP). Active voice pages are used to determine the interaction between a user and a voice service system during an interactive voice broadcast. According to one embodiment, the AVP comprises a TML document.

Another embodiment of the invention relates to a system and method for creation and automatic deployment of personalized, dynamic and interactive voice services, including information derived from on-line analytical processing (OLAP) systems and other data repositories. The system and method enables the capture of user selections to facilitate closed-loop transaction processing and processing of other requests. One aspect of the invention relates to an interactive voice broadcasting system and method that enables analytical reporting and advanced transactional services via the telephone or other voice-enabled terminal device. One advantage of the invention is that a voice service may leverage the power of OLAP or other data repository systems and provide critical information to the user, in a timely fashion, by phone. Another advantage of this method and system is that it provides a user with the opportunity to immediately act upon information received during a interactive voice broadcast.

A voice service is created and can have many users subscribed to the voice service. Each user can specify personal preferences for the content and presentation of the contents for a voice service. The specification of the elements of a voice service may be done using a set of interfaces (such as GUIs) that take the form of a voice service wizard.

A voice service includes one or more Dialog elements. Dialog elements may include one or more of Speech elements, Input elements and Error elements. An Input element may include a Prompt element and/or an Option element An Input element enables the system to request input from the user, capture the input and direct the call flow based on the user's input. An Option element associates a key (e.g., on a telephone touch pad dial) with a destination Dialog that is executed when that number is pressed by a user during an interactive voice broadcast. A Prompt requests a user to enter numeric or other information. An Input element may enable a user to request, during an interactive voice broadcast, a transaction, a service or other requests. The term transactions, services and requests are to be interpreted broadly.

According to one embodiment, the user's responses to Input elements are stored during an interactive voice broadcast and, during or after the voice broadcast, the stored information is processed by the system or is passed to another system or application for processing. The transaction (or other request) processing can be accomplished either in real-time, during the voice broadcast, or after the interactive voice broadcast is completed. The results or confirmation of a transaction or other request can be provided to the user during the call or subsequently.

Once a voice service is created, the system monitors predetermined conditions to determine when the voice service should be executed. Each voice service is executed when one or more predetermined conditions are met as specified during creation of the voice service. For example, a voice service may be executed according to a predetermined schedule (time-based) or based on a triggering event (e.g. one or more conditions are met based on the output of an OLAP or other report).

When the predetermined condition is satisfied, the voice service is executed. Executing a voice service, includes the steps of generating the content specified by the voice service and the user preferences. Some users may have identical personalization options and, thus, a single call structure may be generated for a group of users with identical personalization options. The content of the voice service includes the information that is to be delivered to users of that voice service, and the Input to be requested from the user, among other things. The content may include, for example, static text messages, dynamic content (e.g. text based on information output from an OLAP report, other database or other sources) blended text (e.g. static text combined with dynamic content) and prerecorded sound files.

This and other content along with a users personalization preferences are formatted in an Active Voice Page (AVP). An AVP contains the call structure and data, voice style parameters for the user and personal identification information designated for the user. The AVP contains data at various hierarchical levels that are defined by the Dialog elements defined for each voice service. The active voice pages are used to help govern the interaction between the call server and the user during an IVB. According to one embodiment, the content is formatted, into an AVP using XSL stylesheets so the AVP is in an XML-based language. According to one embodiment, the XML-based language used is a novel language referred to as TML. Other XML-based markups could be used, such as VoiceXML™. The AVP is sent to a call server along with style properties for each user. The style properties of a user help determine the behavior of the call server during an interactive voice broadcast. A unique AVP is generated for each user scheduled to receive a voice service.

When a user is called by the call server, information is passed through a T-T-S engine and delivered to the user through a voice-enabled terminal device. Preferably, the structure of each call is dynamic, driven by current data values and is personalized based on a user profile established during subscription to a voice service. During a typical interactive voice broadcast, a synthesized, natural sounding voice greets the recipient by name, identifies itself, provides information relevant to the user and enables a user to provide input back to the system.

An IVB is a voice-enabled interaction with a user having a dynamic structure controlled by the AVP for the particular user. The IVB may be delivered using real-time, on-the-fly speech generation. During an IVB, information is exchanged between the call server and a user according to the AVP. The system executes dialogs by reading messages to the user and, eliciting input from the user. For example, the user may press buttons on a telephone touch pad dial to select an option or to provide numeric or alphanumeric input or the user may speak a response which the system resolves using speech recognition technology. Each response provided by a user may transfer control of the IVB to a different part of the AVP or to a different AVP.

During or after the IVB, the user's responses may be processed by the system or other applications. The AVP may contain pointers to other applications and embedded statements such that when a user exercises an option, the system performs a requested operation and returns the results to the user during the IVB. For example, by exercising an option, a user may request that a real-time database query be performed. When the user selects such an option, control is shifted to a portion of the AVP that contains an embedded SQL statement that is made against a database.

When a user has worked through selected dialogs of the AVP, the IVB is terminated. That is, a user likely will not work through all of the available dialogs during an IVB. Rather, the user's inputs and option selections determine which the available dialogs are encountered during any given IVB.

Other features and advantages of the present invention will be apparent to one of ordinary skill in the art upon reviewing the detailed description of the present invention.

DETAILED DESCRIPTION OF THE PREFERRED EMBODIMENTS

Figure 1A:
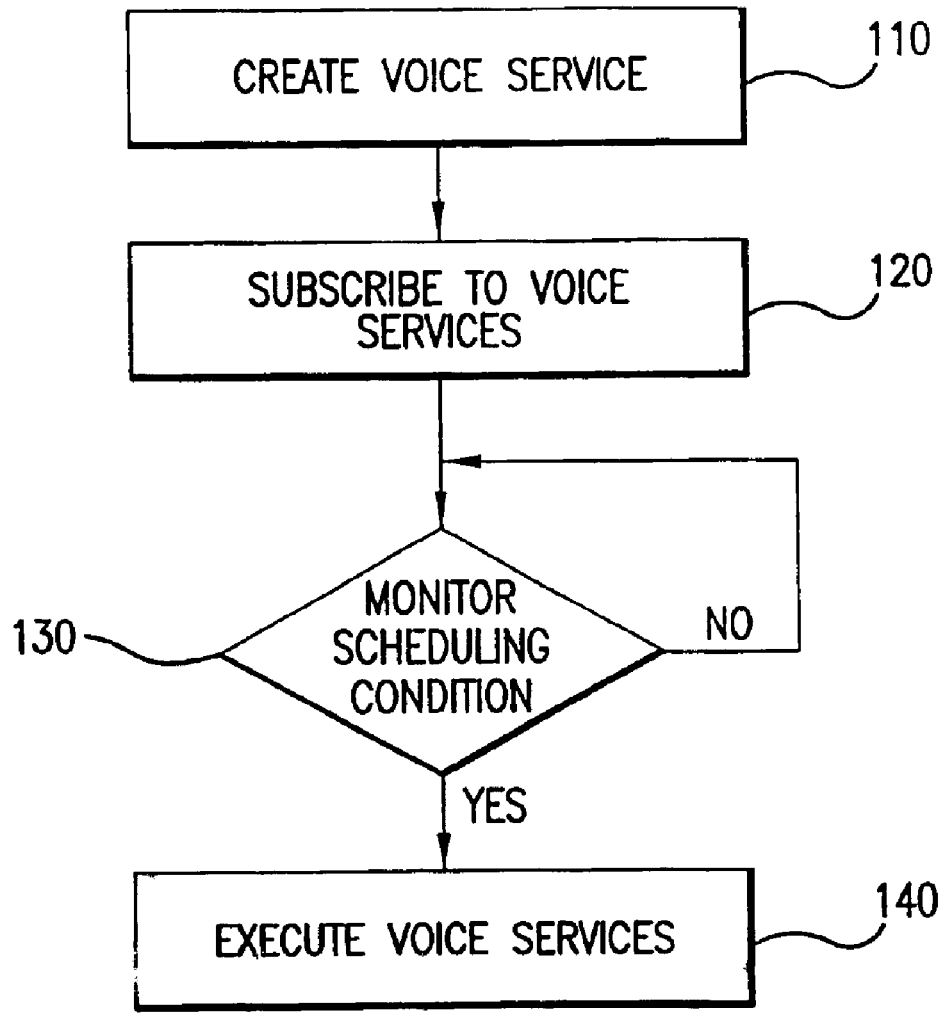
FIG. 1a is a flow chart of a method in accordance with an embodiment of the present invention.

According to one embodiment, the invention comprises a system and method for generating XML-based markup and formatting an active voice page. According to a particular embodiment, the invention comprises a system and method for generating TML and formatting AVPs. As explained above, an AVP is a document that is used to drive the interaction between a voice service system and a user during an interactive voice broadcast. Other XML-based markups, such as VoiceXML™ could be used to form AVPs.

To facilitate understanding of the system and method of the present invention, a brief explanation of TML is now provided. TML is a markup language that enables interactive voice broadcasting. According to one embodiment, TML is based on XML and comprises a set of elements that are used to define functions for various portions of a document and a set of tags that correspond to the elements. The tags are used to delimit portions of a document that belong to a particular element.

According to one embodiment, TML comprises a Header Element, a Container Element, a Dialog Element, a Text Element, a For-Each Element, an Input Element, an Option Element, a Prompt Element, an Error Element, and a System-Error Element.

A Header Element is used to identify the markup language on which a document is based.

A Container Element is used to identify a document as a TML document.

A Dialog Element is the basic unit of interaction between a system and a user. According to one embodiment, a Dialog Element may contain text that is to be spoken to a user. A Dialog Element may contain Text Elements, For-Each Elements, Input Elements, Option Elements and Prompt Elements.

A Text Element may also be called a Speech Element and defines text portions of a document. According to one embodiment, text portions of a document are used to specify information that is to be spoken to a user.

A For-Each Element is used to cycle (loop) through a group of related variables. to dynamically generate speech from data An Input Element defines sections of Dialog Elements that contain interactive portions of the TML document. According to one embodiment, an Input Element contains elements that pertain to a response expected from a user.

An Option Element identifies a predefined user selection that is associated with a particular input. According to one embodiment, Option Elements are used to associate one or more choices available to a user with telephone keys.

A Prompt Element defines a particular input that is expected. According to one embodiment, a Prompt Element defines that a sequence or number of key presses from a telephone keypad is expected as input. Unlike an Option Element, a Prompt Element is not associated with predefined user selections.

An Error Element defines a response to invalid input by a user. For example, an Error Element may be used to define the response to entry of an undefined option.

A System-Error Element defines a response to predetermined system events. For example, a System-Error Element may be used to define the response to expiration of the waiting time for a user input.

Within any given document, TML uses a set of corresponding tags to delimit each of the above defined elements.

According to another embodiment, a TML document is a collection of the above described elements. Within a document, the boundaries of an element are delimited by its corresponding tags. Moreover, according to one embodiment, elements are arranged as parent elements and child elements. Parent elements may contain text and other elements. If an element is contained by another element, it may be called a child of the containing element.

According to another embodiment, a TML document is used to provide interactive, dynamic voice services to a user through a telephone or other voice-enabled terminal device. A TML document enables a user to receive dynamically generated information and provide various types of input in response. According to one embodiment, the TML elements and tags described above are used to specify text that is to be communicated to a user and to request input from a user. According to this embodiment, the specified text is passed through a text-to-speech converter and conveyed to a user over a telephone.

According to one embodiment, Dialog elements identify the portions of the TML document that communicate with a user. Within a Dialog element, Text Elements and For-Each Elements define text that is to be read to a user. Input Elements identify the portion of a Dialog Element that are interactive with a user. Within an Input Element, Option Elements and Prompt Elements may define text to be read to a user, but they also request input from a user. According to one embodiment, one or more Option Elements may include text that requests that a user choose one or more items from a list of choices defmed by the Option Elements using the telephone keypad or by speaking a response. According to another embodiment, a Prompt Element may include text that requests free-form input from a user, e.g., by entering alpha-numeric characters using the telephone keypad or speaking a response.

With respect to the use of spoken responses, according to one embodiment, speech recognition technology is used to enable a user to respond to a prompt element or to select an option element verbally by saying a number, e.g., "one.". The verbal response is recognized and used just as a keypress would be used. According to another embodiment, the user may provide a free form verbal input. For example, a prompt element may request that a user enter, e.g., the name of a business. In response the user speaks the name of a business. That spoken name is then resolved against predetermined standards to arrive at the input. Word spotting and slot filling may also be used in conjunction with such a prompt to determine the user input. For example, a prompt may request that the user speak a date and time, e.g. to choose an airline flight or to make a restaurant reservation. The user's spoken response may be resolved against known date and time formats to determine the input. According to another embodiment, a prompt is used to request input using natural language. For instance, in conjunction with a voice service to be used to make travel plans, instead of having separate prompt elements request input for flight arrival, departure dates and locations, a single natural language prompt may ask, "Please state your travel plan." In response, the user states 'I'd like to go from Washington D.C. to New York city on the $3^{rd}$ of January and return on the $3^{rd}$ of February. This request would be processed using speech recognition and pattern matching technology to derive the user's input.

The TML document may comprise Error element and System-Error Elements. According to one embodiment, an Error element includes text that notifies a user of an invalid input. The System-Error element may also include text that notifies a user that the the system has experienced an undefined event, e.g., a non-response to an Input Element.

Figure 9:
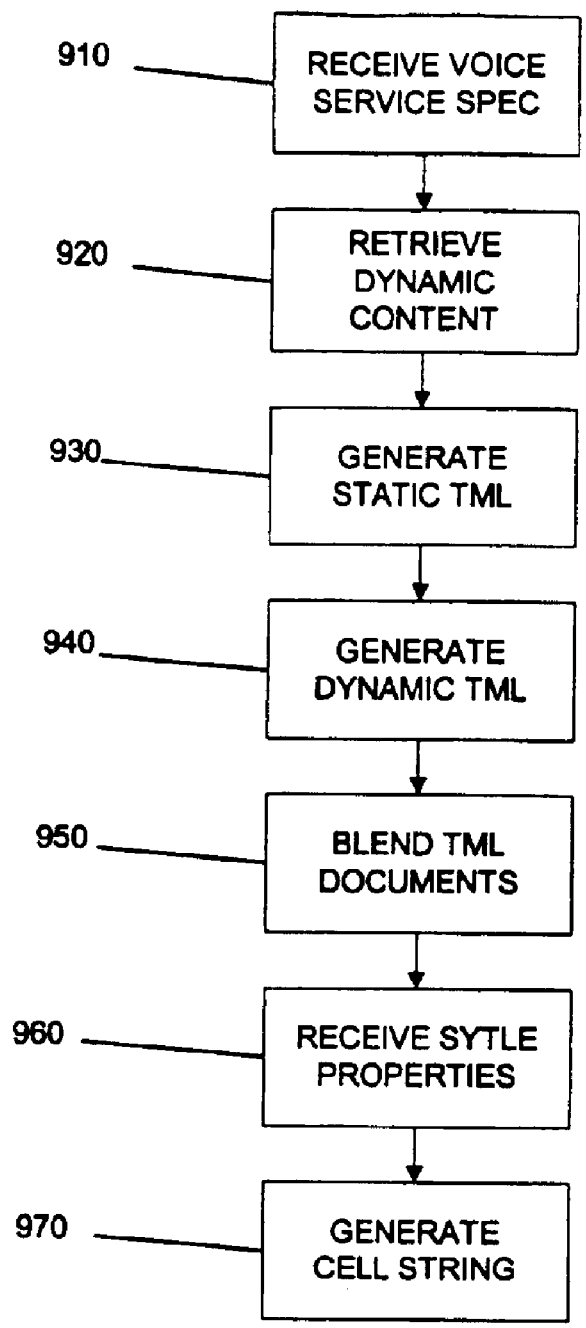
FIG. 9 is a flow chart of a method for generating an AVP according to one embodiment of the present invention.

A method for generating TML and formatting an active voice page is shown in FIG. 9. Although the method is explained as a sequence of steps, the sequence is not limited to any particular order. The method begins with receipt of a voice service specification (step 910). According to one embodiment, the specification is generated by an administrator and may include an ordered specification of TML elements that are to be included in the AVP, identifications of reports (or other data) that are to be included in the AVP, and transformations that are to be used to convert the reports to TML. According to one embodiment, the XSL stylesheets are used to transform report content to TML as is explained below. For a simple voice service, for example one that just delivers a static message to the user, the specification might comprise only the ordered specification. For more complex voice services, in addition to the ordered specification, a number of reports and style sheets may also be included.

Report content for the reports specified by the voice service specification is retrieved from a database or other data repository in step 920. Reports are preferably received in a format that may be converted to TML through application of an XSL stylesheet or similar transformation method. According to one embodiment, reports are received in XML format. According to a specific embodiment, report content is received in DSS Grid format, a proprietary form of XML used by MicroStrategy, Inc.

Static TML is generated from the specification of the voice service in step 930.

The voice service specification contains a number of items that are resolved into TML without regard to any additional content. That is, the ordered specification of the voice service specifies a number of TML elements that are to be a part of the voice service. Each of these elements may further include, for example, static text, plain text reports, certain macros (e.g. RecipientList), and text files that are incorporated into the TML without the need for any transformation. According to one embodiment, a base TML document is generated in step 930 by resolving the voice service specification into TML. According to this embodiment, the base TML document comprises the call structure without any dynamic content.

Dynamic TML is generated in step 940. A voice service will also contain a number of items the content of which change from execution to execution. For example, as stated above, a voice service may include one or more reports generated by a database or other data repository. For each such report, dynamic TML is generated by application of an appropriate transformation. According to one embodiment, such reports are received in XML and transformed into dynamic TML through application of an XSL stylesheet. According to another embodiment, the voice service specification received in step 910 also includes a transformation, such as an XSL stylesheet that is used to convert the report content received in XML into TML. According to one embodiment, in step 940, an XSL stylesheet is applied to each report to generate a separate TML document from each report.

The static TML document is blended with the dynamic TML documents to generate a single call structure or AVP in step 950. According to one embodiment, the documents are added in a cumulative fashion. For example, if two TML documents are to be blended, and each one contains a DIALOG element with the name "main", the blended TML document will have one DIALOG with the name "main", and will include the contents of the DIALOG elements from both documents. The following simple example may help illustrate this blending. Assume documents 1 and 2 contain the following DIALOGs:

from document 1:
<DIALOG name="main">
<OPTION>Press 1</OPTION>
</DIALOG>
from document 2:
<DLALOG name="main">
<OPTION>Press 2</OPTION><<DIALOG>
The result of these two documents being blended will be the following:
<DLALOG name="main">
<OPTION>Press 1</OPTION>
<OPTION>Press 2</OPTION>
</DIALOG>

According to one embodiment, priority is assigned to elements that will be blended to determine ordering of the blended TML. Other methods of determining order in blended elements are possible.

Blending enables a report to affect many different DLA-LOGs in the base document. Thus a report does not have to be tied to a single location within an active voice page. Accordingly, dynamic content from a report or other database repository may be used multiple times within an active voice page, but need only be generated a single time.

Style properties are received in step 960. The method and system of the present invention generate AVPs that deliver voice services. In the AVPs, the TML elements discussed above determine the content and structure. According to one embodiment, delivery of the content and structure is determined by a set of style properties that control such variables as the type of voice (male or female) and language (English, German, Spanish, etc.) that will be used to deliver the content or the location (i.e., telephone number) to which the content of the voice service will be delivered These types of variables are determined by a set of style properties that are unique to each recipient of a voice service. According to one embodiment, when the method and system of the present invention are used in conjunction with the voice service system of FIGS. 1–8, the style properties are generated in personalization engine based on user choices.

The blended TML document and the style properties are combined into a call request and sent to a call server for processing in step 970. According to one embodiment, the blended TML document and the style properties are combined into a call string. According to one particular embodiment, when the method and system of the present invention are used in conjunction with the voice service system of FIGS. 1–8, the blended TML document and the style properties are combined into a call string and deposited in a call database 1811 of call server 18. Other methods of combining the blended TML document and style properties are possible.

Figure 10:
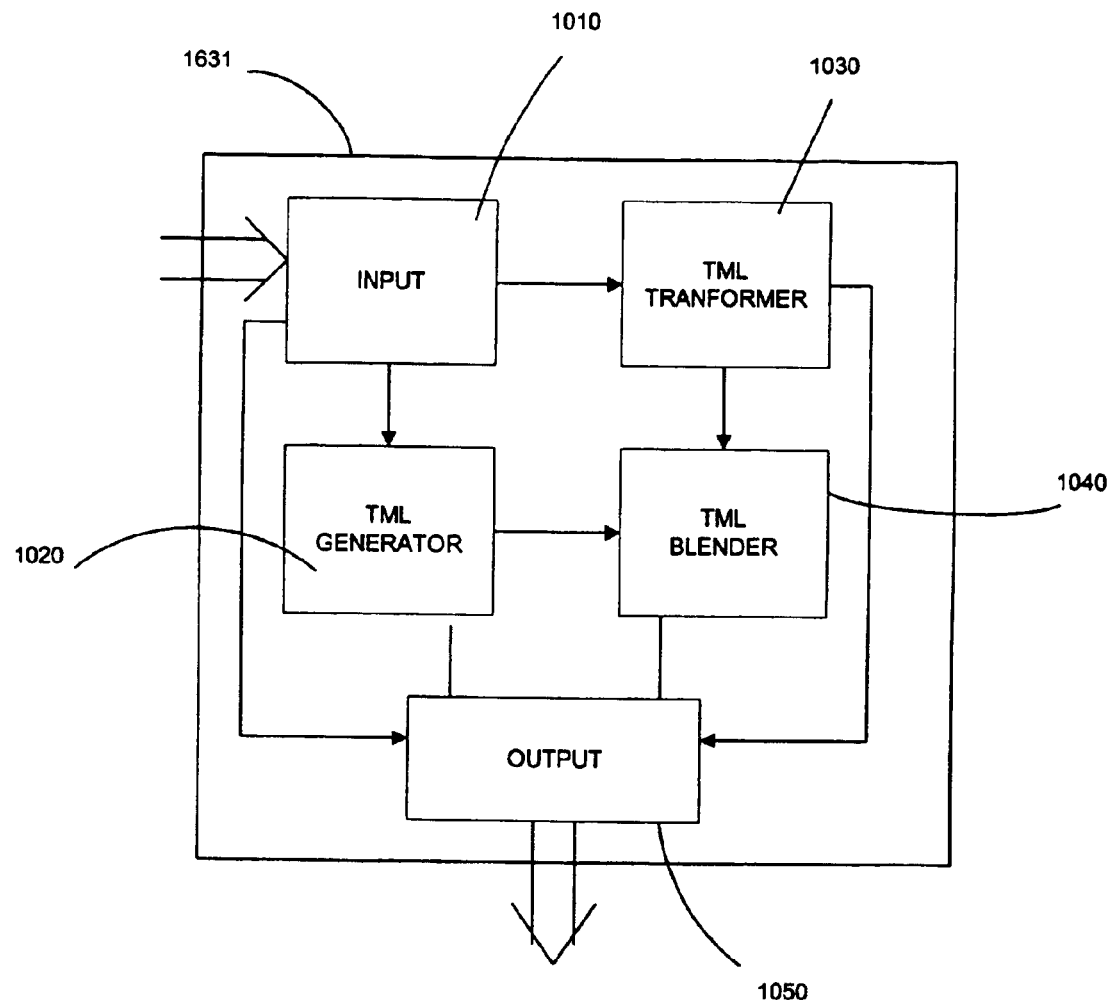
FIG. 10 is a block diagram of TML engine and report formatter according to one embodiment of the present invention.

FIG. 10 shows a TML engine and report formatter 1631 according to one embodiment of the present invention. TML engine and report formatter 1631 comprises a number of functional modules that operate together to generate an AVP. According to the embodiment shown in FIG. 10, TML engine and report formatter 1631 comprises an input module 1010, TML generator 1020, TML transformer 1030, TML blender 1040 and output module 1050. The functions of these modules could be combined or further divided as desired According to one embodiment, each of the modules comprises a software module that is implemented by a microprocessor. According to another embodiment, the modules described below could be implemented in firmware or hardware.

Input module 1010 operates to receive and forward all data input to the report formatter. According to one embodiment, when operating in conjunction with the voice service system shown in FIGS. 1–8, input module 1010 receives a voice service specification from voice service wizard 1616, data reports from database system 12 and style properties from personalization engine 1632. Other embodiments are possible.

TML generator 1020 receives an ordered specification of elements from input module 1010 and generates static TML for the voice service. According to one embodiment, TML generator 1020 receives input from input module 1010 and generates the base TML document for the voice service as is discussed in FIG. 9, step 930. According to one particular embodiment, when operating in conjunction with the voice service system of FIGS. 1–8, TML generator 1020 comprises a software module that generates TML from an ordered specification of elements such as the output of voice service wizard 1616.

TML transformer 1030 receives reports and transformations and generates TML from the reports. According to one embodiment, TML transformer 1030 comprises a software module that receives reports and, transformations operative to transform those reports into TML, from input module 1010. TML transformer 1030 then applies the transformations to the reports to generate TML. According to one embodiment, the reports comprises XML reports and the transformations comprise XSL stylesheets. According to one particular embodiment, when the TML engine and report formatter 1631 is operating in conjunction with the voice service system of FIGS. 1–8, TML transformer receives database reports from database system 12 and transforms them into TML using XSL stylesheets.

TML blender 1040 receives TML documents from TML generator 1020 and TML transformer 1030 and generates a single blended TML document. According to one embodiment, TML blender 1040 comprises a software module that blends a number of TML documents together in accordance with a defined set of rules.

Output module 1050 receives a single TML document and a set of style properties and generates a combined call request. According to one embodiment, output module 1050 receives a single TML document from either TML generator 1020, TML transformer 1030, or TML blender 1040 depending on the content of the particular voice service for which TML is being generated. According to a particular embodiment, when the present invention is used in conjunction with the voice service system of FIGS. 1–8, output module 1050 combines the TML document and the style properties and generates a call string that is deposited in call database 1811 of call server 18.

A detailed example will now be provided to help explain the operation of XSL stylesheets and the system and method of the present invention. As mentioned above, the Extensible Stylesheet Language is a language used to write stylesheets that transform XML documents into other XML documents or plain text. XML documents comprise hierarchically organized nodes. The XSL processor provides a mechanism for navigating through these nodes and for applying certain transformations to them. These transformations are specified in a markup language that adheres to the XML format. XSL can be applied to any kind of XML-based markup, even to XSL itself.

XSL is extensible because in addition to built-in elements, XSL allows the use of scripts. Scripts are programs that can provide additional functionality that may not be possible with standard XSL elements. Some elements of XSL include:

| | |
|---|---|
| <xsl:stylesheet> | Root node of any XSL document |
| <xsl:template> | Template to be applied to a specific section of the source document |
| <xsl:apply-templates> | Directs the XSL processor to search templates for all nodes in a specific section and to execute them |
| <xsl:value-of> | Retrieves value of a specific node |
| <xsl:for-each> | Iterates through all nodes in a specific section |

At a high level, XSL navigates through source data of the XML document that is to be transformed. XSL documents should conform to all XML specifications. That means that the XSL documents are hierarchically organized and have a single top level node. In Listing 1, this is the node <xsl:stylesheet>. It contains templates that can be applied to the source document:

<xsl:stylesheet xmlns:xsl="http://www.w3.org/TR/WD-xsl">
    <xsl:template match="/">
    |matched the root.
    </xsl:template>
    </xsl:stylesheet>

Listing 1 (XSL); Simple XSL Stylesheet with a Single Template

An XSL processor applies a stylesheet to an XML document and selects a node as current context and goes through all templates in the XSL document to find one that matches the selected node. At the beginning, the context is the root of the XML document, which can be conceptualized as the whole document, or as some invisible node that completely contains all other nodes. The <family> node in Listing 1 is the first child of the root of that XML document. It is important to realize that the <family> node may not be the root node itself.

When the context has been set, the XSL processor goes through all templates in the XSL, for example, starting at the bottom and working up to the top, until it finds the first template that matches the currently selected node. In the present example, there is only one template, and it matches the expression "/", which stands for the root of the document. Since the current context is the root of the document, this template can be applied, and all text inside the template is written to the output document.

To illustrate this, consider the following XML.

<family>
    <parent>A parent.</parent>
    <parent>
    Another parent.
    <child>The first child.</child>
    <child>The second child></child>
    </parent>
    </family>

Listing 2 (XML): Simple XML Document

If the XSL from Listing 1 is applied to the XML in Listing 2, the output is:
    |matched the root.

Listing 3 (plain text); Result of XSL from Listing 1 Applied to XML from Listing 2.

<xsl:stylesheet xmlns:xsl="http://www.w3.org/TR/WD-xsl">

```
<xsl:template match="/">
|found the root.
</xsl:template>
<xsl:template>
|will always fire.
</xsl:template>
</xsl:stylesheet>
```

Listing 4 (XSL): Stylesheet with Universal Template that Overrides all Other Templates In Listing 4, the first template (counted from the bottom) has no "match" condition. This means that the first template may always be used. Hence, the other template, that matches the root of the document, may not be used. Preferably, these types of conditions are not used. In most XSL documents, general templates are at the top of the document, and more specific ones are at the bottom. The template without any "match" conditions at all should be the last (e.g., the topmost) template in the document, because it may always be used and therefore prevent any templates above it to not be executed.

|will always fire.

Listing 5 (plain text): Result of XSL from Listing 4 Applied to XML from Listing 1

Typically, an XSL template contains text that is directly written to the output document. But it can also contain instructions for the XSL processor to retrieve values of XML nodes, or to apply more templates to the other sections of the document declare stylesheet <xsl:stylesheet mlns:xsl="http://www.w3.org/TR/WD-xsl"> match root node <xsl:template match="/">
|found the root.
apply templates to <xsl:apply-templates />
children of root </xsl:template>
match "family" node <xsl:template match="family">
|found the family.
apply templates to <xsl:apply-templates/>
children of "family"</xsl:template>
match "parent"<xsl:template match="parent">
|found a parent.
apply templates to <xsl:apply-templates/>
children of "parent"</xsl:template>
match "child"<xsl:template match="child">
|found a child.
</xsl:template>
end of stylesheet </xsl:stylesheet>

Listing 6 (XSL): Stylesheet that Navigates the Complete Document of XML 1 with Explicit Calls.

In Listing 6, the root template uses the command <xsl:apply-templates/>. This tells the XSL processor to go through all nodes that can be found in the current context, set them as new context, and find a matching template for them.

Hence, it first fmds the root The root has one child, the <family> element. It finds the template for this element and applies it. <family> has two children, the <parent> elements, and one of the parents contains some <child> elements.

Here is the output of this transformation:
|found the root
|found the family.
|found a parent.
|found a parent
|found a child.
|found a child.

Listing 7 (plain text): Result of XSL (Listing 6) Applied to XML (Listing 2)

The XSL processor continues until there is no further node to search, and no further instruction to apply. This does not mean that it has used all the templates in the XSL stylesheet. For example, if the template of the root node did not contain the statement <xsl:apply-templates />, execution would stop at this template, and the output would only contain "I found the root.".

Understanding how different templates call each other while letting the XSL processor navigate through the source XML document is an important concept behind XSL.

```
<xsl:stylesheet xmlns:xsl="http://www.w3.org/TR/WD-xsl">
<xsl:template><xsl:apply-templates /></xsl:template>
<xsl:template match="child">
A child node: <xsl:value-of/>
<xsl:template>
</xsl:stylesheet>
```

Listing 8 (XSL): Stylesheet with Generic Rule at the Top for Guaranteed Descent

Very often, users will see constructs as in Listing 8, where the topmost rule is something like "<xsl:template><xsl:apply-templates /></xsl:template>". This tells the XSL processor that whenever it arrives at the top because no matching templates for the current context were found, it should go through all children of the current context and try to find a match for them. Without the universal descent rule, the processor would stop here, even if there are templates that match nodes further down in the hierarchy. With this rule, execution continues.

In the child template of Listing 8, the instruction <xsl:value-of />retrieves the text of the current context, which in this case is the text contained in the selected child node.

The output of Listing 2+Listing 8 is:

A child node: The first child.

A child node: The second child.

Listing 9 (plain text): Result of XSL (Listing 8) Applied to XML (Listing 2)

DSS Grids can be used to present a database or other report in an XML format DSS Grids are structured in a way that closely reflect an underlying tabular format The following table contains a brief overview of all the elements that may be used to encode database or other reports in DSS Grid format.

| Node | Description |
| --- | --- |
| <dssgrid> | The highest level node which corresponds to one grid report. |
| <attr> | Represents an agent attribute. |
| <column-header> | Represents one level of column header. |
| <upper-left> | Only appears inside the first <column-header>, represents an upper-left header cell in the grid. |
| <ae-id> | ID of an agent attribute node. |
| <ae-desc> | Attribute node description. |
| <mh> | Metric header. |
| <row> | One row in the report. |
| <row-header> | Contains the row-header section inside a row. |
| <mv> | Metric value. |
| <st-header> | Subtotal header. |
| <st> | Indicates that the metric value inside this node is a sub total value. |
| <gt-header> | Represents a grand total header. |

-continued

| Node | Description |
|---|---|
| <gt> | Indicates that the metric value inside this node is a grand total value. |

To see how these elements are used to represent a report, consider the following example:

| Product | Items in Stock | # below Reorder Level | Urgency |
|---|---|---|---|
| Hood Stash Jacket | 24 | 6 | 1 |
| Greenwich Check Shirt | 5 | 35 | 3 |

This report contains one attribute, the Product. It has two attribute elements, which are "Hood Stash Jacket" and "Greenwich Check Shirt". Three metrics are in the report, which are "Items in Stock", "# below Reorder Level", and "Urgency". Each row shows the metric values for one of the attribute elements.

The XML for a report is marked by the top level node <dssgrid> which contains three major sections. First, all attributes are listed. Second, the column headers of the table are listed. Finally, all individual rows of the report are listed. Each row contains a row header indicating a specific attribute node, and all metric values belonging to it. This section makes up the most part of the XML document:

```
top level node <dssgrid ns="A">
attribute list    <attr n="1" url="Product">Product</attr>
column headers     <column-header>
    <upper-left rows="1">Product</upper-left>
metric headers       <mh n="1" cols="1">Items in Stock</mh>
    <mh n="2" cols="1"># below Reorder Level</mh>
    <mh n="3" cols="1">Urgency</mh>
        <column-header>
    individual rows    <row>
        <row-header>
    attribute-node <ae-desc n="1" rows="1" idval="1" idurl="1">Hood Stash Jacket</ae-desc>
        description
            </row-header>
        metric values <mv n="1" uf="24">24</mv>
            <mv n="2" uf="6">6</mv>
            <mv n="3" uf="3">1</mv>
            </row>
            <row>
            <row-header>
            <ae-desc n="1" rows="1" idval="2" idurl="2">Greenwich Check Shirt</ae-desc>
            </row-header>
            <mv n="1" uf="5">5</mv>
            <mv n="2" uf="35">35</mv>
            <mv n="3" uf="1">3</mv>
            </row>
            </dssgrid>.
```

Listing 10 (XML): Report in XML Format

An XSL stylesheet may now be used to transform this report into a TML document that can deliver the information in the report to a user on the telephone. An appropriate XSL stylesheet is first developed The XSL processor may start by searching for a template that matches the root of the document. It may be desirable to first add a template that matches the root and instructs the processor to apply templates to the children of the root. The only child of the document root is the <dssgrid> node. Hence, the next template matches this node. This will add the opening and closing <TML> tags and a single dialog with some text:

```
<xsl:stylesheet xmlns:xsl="http://www.w3.org/TR/WD-xsl">
<xsl:template match="/"><xsl:apply-templates/></xsl:template>
<xsl:template match="dssgrid">
<TML>
<DIALOG name="Person">
<TEXT>Hello. This is your inventory update.</TEXT>
</DIALOG>
</TML>
</xsl:template>
<xsl:stylesheet>
```

Listing 11 (XSL): Stylesheet that Creates a TML Dialog

If these two templates are put into a stylesheet and run against an XML report, the result is the following TML document that reads a short message to the user and then hangs up.

```
<TML>
<DIALOG name="Person">
<TEXT>Hello. This is your inventory update.<EXP>
</DIALOG>
</TML>
```

Listing 12 (TML): Small but Complete TML Document Generated with XSL (Listing 11) Applied to XML (Listing 10)

Now an explanation will be provided on how to retrieve data from the report, allow the user to navigate through the retrieved data, present the user with a list of available products and let the user choose one to hear more information about the available products. The first line to add to the XSL stylesheet in Listing 11 retrieves the name of the first column header, which is "Product" in this case:

<TEXT>Select a <xsl:value-of select="column-header/upper-left[0]"/>.</TEXT>.

To generate a list of products to choose from, it is preferable to retrieve the row-headers from each row and present them as TML Option elements to the user as follows:

```
<INPUT>
    <xsl:For-Each select="row/row-header/ae-desc">
        <OPTION><xsl:attribute    name="next"><xsl:value-of
select="@idval"/><xsl:attribute>Press \f to hear
        more about <xsl:value-of/>s.</OPTION>
    </xsl:For-Each>
</INPUT>
```

The <xsl:for-each select="pattern"> element instructs the XSL processor to retrieve all elements that match the XSL pattern specified in the "select" attribute. The current context serves as the basis for this search If no "select" pattern is specified, <xsl:For-Each>simply goes through all children of the current element.

In this case, the "For-Each" pattern goes through all row-headers that can be found and retrieves the attribute description of each row-header. The output of the previous XSL segment will be a TML document that presents the user with a list of available products and enables the user to choose one to hear more information about it.

```
<INPUT>
<OPTION next="1">Press \f to hear more about Hood
    Stash Jackets.</OPTION>
<OPTION next="2">Press \f to hear more about Green-
    wich Check Shirts.</OPTION>
</INPUT>
```

Next, it may be desirable to define the jump targets for these options. These may be a set of individual TML Dialog elements, one for each row in the report The decision to create one dialog for each row is completely arbitrary, and that there are many other ways of displaying the same data. The following is a template for individual rows that creates a dialog element for each row. The name attribute of the Dialog node is constructed out of the ID value of the attribute element of that row. After the Dialog node name has been created, a single TEXT element is inserted which contains

```
<xsl:template match="row">
<DIALOG>
    <xsl:attributename="name"><xsl:value-ofselect="row-header/ae-
desc/@idval"/><xsl:attribute>
    <TEXT><xsl:apply-templates select="mv"></TEXT>
        </DIALOG>
    </xsl:template>
```

Next, it may be desirable to add the actual information contained in the row. This section of the XSL is customized to the actual content of the report. It retrieves the name of the current product and converts the inventory information into a sentence. This is done by retrieving the individual metric values of the current row and inserting them into the text, or by selecting different sentences based on the actual numeric value. Note that the metric values are retrieved by their number. For example, the pattern "mv[@n=2]" tells the XSL processor to select the metric value where the "n" attribute has the value "2". When writing an XSL stylesheet for a report, it is helpful to know how the report is structured, and in which order the metrics are arranged.

```
<xsl:template match="mv[@n=1]"> You have
    <xsl:value-of /><xsl:value-of select="../row-headeriae-
    desc"/>s in
stock. </xsl:template>
<xsl:template match="mv[@n=2]"> This is <xsl:value-of
    />items below reorder level. </xsl:template>
<xsl:template match="mv[@n=3]">
<xsl:choose>
<xsl:when test=".[. $ge$ 3]">It is very urgent that you
    restock this item immediately.</xsl:when>
<xsl:otherwise>Please restock this item soon.</
    xsl:otherwise>
</xsl:choose>
</xsl:template>
```

The output of this XSL segment for a single row will be something like the following:

<TEXT>You have 24 Hood Stash Jackets in stock. This is 6 items below reorder level. Please restock this item soon. </TEXT>

The last template contains the conditional statement <xsl:choose> that selects different instructions depending on some conditions. The next statement <xsl:when test=.[. $ge$ 3]"> means: If the current context matches the test pattern, use this instruction. Otherwise, use the instruction in the <xsl:otherwise> condition. The test pattern is matched if the current context meets the filter criterion that its value is greater or equal to "3". Effectively, this template produces one sentence if the urgency level is below 3, and another sentence when the urgency is 3 or higher.

The TML document generated is:

```
Start document <TML>
First Dialog to be executed <DIALOG name="Person">
    <TEXT>Hello. This is your inventory update.</
    TEXT>
    <TEXT>Select a Product.</TEXT>
Menu of products <INPUT>
    <OPTION next="1">Press \f to hear more about Hood
        Stash Jackets.</OPTION>
    <OPTION next="2">Press \f to hear more about
        Greenwich Check Shirts.</OPTION>
    </INPUT>
    </DIALOG>
Footer Dialog with <DIALOG name="footer">
navigational options
    <INPUT>
    <OPTION>Press   \f    to    repeat    this
        information.<OPTION>
    <OPTION next="back">Press \f to go back to the
        previous menu.</OPTION>
    </INPUT>
    </DIALOG>
First row: Hood Stash Jackets <DIALOG name="1">
    <TEXT> You have 24 Hood Stash Jackets in stock.
        This is 6 items below reorder level. Please restock
        this item soon.</TEXT>
append footer <INPUT default="footer"/>
    </DIALOG>
Second row: Greenwich <DIALOG name="2">
Check Shirts
    <TEXT> You have 5 Greenwich Check Shirts in stock.
        This is 35 items below reorder level. It is very urgent
        that you restock this item immediately.</TEXT>
append footer <INPUT default="footer"/>
    </DIALOG>
Conclude document </TML>
```

Listing 13 ( TML): Complete TML Document Generated for the Inventory Report and the Stylesheet In Stockmarket.xsl In some cases it may be desirable to convert a report into plain text that can be inserted into a TML elements in an AVP. The XSL stylesheet above can be easily modified to produce a plain text version of the report Note that it no longer produces TML tags, and that the top part is just a universal template that redirects the XSL processor to search matching templates for the children of the current node:

```
<xsl:stylesheet xmlns:xsl="http://www.w3.org/TR/WD-
    xsl">
<xsl:template><xsl:apply-templates/></xsl:template>
<xsl:template match="mv[@n=1]"> <xsl:value-of
    select="./row-header/ae-desc"/>s: <xsl:value-of/>.
</xsl:template>
</xsl:template match="mv[@n=2]"> This is <xsl:value-
    of />items below reorder level. </xsl:template>
<xsl:template match="mv[@n=3]">
<xsl:choose>
    <xsl:when test=".[. $ge$ 3]">It is very urgent that you
        restock this item immediately. </xsl:when>
    <xsl:otherwise>Please restock this item soon.
        <xsl:otherwise>
```

```
</xsl:choose>
    </xsl:template>
</xsl:stylesheet>
```
Listing 14 (XSL): Simplified Stylesheet that Converts Inventory Report into Plain Text Applying this XSL stylesheet against the inventory report results in the following presentation that may be embedded into existing text.

Hood Stash Jackets: 24. This is 6 items below reorder level. Please restock this item soon.

Greenwich Check Shirts: 5. This is 35 items below reorder level. It is very urgent that you restock this item immediately.

Listing 15 (Plain Text): Plain Text Version of Inventory Report

The foregoing describes a report with a single attribute and how to convert it into TML or into plain text. Since each row of the report differs from the outer rows only with respect to one thing, it is easy to write XSL for it. A more involved report may be used. For example, consider this report:

| Year | Store | Department | Total Market Sales ($) | Merchandise Sales ($) | Total Regional Sales ($) |
|---|---|---|---|---|---|
|  |  | TOTAL | $52,952,637.80 | $20,072,630.25 | $100,363,151.26 |
| 1993 | SUBTOTAL |  | $24,289,371.51 | $ 9,205,052.67 | $ 46,025,263.35 |
|  | Boston | SUBTOTAL | $ 3,310,959.09 | $ 1,661,067.49 | $ 4,949,324.61 |
|  |  | Womens Clothing | $ 843,780.49 | $ 483,040.63 | $ 1,164,980.41 |
|  |  | Mens Clothing | $ 1,255,097.46 | $ 563,722.98 | $ 1,956,264.79 |
|  |  | Sporting Goods | $ 1,212,081.13 | $ 614,303.88 | $ 1,828,079.41 |
|  | Greenwich | SUBTOTAL | $ 3,310,959.09 | $ 838,168.50 | $ 4,949,324.61 |
|  |  | Womens Clothing | $ 843,780.49 | $ 189,295.25 | $ 1,164,980.41 |
|  |  | Mens Clothing | $ 1,255,097.46 | $ 350,739.87 | $ 1,956,264.79 |
|  |  | Sporting Goods | $ 1,212,081.13 | $ 298,133.38 | $ 1,828,079.41 |
| 1994 | SUBTOTAL |  | $28,663,266.29 | $10,867,577.58 | $ 54,337,887.91 |
|  | Boston | SUBTOTAL | $ 3,855,842.54 | $ 1,946,893.53 | $ 5,796,039.47 |
|  |  | Womens Clothing | $ 1,065,090.31 | $ 615,419.83 | $ 1,455,902.83 |
|  |  | Mens Clothing | $ 1,386,808.04 | $ 644,142.24 | $ 2,203,014.24 |
|  |  | Sporting Goods | $ 1,403,944.19 | $ 687,331.46 | $ 2,137,122.41 |
|  | Greenwich | SUBTOTAL | $ 3,855,842.54 | $ 977,189.02 | $ 5,796,039.47 |
|  |  | Womens Clothing | $ 1,065,090.31 | $ 238,704.98 | $ 1,455,902.83 |
|  |  | Mens Clothing | $ 1,386,808.04 | $ 382,120.17 | $ 2,203,014.24 |
|  |  | Sporting Goods | $ 1,403,944.19 | $ 356,363.87 | $ 2,137,122.41 |

This report is much more complex than the previous one. It has three attributes, and it also shows totals and subtotals. To identify a specific row, a user should know the level of aggregation (e.g., if it is a total, or a terminal value) and to which intersection of attributes it applies.

According to one embodiment, this report would be transformed into plain text line by line and delivered verbally.

In the year 1993, in the store Boston, the Womens Clothing department had Total Market Sales of $843,780 . . .

In the year 1993, in the store Boston, the Mens Clothing department had Total Market Sales of $1,255,097 . . .

In the year 1993, in the store Boston, the Sporting goods department had Total Market Sales of $1,212,081 . . .

A problem with this approach is the large amount of redundancy, since all three attributes are repeated at all times, even if only the leftmost attribute is changing for the next line. It may be easier to eliminate this redundancy and avoid repeating that the current year is 1993 and the store is Boston. This can be done by breaking the report down into a hierarchy of dialog nodes so that each contains a reasonably small piece of information. The user can then navigate through this structure and listen to the specific departments that he or she is interested in.

An example of the call flow of such a structure may be as follows:

1. Select a year—1993 or 1994—select 1993

2. Select a store—Boston or Greenwich—select Boston

3. Select a department—Womens Clothing, Mens Clothing, or Sporting Goods—select Mens Clothing 4. Mens Clothing had Total Market Sales of $1,255,097.46, Merchandise Sales of $563,722.98, and Total Regional Sales of $1,956,264.79.

---

The XML of this report is:
```
top level element      <dssgrid ns="A">
attribute list <attr n="1" url="Year">Year</attr>
    <attr n="2" url="Store">Store</attr>
    <attr n="3" url="Department">Department</attr>
column headers      <column-header>
    <upper-left rows="1">Year</upper-left>
    <upper-left rows="1">Store</upper-left>
    <upper-left rows="1">Department</upper-left>
    <mh    n="1">Total Market Sales ($)</mh>
```

-continued

```
        <mh n="2" cols="1">Total Merchandise Sales ($)</mh>
        <mh n="3" cols="1">Total Regional Sales ($)</mh>
      </column-header>
  individual rows    <row>
      <row-header>
  grand total header   <gt-header cols="3">
        <"row-header>
  grand total metric values   <gt><mv   n="1"
uf="52952637.7992">$52,952,637.80</mv></gt>
        <gt><mv n="2"
        uf="20072630.2512">$20,072,630.25</mv></gt>
        <gt><mv n="3"
        uf="100363151.256">$100,363.151.26</mv></gt>
      </row>
      <row>
      <row-header>
  "1993"    <ae-desc n="1" rows="9" idval="1993"
  idurl="1993">1993</ae-
desc>
  subtotal header    <st-header cols="2"/>
      </row-header>
  subtotal of 'Year'   <st><mv     n="1"
uf="24289371.5505">$24,289,371.51 </mv></st>
        <st<>mv n="2" yf="8295952,6696">$9,205,052.67</mv></st>
        <st><mv n"3" uf="46025263.348">$46,025,263.35</mv></st>
      </row>
      <row>
      <row-header>
      <ae-desc n="1"
      "rows="0"idval="1993"idurl="1993">1993</ae-desc>
  "Boston"   <ae-desc n="2"
  rows="4"idval="1" idurl="1">Boston</ae-desc>
      <st-header cols="1"/>
      </row-header>
  subtotal of 'Store'
  <st><mvn="1"yf="3310959.0852">$3,310,959.09</mv></st>
        <st><mv n="2" uf="1661067.4907">$1,661,067.49</mv></st>
        <st><mv n="3" yf="4949324.6089">$4,949,324.61 </mv></st>
      </row>
      <row>
  bottom level row ('Department') <row-header>
      <ae-desc n="1"
      rows="0" idval="1993" idurl="1993">1993</ae-desc>
      <ae-desc n="2"
      rows="0" idval="1" idurl="1">Boston</ae-desc>
  "Womens Clothing"
  <sr-desc n="3" rows="1" idval="1" idurl="1">Womens
        Clothing</ae-desc>
      </row-header>
  atomic level metric values <mv n="1"
  uf="843780.4886">$843,780.49</mv>
        <mv n="2" uf="483040.6309">$483,040.63</mv>
        <mv n="3" uf="1164980.4111">$1,164,980.41</mv>
      </row>
  rest of XML is omitted for [. . .]
  brevity
      </dssgrid>
```

Listing 16 (XML): Department Report in XML Format

Note that the individual rows of the report are presented in a disconnected sequence that emphasizes the layout of the report, but not the semantic relationships of its cells. DSS Grid XML provides highly formatted data that is only one step away from the final presentation format. Reports in DSS Grid format are almost finished, and the XSLs that convert grids just determine the appearance of the report but are not meant to change its layout.

That means that it is easy to tell where each cell is located if this report was to be converted into a table, for example to be displayed on a web page. However, it may be difficult to determine that there are 3 departments that belong to Boston in 1993. According to one aspect of the invention, a solution to this can be provided. Note that the row headers span a number of rows. For example, "1993" applies to a total of 9 rows. This is implemented such that the first occurrence of the row header "1993" has the attribute rows="9":

<ae=desc n="1" rows="9" idval="1993" idurl="1993">1993</ae-desc>

This node means "Attribute-element description with the value "1993", spanning the next 9 rows. For the remaining 8 rows of the nine rows that belong to "1993", the "rows" attribute is set to 0. Hence, the first occurrence of a row header indicates the number of rows to which this header applies, and the other occurrences always have rows="0". Finding those row headers where the "rows" attribute is not zero makes it possible to pick out the different values of each attribute without repetition. Together with the "n" attribute, which indicates the column to which this row header applies, an XSL can be written that extracts the hierarchical structure out of the source document.

A pseudo-code version of an algorithm for traversing the source XML hierarchically is:

```
for each child 1 of root where child 1.x>0
  for each child2 of root where child 1.a=child2.a and
      child2.y>0
    for each child3 of root where child1.a=child3.a and
        child2.b=child3.b and child3.z>0
      . . . do something . . .
    next child3
  next child2
next child1
```

Listing 17: Pseudo-code of Traversing Algorithm

This algorithm visits each row once, and the exact context of the row (i.e., the attributes to which it belongs) is known. Hence, option lists can be generated for each attribute at each level of aggregation. Here are a few XSL segments. The first one is to list all distinct elements of the first attribute ("Year"):

>xsl:for-each select="row/row-header(ae-desc[0]
  [@rows>0]]">

This line of XSL selects all row-headers where the 'rows' attribute of the first attribute-element description is greater than zero. Within the context of any of those row-headers, the XSL to list all distinct elements of the second attribute as children of the first one (e.g., all stores in a particular year) is this:

<xsl:for-each select="/dssgrid/row/row-header[ae-desc
  [0]/@idval=context( )/ae-desc[0]/@idval]
  [ae-deesc[1][@rows>0]] ">

This line finds all row-headers where the "idval" attribute of the first attribute-element description is equal to that of the current context row-header, and where the "rows" attribute of the second attribute-element description is greater than zero. Compare this to the second line of the pseudo-code version above.

In the same way, one can go one level deeper and select all distinct elements of the third attribute as children of the second attribute (e.g., all departments of a particular store):

<xsl:for-each select="/dssgrid/row/row-header[ae-desc
  [0]/@idval=context( )/ae-desc[0]/@idval]
  [ae-desc[1]/@idval=context( )/ae-desc[1]/@idval]
    [ae-desc[2][@rows>0]]">

This line fmds all row-headers that belong to the current context with the additional constraint that there must be a third attribute-element present, and that its "rows" attribute must be greater than zero. Effectively, that finds all lines under the subtotal.

By now it should be clear how to expand this scheme to reports with any number of attributes. With each additional attribute, a new join is added to the select pattern of the <xsl:for-each> element. This join matches the "idval" attribute of the attribute-element description of the column.

So to select all elements in the fourth column within the current context, the select pattern is expanded by the constraints (replacing the last constraint in the previous example):

[ae-desc[2]/@idval=context( )/ae-desc[2]/@idval] [ae-desc[3][@rows>0]]

The foregoing describes how to select a particular row within its context. This allows for example a voice service to say something about the Womens Clothing Department while it is clear that it is the Womens Clothing Department of Boston in 1993.

To generate individual DIALOG nodes in TML out of a report, the names of these DIALOGs may be dynamically generated. The main requirement for DIALOG names is that they must also be unique. By concatenating the ID values of each attribute, names can be created that are unique within a particular report For example, the name "1993-1-3" would uniquely identify the row whose row headers have the ids "1993", "1" and "3". This would be the Sporting Goods department of Boston in 1993.

One potential problem with this approach is that the uniqueness of these names cannot be guaranteed when several grids are combined into a single TML document, using several distinct XSLs. If two DIALOG names from different reports happen to be identical, unexpected merging of the corresponding DIALOG elements would occur. To prevent this, each report gets a different namespace, which is an attribute of the initial <dssgrid> tag. For example, <dssgrid ns="A"> means that this particular grid should prefix all of its private DIALOG names with "A". The system assigns single letters from A–Z and from a–z, and in the unlikely case that this is not enough, two-letter combinations may be used.

The command to retrieve the namespace string is:
<xsl:value-of select="/dssgrid/@ns"/>.

This can be inserted at most places in the XSL and will write the namespace string at the current insertion point in the output document. It can be easily integrated into a template that creates DIALOG names:

template for row-headers <xsl:template match="row-header">
    insert namespace <xsl:value-of select=/dssgrid/@ns"/>
    concatenate all attribute-elements <xsl:For-Each select="ae-desc">
    insert ID value <xsl:value-of select="@idval"/>
    insert "-" except after last value <xsl:if test="context( )[not(end( ))]">-</xsl:if>
    </xsl:For-Each>
    </xsl:template>

Listing 18 (XSL): XSL Segment Containing a Single Template that Creates Dialog Names This template generates names such as "A1993-1-3" or "B25-3". These names are used for the "name" attribute of DLKLOG elements, and for the "next" attribute of OPTION, PROMPT, and ERROR elements.

To insert a name anywhere in the XSL, "apply-templates" is called and the "select" pattern should point to the correct row-header. If the current context is the row-header whose name is to be inserted, that will be:

<xsl:apply-templates select="."/>

The XSL that transforms the department report into a voice service is set forth below. Other solutions may be used.
    <xsl:stylesheet xmlns:xsl="http://www.w3.org/TR/WD-xsl">
    <!-- empty template for the root to pass down execution --> root template <xsl:template match="/"><xsl:apply-templates/><xsl:template>
    <!-- start of main template -->
start of main template <xsl:template match="dssgrid">
start TML document <TML>
    <!-- insert initial DLALOG where processing begins. This could be a different name when the result is embedded into an existing TML document -->
start 'Person' DIALOG <DIALOG name="Person" remove="parent">
    <!-- give main overview by calling template for grand total -->
insert grand total <TEXT>You had <xsl:apply-templates select="/dssgrid/row/gt"/><TEXT>
    <!-- now define INPUT section of Dialog and list all elements of the first attribute to choose from -->
    <INPUT>
    <TEXT>
insert name of first attribute Select a <xsl:value-of select="column-header/upper-left[0]"/> for more information.
    >/TEXT>
    <!-- create one OPTION for each 'year' -->
insert OPTION for all <xsl:for-each select="row/row-header[ae-desc[0][@rows>0]]"
elements of first attribute
(Year)
    <OPTION>
generate DLALOG name for <xsl:attribute name="next"><xsl:apply-templates
'next' select"."/></xsl:attribute>
list attribute element Press \f to hear more about <xsl:value-of select="ae-desc[0]"/>.
    </OPTION>
    </xsl:for-each>
    </INPUT>
    </DIALOG>
insert default DIALOG <DIALOG name="footer">
with some standard
navigational OPTIONs
    <INPUT>
    <OPTION>Press \f to repeat this information.</OPTION>
    <OPTION next="back">Press \f to go back to the previous menu.</OPTION>
    <OPTION next="\t(parent)">Press \f to go one level up.</OPTION>
    </INPUT>
    </DIALOG>
    insert DIALOG for <xsl:For-Each select="row/row-header[ae-desc[0][@rows>0]]">
each Year
    <DIALOG store="parent='Person'">
generate name <xsl:attribute name="name"><xsl:apply-templates select="."/></xsl:attribute>
    <INPUT default="footer">
insert OPTION for each <TEXT>Select a <xsl:value-of select="/dssgrid/column-header/
element of second attribute upper-left[1]"></TEXT>
(Store)
    <xsl:for-each select="/dssgrid/row/row-header[ae-desc[0]/@idval=con-text( )/ae-desc[0]/@idval][ae-desc[1][@rows>0]]">

```
<OPTION>
generate name for 'next' <xsl:attribute name=
  "next"><xsl:apply-templates
attribute select="."/><xsl:attribute>
  For <xsl:value-of select="ae-desc[1]">, press \f.
  </OPTION>
</xsl:for-each>
</INPUT>
</DIALOG>
</xsl:for-each>
insert DIALOG for each Store <xsl:for-each select="row/
  row-header(ae-desc[0][@rows>0]]>
  <xsl:for-each select"/dssgrid/row/row-header[ae-desc
    [0]=con-text( )/ae-desc[0]][ae-desc[1][@rows>0]]">
  <DLALOG>
generate name <xsl:attribute name="name"><xsl:apply-
  templates select="."/></xsl:attribute>
insert parent for navigation <xsl:attribute name=
  "store">parent='<xsl:value-of
  select="ae-desc[0]/@idval"/>'</xsl:attribute>
  <TEXT><xsl:value-of select="ae-desc[1]"/> had
    <xsl:apply-templates select="./st"/></TEXT>
  <INPUT default="footer">
insert menu of all <TEXT>Select a <xsl:value-of select="/
  dssgrid/column-
departments header/upper-left[2]"/> for more information.
  </TEXT>
  <xsl:for-each
  select="/dssgrid/row/row-header[ae-desc[0]/@idval=
    context( )/ae-desc[0]/@idval][ae-desc[1]/@idval=con-
    text( )/ae-desc[1]/@idval]
  [ae-desc[2][@rows>0]]">
  <OPTION>
  <xsl:attribute name="next"><xsl:apply-templates select=
    "."/></xsl:attribute>
  For <xsl:value-of select="ae-desc[2]"/>, press \f
  </OPTION>
</xsl:for-each>
</INPUT>
</DIALOG>
</xsl:for-each>
</xsl:for-each>
insert DIALOG for each <xsl:for-each select="row/row-
  header[ae-desc[0][@rows>0]]">
department
  <xsl:for-each ' select"/dssgrid/row/row-header[ae-desc
    [0]/@idval=context( )/ae-desc[0]/@idval][ae-desc[1]
    [@rows>0]]">
  <xsl:for-each
  select="/dssgrid/row/row-header[ae-desc[0]/@idval=
    context( )/
    ae-desc[0]/@idval][ae-desc[1]/@idval=con-text( )/
    ae-desc[1]/@idval][ae-desc[2][@rows>0]]">
  <DIALOG>
generate name <xsl:attribute name="name"><xsl:apply-
  templates select="."/></xsl:attribute>
  <xsl:attribute name="store">parent='<xsl:value-of
  select="ae-desc[0]/@idval"/>-<xsl:value-of
  select="ae-desc[1]/@idval"/>'</xsl:attribute>
insert summary of all metric <TEXT><xsl:value-of select=
  "ae-desc[2]"/>had <xsl:apply-templates
values by calling row template select=".."/></TEXT>
  <INPUT default="footer"/>
  </DIALOG>
</xsl:for-each>
</xsl:for-each>
</xsl:for-each>
end of TML document </TML>
end of main template </xsl:template>
  <!-- end of main template -->
  <!-- template for individual rows. matches grand totals,
    sub totals, and normal rows -->
row template to list all <xsl:template match="gt|st|row">
metric values in a single row
  <xsl:for-each select="mv">
  <xsl:apply-templates select="."/>
insert "and" before last value <xsl:choose>
  <xsl:when test=".[@n=3]">.</xsl:when>
  <xsl:otherwise>, <xsl:if test=".[@n=2]">and </xsl:if></
    xsl:otherwise>
  </xsl:choose>
  </xsl:for-each>
  </xsl:template>
  <!-- template for generating DIALOG names -->
template for DIALOG names <xsl:template match="row-
  header">
<xsl:value-of select="dssgrid/@ns"/>
<xsl:for-each select="ae-desc">
</xsl:value-of select="@idval"/><xsl:if test="context( )[not
  (end( ))]">-</xsl:if>
  </xsl:for-each>
  <xsl:template>
  <!--templates for individual metric values. Adjust units
    and wording to fit specific report -->
templates for individual <xsl:template match="mv[@n-1]
  "><xsl:value-of select="/dssgrid/
metric values column-header/mh[@n=1] "/> of <xsl:value-
  of/>dollar</xsl:template>
  <xsl:template match="mv[@n=2]"?>xs;"va;ie=pf select=
    "/dssgrid/
    column-header/mh[@n-2] "/>of <xsl:value-of/> dollar</
    xsl:template>
  <xsl:template match="mv[@n=3]"><xsl:value-of select=
    "/dssgrid/
    column-header/mh[/@n=3] "/> of<xsl:value-of />
    dollar</xsl:template>
</xsl:stylesheet>
```

Listing 19 (XSL): Complete XSL Stylesheet to Transform the Report from Listing 16 into a TML=Document.

To design reports suitable for XSL transformations, it may be easier if they are tabular and not cross-tabbed. In connection with the foregoing, the assumption has been that all attribute elements have attribute node descriptions and no attribute element IDs. This may be different for some reports, but it would be very easy to adjust the XSL accordingly, as you would just have to replace <ae-desc> with <ae-id> in the appropriate places.

According to one embodiment of the present invention, a system is provided for automatic, interactive, real-time, voice transmission of OLAP output to one or more subscribers. For example, subscribers may be called by the system, and have content delivered audibly over the telephone or other voice-enabled terminal device. During the IVB, information may be exchanged between the system and a subscriber. The system conveys content to the subscriber and, the subscriber may respond by pressing one or more buttons on a telephone touch pad dial (or other input mechanism) to hear more information, to exercise options, or to provide other responses. This interaction shapes the structure of a basic exchange between the system and the subscriber. During or after the call is terminated, the subscriber's responses may be stored and processed (e.g., by other applications).

According to one embodiment of the present invention, a method for automatic, interactive, real-time, voice transmission of OLAP output to one or more subscribers is provided. FIG. 1a depicts a flow chart of a method for automatic, interactive, real-time, voice transmission of OLAP output according to one embodiment. The method begins in step 110 with the creation of a voice service (e.g., by a system administrator or user). A voice service is created using, for example, a voice service wizard which may comprise a series of interfaces. One embodiment of a method for creating a voice service is explained in more detail below in conjunction with FIG. 1b. One embodiment of a voice service wizard is explained below in conjunction with FIG. 3b.

After a voice service is created, users may subscribe or be subscribed to the voice service (step 120), for example, by using a subscription interface. According to one embodiment, users may subscribe to an existing voice service over the telephone or by web-based subscription. A user may also be subscribed programmatically. In other embodiments, a user may subscribe to a voice service via electronic mail. Not every voice service created in step 110 is available for subscription. More specifically, according to another embodiment, only a user with appropriate access, such as the creator of the service, is allowed to subscribe himself or others to a service. Such a security feature may be set when the voice service is created.

In step 130, a scheduling condition or other predetermined condition for the voice services is monitored to determine when they are to be executed. That is, when a voice service is created or subscribed to, the creator or user specifies when the voice service is to be executed. A user may schedule a voice service to execute according to the date, the time of day, the day of the week, etc. and thus, the scheduling condition will be a date, a time, or a day of the week, either one time or on a recurring basis. In the case of an alert service, discussed in more detail below, the scheduling condition will depend on satisfaction of one or more conditions. According to one embodiment, the condition(s) to be satisfied is an additional scheduling condition. According to another embodiment, to another embodiment, a service may be executed "on command" either through an administrator or programmatically through an API. Scheduling of voice services is discussed in more detail below.

The method continues monitoring the scheduling condition for voice services until a scheduling condition is met. When a scheduling condition is met, that voice service is executed as illustrated in, for example, step 140. The execution of a voice service involves, inter alia, generating the content for the voice service, and structuring the voice service to be interactively broadcast through a call server. The execution of a voice service is explained in detail in conjunction with FIG. 1c.

An example of a IVB is as follows.
PERSONALIZED GREETING
Hello Joe, this is your stock update.
PIN VERIFICATION
Please enter your six digit PIN number
(Joe enters his PIN, using the keypad dial on his telephone.)
MENU OPTIONS
Your portfolio was up by $1000 today.
Please select:
1. To get a portfolio stock update
2. To conduct a transaction
(Joe presses 2)
SUB MENU
Thank you, Joe! Please select a ticker.
1. PQT
2. TQP
3. Listen to options again
4. Return to main menu
(Joe presses 1.)
SUB MENU
Would you like to buy or sell stock? Please press:
1. To sell stock
2. To buy stock
(Joe presses 1.)
SUB MENU
How many shares of PQT would you like to sell today? Please press:
1. To sell 50 shares
2. To sell 100 shares
3. To sell 200 shares
4. To sell another quantity
(Joe presses 2.)
SUB MENU
You selected 2. You want to sell 100 shares of PQT. Please press:
1. If this is correct
2. If this is incorrect
3. If you want to change the number of shares you want to buy.
(Joe presses 1.)
END VOICE SERVICE/TERMINATE IVB
Thank you for using our voice interactive broadcasting service, Joe. We will call you
  back when your transaction is completed Good-bye.
As can be seen from the above sample during an IVB, the user is presented with information, e g., the status of his portfolio, and is presented options related to that report, e.g., the option to buy or sell stock.

According to one embodiment, a voice service is constructed using service wizard. A voice service is constructed using several basic building blocks, or elements, to organize the content and structure of a call. According to one embodiment, the building blocks of a voice service comprise elements of a markup language. According to one particular embodiment, elements of a novel markup language based on XML (the above described TML) are used to construct voice services. According to another embodiment, other voice-based markups could be used.

In addition to the elements described above, there are two features that maximize an administrator's ability to design voice services. Call Flow Reports (described above) enable an administrator to generate the structure of a call based on the content of an report e.g., from an OLAP system or other data repository. For example, the options presented to a user in a PROMPT element may be made to correspond to the row of a data report. According to one embodiment, report data is converted into options by application of an XSL (extensible style sheet language) style sheet (also explained above). The result of this application is inserted into the static call structure when the voice service is executed.

The use of an XSL style sheet is a feature that maximizes an administrator's voice service building ability. As discussed above, they are used to create dynamic call structure that depends on data report output. They may also be used to generate a text string that comprises the message to be read to a user at any point in a call.

A method for creating a voice service according to one embodiment will now be explained in conjunction with FIG. 1b. The method begins in step 210 by naming the voice service. Then, in step 220 various scheduling parameters of the voice service are defined. In step 250 the service content is defined. And, in step 260, the personalization modes, or style properties are selected for the voice service.

According to one embodiment, in step 210, a voice service is named and a description of the voice service provided. By providing a name and description, a voice service may be uniquely identified. An interface is provided for prompting input of the name of the service to be created or edited. An input may also be provided for a written description. An open typing field would be one option for providing the description input. According to another embodiment, if an existing call service has been selected to edit, the service name field may not be present or may not allow modification.

In step 220, conditions for initiating the service are selected. This may include selecting and defining a service type. At least two types of services may be provided based on how the services are triggered. A first type of service is run according to a predetermined schedule and output is generated each time the service is run. A second type of service, an alert service, is one that is run periodically as well, however, output is only generated when certain criteria is satisfied. Other service types may be possible as well. In one embodiment the administrator is prompted to choose between a scheduled service or an alert service. An interface may provide an appropriate prompt and some means for selecting between a scheduled service and an alert service. One option for providing the input might be an interface with a two element toggle list.

In one embodiment, a set of alert conditions is specified to allow the system to evaluate when the service should be initiated if an alert type service has been selected. In one embodiment, a report or a template/filter combination upon which the alert is based is specified. Reports and template/filter combinations may be predefined by other objects in the system including an agent module or object creation module. According to one embodiment, an agent module, such as DSS agent™ offered by MicroStrategy, may be used to create and define reports with filters and template combinations, and to establish the alert criteria for an alert service. According to another embodiment, an interface is be provided which includes a listing of any alert conditions presently selected for the voice service. According to this embodiment, the interface may comprise a display window. A browse feature may take the user to a special browsing interface configured to select a report or filter-template combination. One embodiment of an interface for selecting reports and filter-template combinations is described below. Once a report or filter and template combination is chosen, the alerts contained in the report or filter and template combination may be listed in the display window of the interface.

In step 240, the schedule for the service is also selected. According to one embodiment, predefined schedules for voice services may be provided or a customized schedule for the voice service may be created. If a new schedule is to be created, a module may be opened to enable the schedule name and parameters to be set Schedules may be run on a several-minute, hourly, daily, monthly, semi-annual, annual or other bases, depending upon what frequency is desired. According to one embodiment, an interface is provided that allows the administrator to browse through existing schedules and select an appropriate one. The interface may provide a browsing window for finding existing schedule files and a "new schedule" feature which initiates the schedule generating module. In one embodiment, schedules may not be set for alert type services. However, in some embodiments, a schedule for evaluating whether alert conditions have been met may be established in a similar manner.

In step 230, the duration of the service is also set. Service duration indicates the starting and stopping dates for the service. Setting a service duration may be appropriate regardless of whether a scheduled service or alert type service has been selected. The start date is the base line for the scheduled calculation, while the end date indicates when the voice service will no longer be sent. The service may start immediately or at some later time. According to one embodiment, the interface is provided to allow the administrator to input start and end dates. The interface may also allow the administrator to indicate that the service should start immediately or run indefinitely. Various calendar features may be provided to facilitate selection of start and stop dates. For example, a calendar that specifies a date with pull-down menus that allow selection of a day, month and year may be provided according to known methods of selecting dates in such programs as electronic calendar programs and scheduling programs used in other software products. One specific aid that may be provided is to provide a calendar with a red circle indicating the present date and a blue ellipse around the current numerical date in each subsequent month to more easily allow the user to identify monthly intervals. Other methods may also be used.

In step 220, a voice service may also be designated as a mid-tier slicing service. In one embodiment, mid-tier slicing services generate content and a dynamic subscriber list in a single query to an OLAP system. According to one embodiment, in a mid-tier slicing service a single database query is performed for all subscribers to the service. The result set developed by that query is organized in a table that contains a column that indicates one or more users that each row of data is applicable to.

In step 250, the content of the voice service is defined. Defining the content of the voice service may include selecting the speech to be delivered during the voice service broadcast (content), the structure of dialogs, menus, inputs, and the background procedures which generate both content and structure. In one embodiment, defining voice service content establishes the procedures performed by the vss server to assemble one or more active voice pages in response to initiation of the voice service. According to one embodiment, defining service content involves establishing a hierarchical structure of TML elements which define the structure and content of a voice service. All of the elements in a given service may be contained within a container.

The personalization type is selected in step 260. Personalization type defines the options that the admninistrator will have in applying personalization filters to a voice service.

According to one embodiment, a personalization filter is a set of style properties that can be used to determine what content generated by the service will be delivered to the individual user and in what format it will be delivered. In one embodiment, personalizing the delivery format may include selection of style properties that determine the sex of the voice, the speed of the voice, the number of call back attempts, etc. Personalization filters may exist for individual users, groups of users, or types of users. According to one embodiment, personalization filters may be created independent of the voice service. According to this embodiment, a voice service specifies what filters are used when generating IVBs. Some personalization type options may include: allowing no personalization filters; allowing personalization filters for some users, but not requiring them; and requiring personalization filters for all interactive voice broadcasts made using the service.

According to one embodiment, specifying personalization type is accomplished by administrator input through an interface. The interface may offer a toggle list with the three options: required personalization, optional personalization, and no personalization.

Figure 3A:
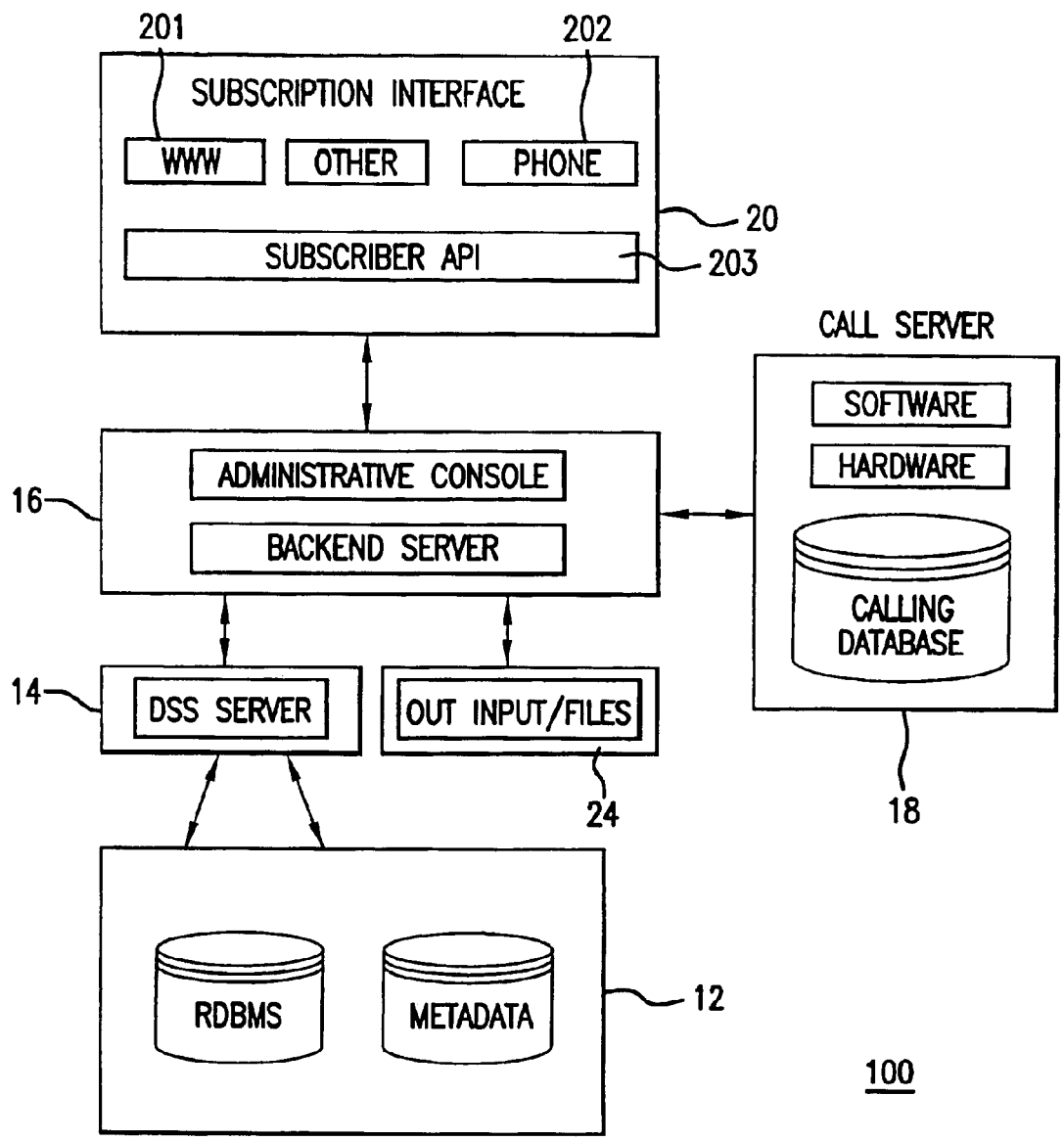
FIG. 3a is a schematic block diagram of a system in accordance with an embodiment of the present invention.
Figure 3B:
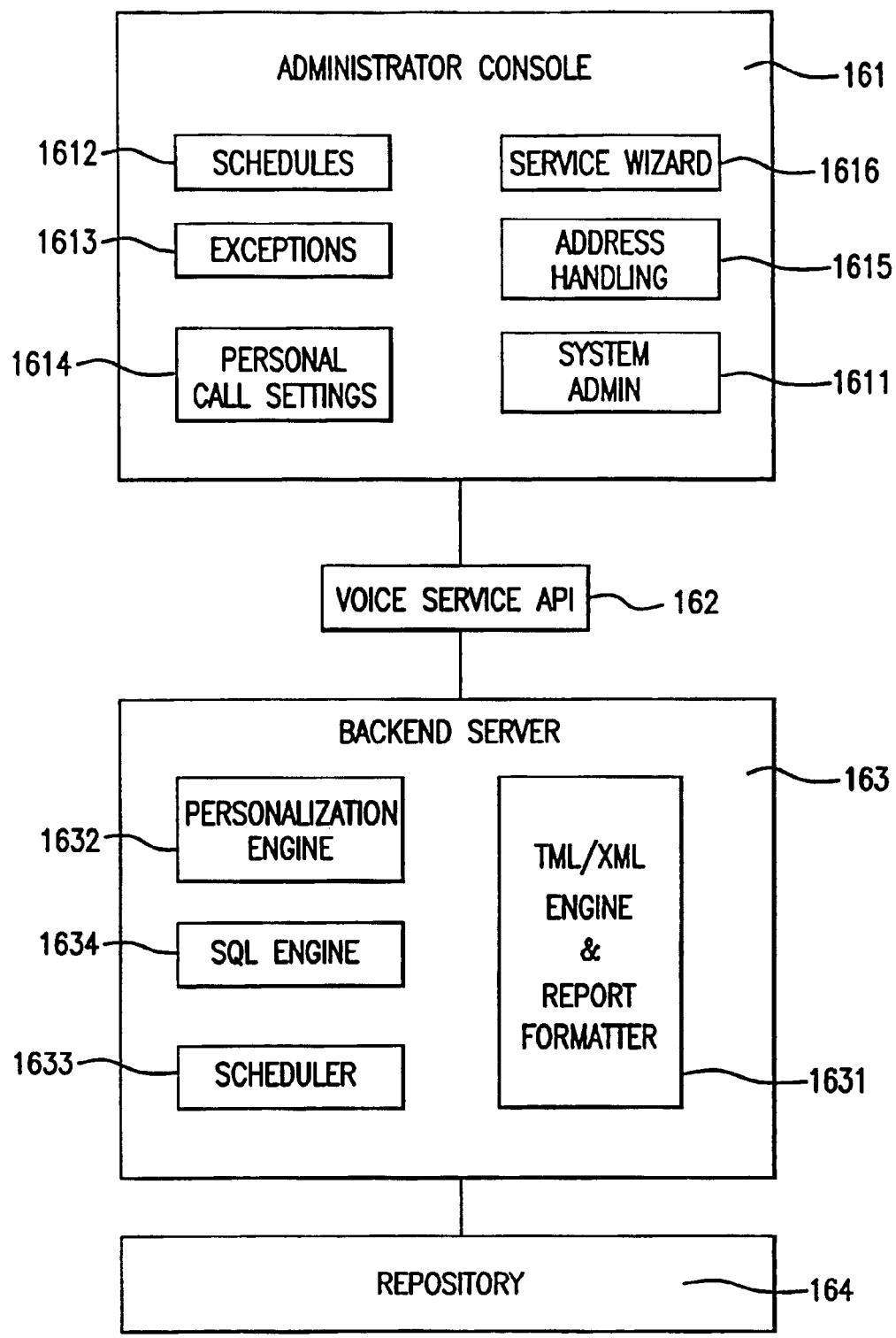
FIG. 3b is a schematic block diagram of an intelligence server according to an embodiment of the present invention.
Figure 3C:
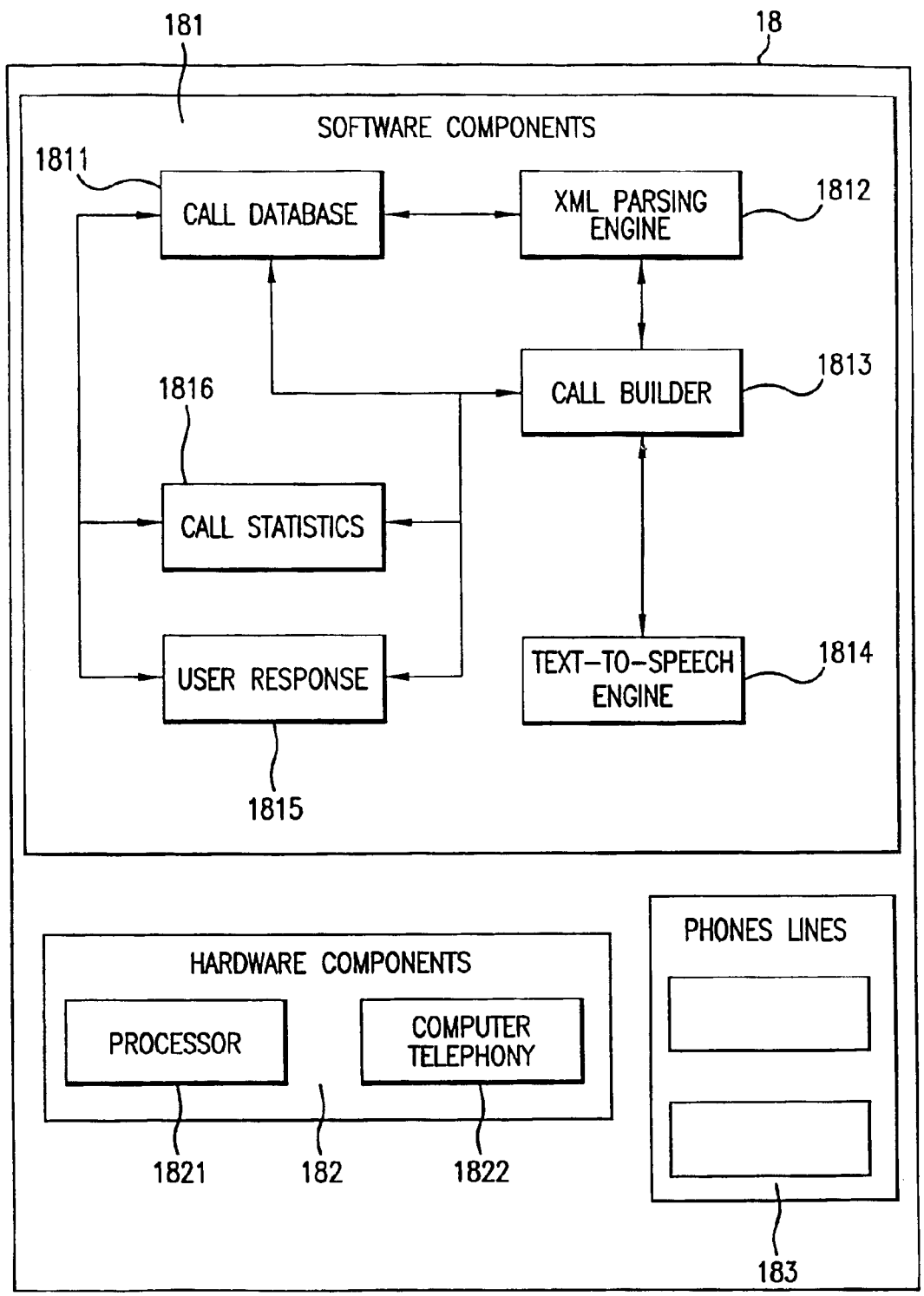
FIG. 3c is a schematic block diagram of call server according to an embodiment of the present invention.

The voice service may be stored in a database structure to enable users to retrieve predefined voice services and to subscribe to these services, for example, through subscription interfaces explained in conjunction FIGS. 3a–3c or otherwise. An interface informing the administrator that creation of the voice service is complete may also be provided.

Figure 1B:
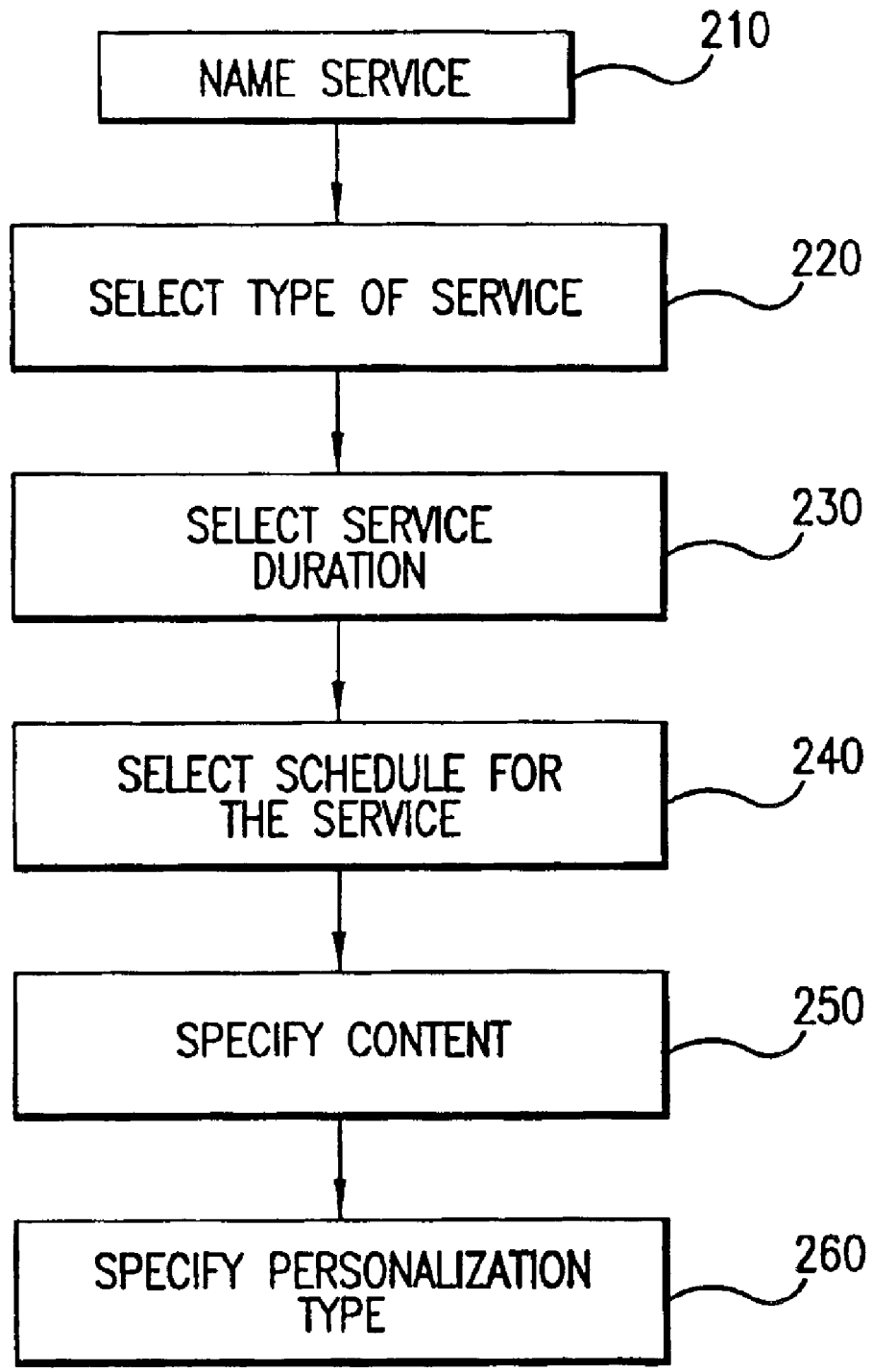
FIG. 1b is a flow chart indicating a method of generating a voice service according to one embodiment of the present invention.

According to one embodiment, the method of FIG. 1b also comprises an error condition step. An error condition step may be used to enable administrators to specify "error" conditions and the handling of those conditions. For example, an "error" condition may comprise a notification that a server is "down" or that there is no data to be returned. An administrator may specify particular actions to be performed by the system in response to one or more error conditions. For example, an administrator may specify an "addressing" error (e.g., disconnected number) and indicate a particular action to be performed in response to an "addressing" error (e.g., notify system administrator). Other error conditions might include: an alert report encountering an error and returning no data; a subscriber lacking the required personalization filter for the service; errors occurring in the generation of one or more reports; or reports returning no data. Various other conditions and actions may be specified. Certain error conditions may be predetermined for the system, but an administrator may have reasons for supplementing or diverging from the predetermined error conditions. According to one particular embodiment, error conditions are specified using the ERROR and SYS-ERROR elements.

In one embodiment, setting error conditions may be accomplished using an error handling interface. The interface may allow the administrator to select either default error handling, or to customize error handling using a module for defining error handling. If default handling is selected, the system uses established settings. If customized handling is chosen, the user may use a feature to access the appropriate interface for the error handling module.

Servers may have limited capacity to perform all of the actions required of them simultaneously, the method of FIG. 1b comprises a step for prioritizing the execution and delivery of voice services. Prioritization may establish the order in which the voice service system allocates resources for processing voice service and delivering the IVB. According to one embodiment, assigning priority to a voice service establishes priority for queries to the database system, formatting the voice service, or IVBs. Any criteria may be used for establishing priority. According to one embodiment, priority is established based on service content. According to another embodiment, priority is based on service destination. According to another embodiment, priority may be established based on the type of voice service, i.e., alert v. scheduled. Any number of procedures or criteria for denoting relative importance of service delivery may be established.

In one embodiment, an interface is provided for defining the priority of the voice service being created or edited. According to one embodiment, the interface comprises a screen including option boxes with pull down menus listing the number of different prioritization options.

Figure 1C:
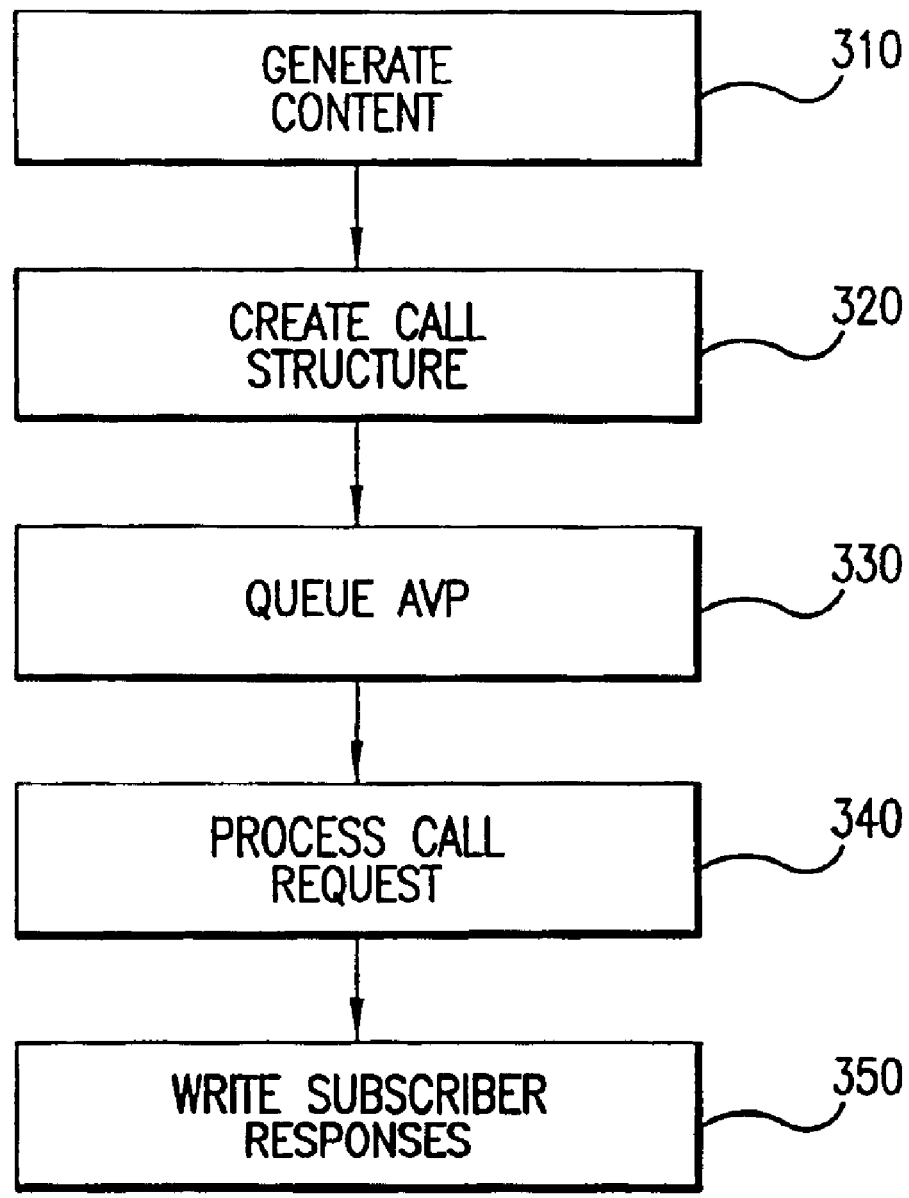
FIG. 1c is a flow chart indicating a method for interactive voice broadcasting according to an embodiment of the present invention.

Another aspect of the invention relates to a method for executing a voice service. FIG. 1c depicts one example of a flow chart for executing a voice service. In step 310, the content of a voice service is generated. In step 320, the call structure of a IVB is created via Active Voice Pages. In step 330, the AVPs are put in a call database for processing e.g., in a call queue. In step 340, the call request is processed and an interactive voice broadcast with the user is implemented. In step 350, user's responses are written back to the voice service system (e.g., the Active Voice Page). Each of these steps will be explained in more detail below.

According to one embodiment, content is created in step 310 as follows. A voice service execution begins by running scheduled reports, queries or by taking other action to determine whether the service should be sent. The subscribers for the service are then resolved. Datasets are generated for each group of subscribers that has unique personalization criteria.

Call structure may be created (step 320) as follows. An AVP contains data at various hierarchical content levels (nodes) that can be either static text or dynamic content. Static text can be generated e.g., by typing or by incorporating a text file. Dynamic content may be generated e.g., by inserting data from a data report using a grid and/or an XSL stylesheet. Moreover, content is not limited to text based information. Other media, such as, sound files, may be incorporated into the AVP. The call data (for example, at a particular level) may be the text that is converted to speech and played when the recipient encounters the node.

According to another embodiment, call content may include content from other voice pages, for example, "standard" active voice pages that are generated and inserted into a database or Web Server where the pages are periodically refreshed. According to one particular embodiment, the active voice page that is generated for a user contains links to other active voice pages. The links may be followed using a process similar to web page links.

The call structure may comprise either a static structure that is defined in the voice service interfaces e.g., by typing text into a text box and/or a dynamic structure generated by grid/XSL combinations. The dynamic structure is merged with static structure during the service execution. A single call structure is created for each group of users that have identical personalization properties across all projects because such a group will receive the same content.

After a call structure is generated, in step 330, it is sent to a call database e.g., call database 1811 shown in FIG. 3c along with the addresses and style properties of the users. The style properties govern the behavior of a call server 18 in various aspects of the dialog with a user. Call server 18 queries call database 1811 for current call requests and places new call requests in its queue.

In step 340, a call request is processed. A call is implemented on call server 18 using one of several ports that are configured to handle telephone communication. When a port becomes available, the call request is removed from the queue and the call is made to the user. As the user navigates through an active voice page, e.g., by entering input using the key pad or by speaking responses, call/content is presented by converting text to speech in text-to-speech engine 1814. User input during the call may be stored for processing. According to another embodiment, user responses and other input may also be used to follow links to other active voice pages. For example, as explained above, "standard" active voice pages may be generated and inserted into a database or Web Server. Then, when a user's voice service is delivered, that voice service may contain links to information that may be accessed by a user. A user may access those standard active voice pages by entering input in response to OPTION or PROMPT elements.

In step 350, user responses are stored by the system. According to one embodiment, user responses are stored in a response collection defined by the active voice page. A voice service may specify that a subscriber return information during an IVB so that another application may process the data For instance, a user may be prompted to purchase a commodity and be asked to enter or speak the number of units for the transaction. During or after an IVB, the subscriber's responses are written to a location from which they can be retrieved for processing (e.g., by an external application).

Figure 2:
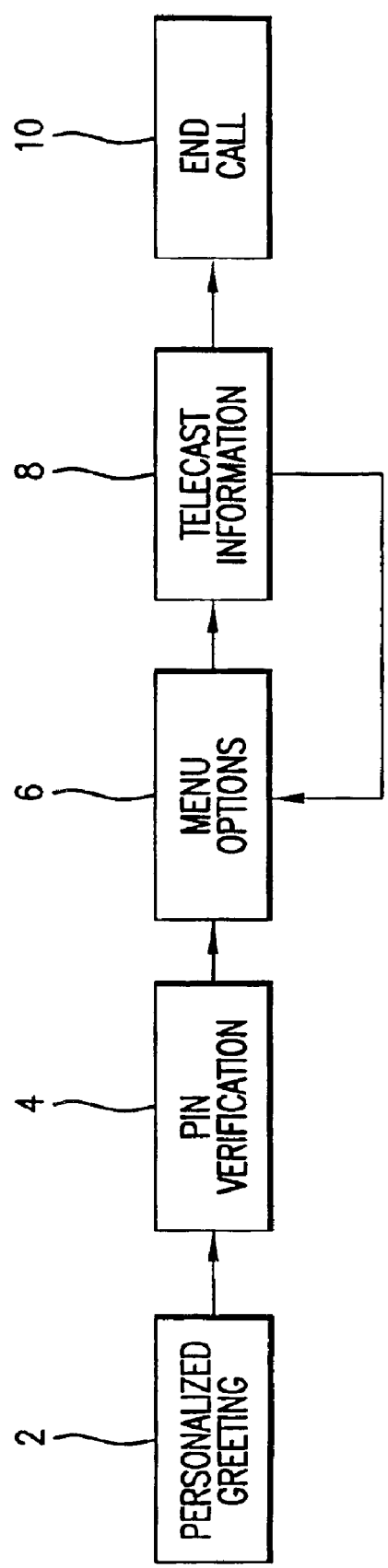
FIG. 2 is a flow chart indicating a sequence of an interactive voice broadcast according to one embodiment of the present invention.

FIG. 2 is an example of an IVB with interactive call flow. An IVB usually contains a greeting message that addresses the targeted user, identifies the name of the calling application, and states the purpose of the call and/or presents summary metrics. The voice service system can also implement a PIN verification protocol, if this layer of security is required. The main menu structure of an IVB can contain a number of options that lead to sub-menu structures. A menu can also contain prompts for the user to enter numerical information using a telephone touch pad dial. A node along the hierarchical menu structure may have options to return the user to a higher level.

FIG. 3a depicts an embodiment of a system according to one embodiment of the present invention. Preferably, the system comprises database system 12, a DSS server 14, voice server 16, a call server 18, subscription interface 20, and other out input/files 24.

Database system 12 and DSS server 14 comprise an OLAP system that generates user-specified reports from data maintained by database system 12. Database system 12 may comprise any data warehouse or data mart as is known in the art, including a relational database management system ("RDBMS"), a multidimensional database management system ("MDDBMS") or a hybrid system. DSS server 14 may comprise an OLAP server system for accessing and managing data stored in database system 12. DSS server 14 may comprise a ROLAP engine, MOLAP engine or a HOLAP engine according to different embodiments. Specifically, DSS server 14 may comprise a multithreaded server for performing analysis directly against database system 12. According to one embodiment, DSS server 14 comprises a ROLAP engine known as DSS Server™ offered by MicroStrategy.

Voice service server (VSS) 16, call server 18 and subscription interface 20 comprise a system through which subscribers request data and reports e.g., OLAP reports through a variety of ways and are verbally provided with their results through an IVB. During an WB, subscribers receive their requested information and may make follow-up requests and receive responses in real-time as described above. Although the system is shown, and will be explained, as being comprised of separate components and modules, it should be understood that the components and modules may be combined or further separated. Various functions and features may be combined or separated Subscription interface 20 enables users or administrators of the system to monitor and update subscriptions to various services provided through VSS 16. Subscription interface 20 includes a world wide web (WWW interface 201, a telephone interface 202, other interfaces as desired and a subscriber API 203. WWW interface 201 and telephone interface 202 enable system 100 to be accessed, for example, to subscribe to voice services or to modify existing voice services. Other interfaces may be used. Subscriber API 203 provides communication between subscription interface 20 and VSS 16 so that information entered through subscription interface 20 is passed through to VSS 16.

Subscription interface 20 is also used to create a subscriber list by adding one or more subscribers to a service. Users or system administrators having access to VSS 16 may add multiple types of subscribers to a service such as a subscriber from either a static recipient list (SRL) (e.g., addresses and groups) or a dynamic recipient list (DRL) (described in further detail below). The subscribers may be identified, for example, individually, in groups, or as dynamic subscribers in a DRL. Subscription interface 20 permits a user to specify particular criteria (e.g., filters, metrics, etc.) by accessing database system 12 and providing the user with a list of available filters, metrics, etc. The user may then select the criteria desired to be used for the service. Metadata may be used to increase the efficiency of the system.

A SRL is a list of manually entered names of subscribers of a particular service. The list may be entered using subscription interface 20 or administrator console 161. SRL entries may be personalized such that for any service, a personalization filter (other than a default filter) may be specified. A SRL enables different personalizations to apply for a login alias as well. For example, a login alias may be created using personalization engine 1632. Personalization engine 1632 enables subscribers to set preferred formats, arrangements, etc. for receiving content. The login alias may be used to determine a subscriber's preferences and generate service content according to the subscriber's preferences when generating service content for a particular subscriber.

A DRL may be a report which returns lists of valid user names based on predetermined criteria that are applied to the contents of a database such as database system 12. Providing a DRL as a report enables the DRL to incorporate any filtering criteria desired, thereby allowing a list of subscribers to be derived by an application of a filter to the data in database system 12. In this manner, subscribers of a service may be altered simply by changing the filter criteria so that different user names are returned for the DRL. Similarly, subscription lists may be changed by manipulating the filter without requiring interaction with administrator console 161. Additionally, categorization of each subscriber may be performed in numerous ways. For example, subscribers may be grouped via agent filters. In one specific embodiment, a DRL is created using DSS Agent™ offered by MicroStrategy.

VSS 16 is shown in more detail in FIG. 3b. According to one embodiment, VSS 16 comprises administrator console 161, voice service API 162 and backend server 163. Administrator console 161 is the main interface of system 100 and is used to view and organize objects used for voice broadcasting. Administrator console 161 provides access to a hierarchy of additional interfaces through which a system administrator can utilize and maintain system 100. Administrator console 161 comprises system administrator module 1611, scheduling module 1612, exceptions module 1613, call settings module 1614, address handling module 1615, and service wizard 1616.

System administrator module 1611 comprises a number of interfaces that enable selection and control of the parameters of system 100. For example, system administrator module 1611 enables an administrator to specify and/or modify an email system, supporting servers and a repository server with which system 100 is to be used. System administrator 1611 also enables overall control of system 100. For example, system administrator module is also used to control the installation process and to start, stop or idle system 100. According to one embodiment, system administrator 1611 comprises one or more graphical user interfaces (GUIs).

Scheduling module 1612 comprises a number of interfaces that enable scheduling of voice services. Voice services may be scheduled according to any suitable methodology, such as according to scheduled times or when a predetermined condition is met. For example, the predetermined condition may be a scheduled event (time-based) including, day, date and/or time, or if certain conditions are met. In any event, when a predetermined condition is met for a given service, system 100 automatically initiates a call to the subscribers of that service. According to one embodiment, scheduling module 1612 comprises one or more GUIs.

Exceptions module 1613 comprises one or more interfaces that enable the system administrator to define one or more exceptions, triggers or other conditions. According to one embodiment, exceptions module 1613 comprises one or more GUIs.

Call settings module 1614 comprises one or more interfaces that enable the system administrator to select a set of style properties for a particular user or group of users. Each particular user may have different options for delivery of voice services depending on the hardware over which their voice services are to be delivered and depending on their own preferences. As an example of how the delivery of voice services depends on a user's hardware, the system may deliver voice services differently depending on whether the user's terminal device has voice mail or not As an example of how the delivery of voice services depends on a user's preferences, a user may chose to have the pitch of the voice, the speed of the voice or the sex of the voice varied depending on their personal preferences. According to one embodiment, call settings module 1614 comprises one or more GUIs.

Address handling module 1615 comprises one or more interface that enable a system administrator to control the address (e.g., the telephone number) where voice services content is to be delivered. The may be set by the system administrator using address handling module 1615. According to one embodiment, address handling module 1615 comprises one or more GUIs.

Voice service wizard module 1616 comprises a collection of interfaces that enable a system administrator to create and/or modify voice services. According to one embodiment, service wizard module 1616 comprises a collection of interfaces that enable a system administrator to define a series of dialogs that contain messages and inputs and determine the call flow between these dialogs based on selections made by the user. The arrangement of the messages and prompts and the flow between them comprises the structure of a voice service. The substance of the messages and prompts is the content of a voice service. The structure and content are defined using service wizard module 1616.

Voice service API 162 (e.g., MicroStrategy Telecaster Server API) provides communication between administrator console 161 and backend server 163. Voice Service API 162 thus enables information entered through administrator console 161 to be accessed by backend server 163 (e.g., MicroStrategy Telecaster Server).

Backend server 163 utilizes the information input through administrator console 161 to initiate and construct voice services for delivery to a user. Backend server 163 comprises report formatter 1631, personalization engine 1632, scheduler 1633 and SQL engine 1634. According to one embodiment, backend server 163 comprises MicroStrategy Broadcast Server. Report formatter 1631, personalization engine 1632, and scheduler 1633 operate together, utilizing the parameters entered through administrator console 161, to initiate and assemble voice services for transmission through call server 18. Specifically, scheduler 1633 monitors the voice service schedules and initiates voice services at the appropriate time. Personalization engine 1632 and report formatter 1631 use information entered through service wizard 1616, exceptions module 1613, call settings module 1614, and address module 1615, and output provided by DSS server 14 to assemble and address personalized reports that can be sent to call server 18 for transmission. According to one embodiment, report formatter 1631 includes an XML based markup language engine to assemble the voice services. In a particular embodiment, report formatter includes a Telecaster Markup Language engine offered by MicroStrategy Inc. to assemble the call content and structure for call server 18. SQL engine 1634 is used to make queries against a database when generating reports. More specifically, SQL engine 1634 converts requests for information into SQL statements to query a database.

Repository 164 may be a group of relational tables stored in a database. Repository 164 stores objects which are needed by system 100 to function correctly. More than one repository can exist, but preferably the system 100 is connected to only one repository at a time.

According to one embodiment, a call server 18 is used to accomplish transmission of the voice services over standard telephone lines. Call server 18 is shown in more detail in FIG. 3c. According to one embodiment, call server 18 comprises software components 181 and hardware components 182. Software components 181 comprise call database 1811, mark-up language parsing engine 1812, call builder 1813, text-to-speech engine 1814, response storage device 1815 and statistic accumulator 1816.

Call database 1811 comprises storage for voice services that have been assembled in VSS 16 and are awaiting transmission by call server 18. These voice services may include those awaiting an initial attempt at transmission and those that were unsuccessfully transmitted (e.g., because of a busy signal) and are awaiting re-transmission. According to one embodiment, call database 1811 comprises any type of relational database having the size sufficient to store an outgoing voice service queue depending on the application Call database 1811 also comprises storage space for a log of calls that have been completed.

Voice services stored in call database 1811 are preferably stored in a mark-up language. Mark-up language parsing engine 1812 accepts these stored voice services and separates the voice services into parts. That is, the mark-up language version of these voice services comprises call content elements, call structure elements and mark-up language instructions. Mark-up language parsing engine 1812 extracts the content and structure from the mark-up language and passes them to call builder 1813.

Call builder 1813 is the module that initiates and conducts the telephone call to a user. More specifically, call builder dials and establishes a connection with a user and passes user input through to markup language parsing engine 1812. In one embodiment, call builder 1813 comprises "Call Builder" software available from Call Technologies Inc. Call builder 1813 may be used for device detection; line monitoring for user input, call session management, potentially transfer of call to another line, termination of a call, and other functions.

Text-to-speech engine 1814 works in conjunction with mark-up language parsing engine 1812 and call builder 1813 to provide verbal communication with a user. Specifically, after call builder 1813 establishes a connection with a user, text-to-speech engine 1814 dynamically converts the content from mark-up language parsing engine 1812 to speech in real time.

A voice recognition module may be used to provide voice recognition functionality for call server 181. Voice recognition functionality may be used to identify the user at the beginning of a call to help ensure that voice services are not presented to an unauthorized user or to identify if a human or machine answers the call. This module may be a part of call builder 1813. This module may also be used to recognize spoken input (say "one" instead of press "1"), enhanced command execution (user could say "transfer money from my checking to savings"), enhanced filtering (instead of typing stock symbols, a user would say "MSTR"), enhanced prompting, (saying numeral values).

User response module 1815 comprises a module that stores user responses and passes them back to intelligence server 16. Preferably, this is done within an AVP. During a telephone call, a user may be prompted to make choices in response to prompts by the system. Depending on the nature of the call these responses may comprise, for example, instructions to buy or sell stock, to replenish inventory, or to buy or rebook an airline flight. User response module 1815 comprises a database to store these responses along with an identification of the call in which they were given. The identification of the call in which they were given is important to determining what should be done with these responses after the call is terminated. User responses may be passed back to intelligence server 16 after the call is complete. The responses may be processed during or after the call, by the system or by being passed to another application.

Statistics accumulator 1816 comprises a module that accumulates statistics regarding calls placed by call builder 1813. These statistics including, for example, the number of times a particular call has been attempted, the number of times a particular call has resulted in voice mail, the number of times a user responds to a call and other statistics, can be used to modify future call attempts to a particular user or the structure of a voice service provided to a particular user. For example, according to one embodiment, statistics accumulator 1816 accumulates the number of times a call has been unsuccessfully attempted by call builder 1813. This type of information is then used by call server 18 to determine whether or not the call should be attempted again, and whether or not a voice mail should be left.

Call server 18 also comprises certain hardware components 182. As shown in FIG. 3c, hardware components 182 comprise processor 1821 and computer telephone module 1822. According to one embodiment, processor 1821 comprises a Pentium II processor, available from Intel, Inc. Module 1822 provides voice synthesis functionality that is used in conjunction with Text to Speech engine 1814 to communicate the content of voice services to a user. Module 1822 preferably comprises voice boards available from Dialogic, Inc. Other processors and voice synthesizers meeting system requirements may be used.

The system and method of the present invention may form an integral part of an overall commercial transaction processing system.

According to one embodiment of the present invention, a system and method that enable closed-loop transaction processing are provided. The method begins with the deployment of an IVB by executing a service. As detailed above, this includes generating the content and combining this with personalization information to create an active voice page. Call server 18 places a call to the user. During the call, information is delivered to the user through a voice-enabled terminal device (e.g., a telephone or cellular phone). Phone lines 183 may be used for communication purposes.

During the IVB, a user may request a transaction, service, further information from the database or other request, e.g., based on options presented to the user. These will generically be referred to as transactions. The request may be, but is not necessarily, based on or related to information that was delivered to the user. According to one embodiment, the request comprises a user response to a set of options and/or input of information through a telephone keypad, voice input or other input mechanism. According to another embodiment, the request can be made by a user by speaking the request. Other types of requests are possible.

According to one embodiment, the user responses are written to a response collection, which along with information stored in the active voice page, can be used to cause a selected transaction to be executed. According to one embodiment, the active voice page comprises an XML-based document that includes embedded, generic requests, e.g., a request for a transaction, or a request for additional information (a database query).

These embedded requests are linked with, for example option statements or prompts so that when a user enters information, the information is entered into the generic request and thus completes a specific transaction request. For example, in the example if a user exercises an option to buy a particular stock, that stock's ticker symbol is used to complete a generic "stock buy" that was embedded in the active voice page.

According to one embodiment, tokens are used to manage user inputs during the IVB. A token is a temporary variable that can hold different values during an IVB. When a user enters input, it is stored as a token. The token value is used to complete a transaction request as described above. According to one embodiment, the system maintains a running list of tokens, or a response collection, during an IVB.

In order to complete the requested transaction, the user responses (and other information from the active voice page) may need to be converted to a particular format The format will depend, for example, on the nature and type of transaction requested and the system or application that will execute the transaction. For example, a request to purchase goods through a web-site may require the information to be in HTML/HTTP format. A request for additional information may require and SQL statement. A telephone-based transaction may require another format.

Therefore, the transaction request is formatted. According to one embodiment, the transaction is formatted to be made against a web-based transaction system. According to another embodiment, the transaction request is formatted to be made against a database. According to another embodiment, the transaction is formatted to be made against a telephone-based transaction system. According to another embodiment, the transaction is formatted to be made via e-mail or EDI. Other embodiments are possible.

In one embodiment, the formatted transaction request comprises an embedded transaction request. The system described in connection with FIGS. 1–3 provides interactive voice services using TML, a markup language based on XML. Using TML active voice pages are constructed that contain the structure and content for a interactive voice broadcast including, inter alia, presenting the user with options and prompting the user for information. Moreover in connection with OPTION and PROMPT elements, active voice pages also can include embedded statements such as transaction requests. Therefore, the formatting for the transaction request can be accomplished ahead of time based on the particular types of transactions the user may select.

For example, in connection with an exemplary stock purchase, an active voice page can include an embedded transaction request to sell stock in the format necessary for a particular preferred brokerage. The embedded statement would include predefined variables for the name of the stock, the number of shares, the type of order (market or limit, etc.), and other variables. When the user chooses to exercise the option to buy or sell stock, the predefined variables are replaced with information entered by the user in response to OPTION or PROMPT elements. Thus, a properly formatted transaction request is completed.

In the system of FIGS. 1–3, TML parsing engine in call server 18 includes the functionality necessary to generate the properly formatted transaction request as described above. For example, in connection with the embodiment described above, the TML parsing engine shown in FIG. 3c reads the active voice pages. When the TML parsing engine reads an OPTION element that includes and embedded transaction request, it stores the transaction request, and defines the necessary variables and variable locations. When the user exercises that OPTION, the user's input is received by the TML parsing engine and placed at the memory locations to complete the transaction request This technique could be used, for example, to generate a formatted transaction request for web-site.

According to another embodiment, where the transaction request is made via a natural language, voice request, a formatted transaction request can be generated in a number of ways. According to one embodiment, speech recognition technology is used to translate the user's request into text and parse out the response information. The text is then used to complete an embedded transaction request as described above. According to another embodiment, speech recognition software is used to translate the request to text. The text is then converted to a formatted request based on a set of known preferences.

A connection is established with the transaction processing system. This can be accomplished during, or after the IVB. According to one embodiment, the transaction processing system comprises a remotely located telephone-based transaction site. For example, in the system shown in FIGS. 1–3, call server 18, through the TML parsing engine 1812, establishes a connection with a telephone-based transaction processing site.

According to another embodiment, the transaction processing system comprises a remotely based web-site. According to this embodiment, the formatted request includes a URL to locate the web-site and the system accesses the site through a web connection using the formatted request. Alternatively, the formatted request includes an e-mail address and the system uses any known email program to generate an e-mail request for the transaction.

After the connection is established, the transaction is processed by the transaction processing site and the user is notified of the status of the transaction. If the transaction is completed in real-time, the user may be immediately notified. If the transaction is executed after the IVB, the user may be called again by the system, sent an e-mail, or otherwise notified when the transaction has been completed.

According to one particular embodiment, the system comprises the interactive voice broadcasting system shown and described in FIGS. 1–3 and the transaction is accomplished in real-time. In this embodiment, confirmation of the transaction is returned to TML parsing engine 1812 shown in FIG. 3 and translated to speech in text-to-speech engine 1814 and presented to the user during the IVB. More specifically, and similar to the process described with respect to embedded formatted transaction requests, TML also enables embedding of a response statement. Thus, when the transaction is processed and confirmation of the transaction is returned to the system, an embedded confirmation statement is conveyed to the user through TML parsing engine 1812 after being converted to speech in text-to-speech engine 1814.

Figure 4:
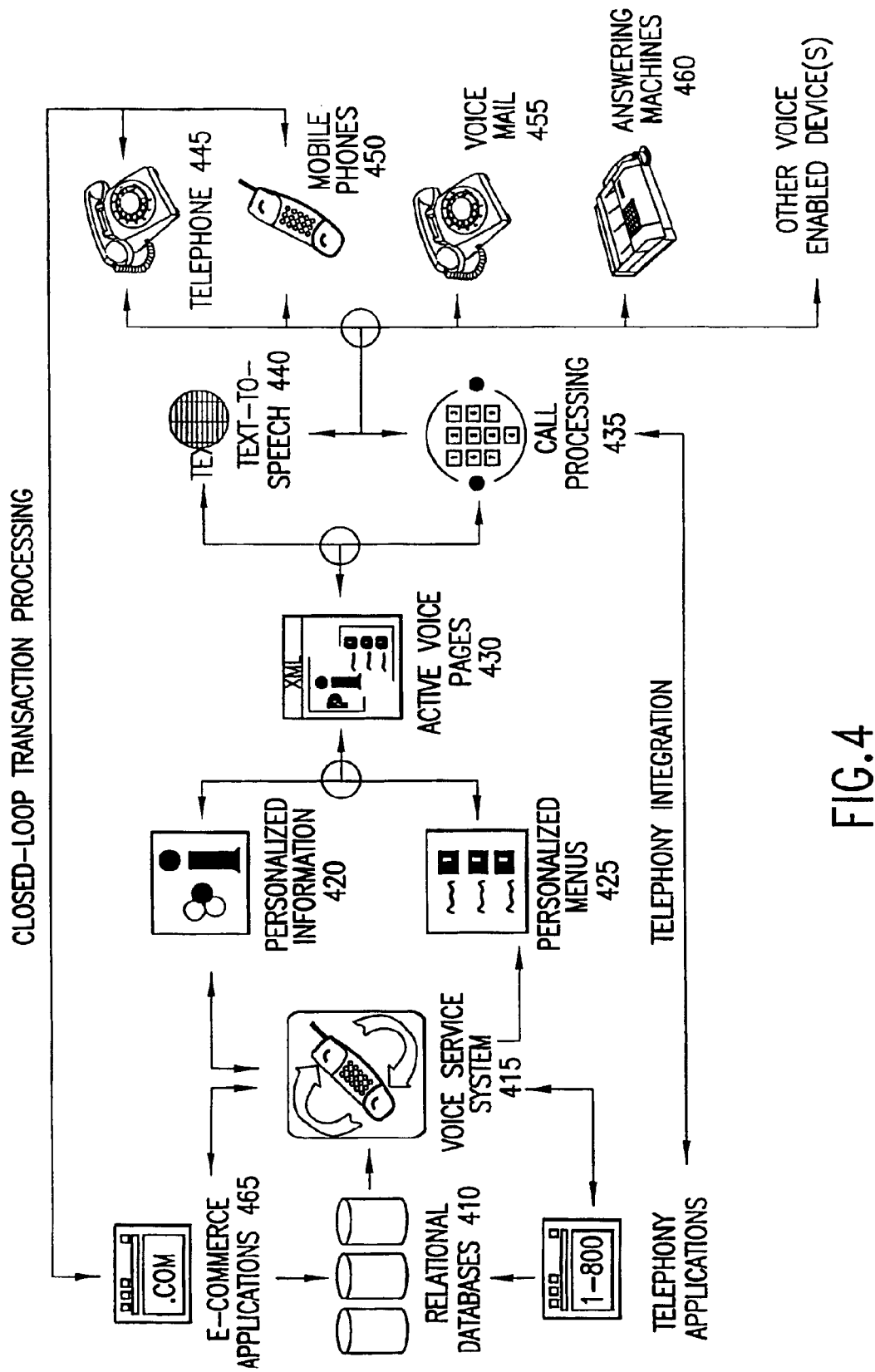
FIG. 4 is a schematic block diagram of a commercial transaction processing system according to an embodiment of the present invention.

FIG. 4 schematically depicts one example of how the system and method of the present invention would fit into such a commercial transaction processing system. Working from left to right in FIG. 4, the system begins and ends with information stored in relational databases. One of the primary purposes of information is in making decisions. Thus, the information in the databases is most useful if provided to someone who desires it in a timely fashion.

A voice service system is provided to enable access to the information in the databases. The voice service system utilizes personalization information and personalized menus to construct AVPs pages that enable the information to be delivered to a user verbally. Moreover, the AVPs pages, not only enable information to be presented to the user. But, they also enable the user to provide information back to the voice service system for additional processing.

According to the embodiment shown in FIG. 4, once the AVPs are constructed by voice service system, they are processed and the content is delivered to a user verbally in an IVB. Thus, call processing and text-to-speech technology are used to establish a telephone connection with a user and convert the active voice pages to speech for presentation to the user. As shown in FIG. 4, the IVB may be delivered to a user in many devices, including a telephone, a mobile phone, voice mail, an answering machine or any other voice-enabled device.

During the IVB, depending on the content that is being delivered, control may be passed to an e-commerce application for the user to complete a transaction based on the information presented. For example, if the user has requested information about sales on a particular brand of merchandise, the user may be connected with a particular retailer in order to complete a transaction to buy a particular good or service. Information about this transaction is then added to the databases and thus may be advantageously accessed by other users.

It may not be economical for some potential users of a voice broadcasting system to buy and/or maintain their own telephony hardware and software as embodied in call server 18. In such a case, a voice service bureau may be maintained at a remote location to service users voice service requests. A voice service bureau and a method of using a voice service bureau according to various embodiments of the present invention is described in conjunction with FIGS. 5–6.

In one embodiment, a voice service bureau may comprise one or more call servers and call databases that are centrally located and enable other voice service systems to generate a call request and pass the call request to the VSB to execute a call. In this way the other voice service systems do not need to invest in acquiring and maintaining call data bases, call servers, additional telephone lines and other equipment or software. Moreover, the VSB facilitates weeding out usage of illegal numbers and spamming by number checking implemented through its web server.

Figure 5:
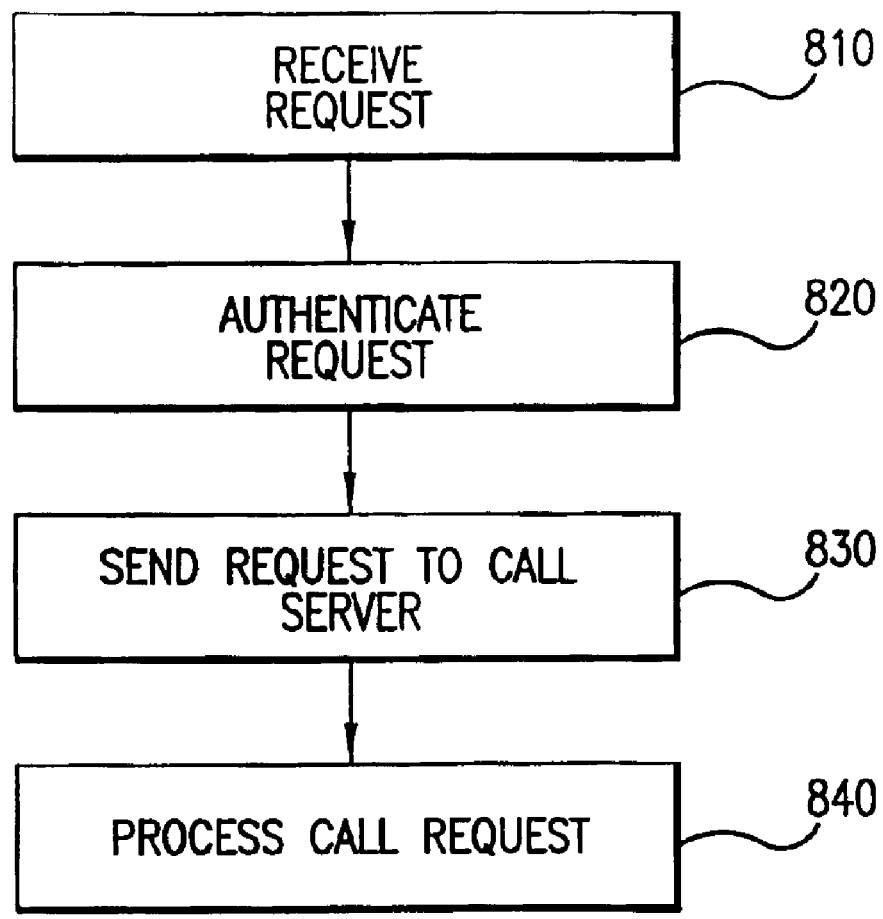
FIG. 5 is a flow chart of a method of using a voice service bureau according to an embodiment of the present invention.

A voice service bureau and a method of using a voice service bureau according to one embodiment are described in conjunction with FIGS. 5–6. FIG. 5 depicts a method of utilizing a voice service bureau according to one embodiment of the present invention. The method begins in step 810 with a request to place one or more telephone calls received through a computer network.

According to one embodiment, the voice service bureau is maintained at a location distant from the voice service system. Therefore, in order for a voice service to be processed by the voice service bureau, in step 810 the voice service is sent to the voice services bureau, preferably over some secure line of communication. According to one embodiment, the request is sent to the voice service bureau through the Internet using secure HTTPS. HTTPS provides a secure exchange of data between clients and the voice service bureau using asymmetric encryption keys based on secure server certificates. In another embodiment, SSL HTTP protocol is used to send a call request to the voice service bureau. Both of these protocols help ensure that a secure channel of communication is maintained between the voice service system and the voice service bureau. Other security techniques may be used.

When a request for a call or IVB is received, by the VSB, the request is authenticated by the voice service bureau in step 820. According to one embodiment, the authenticity of the request is determined in at least two ways. First, it is determined whether or not the request was submitted from a server having a valid, active server certificate. More specifically, requests may be typically received via a stream of HTTPS data. Each such request originating from a server with a valid server certificate will include an embedded code (i.e., server certificate) that indicates the request is authentic. In addition to the use of server certificates, each request may also be authenticated using an identification number and password. Therefore, if the request submitted does not include a valid server certificate and does not identify a valid I.D./password combination, the request will not be processed. The step of authenticating also comprises performing any necessary decryption. According to one embodiment, any errors that are encountered in the process of decrypting or authenticating the call request are logged an error system and may be sent back to the administrator of the sending system. Other methods of authenticating the request are possible.

Each properly authenticated request is sent to a call server (step 830) and processed (step 840). According to one embodiment, the voice service bureau comprises s a number of call servers. According to one embodiment, the calls are sent to a call database, and processed as set forth herein in conjunction with the explanation of call server 18.

Figure 6A:
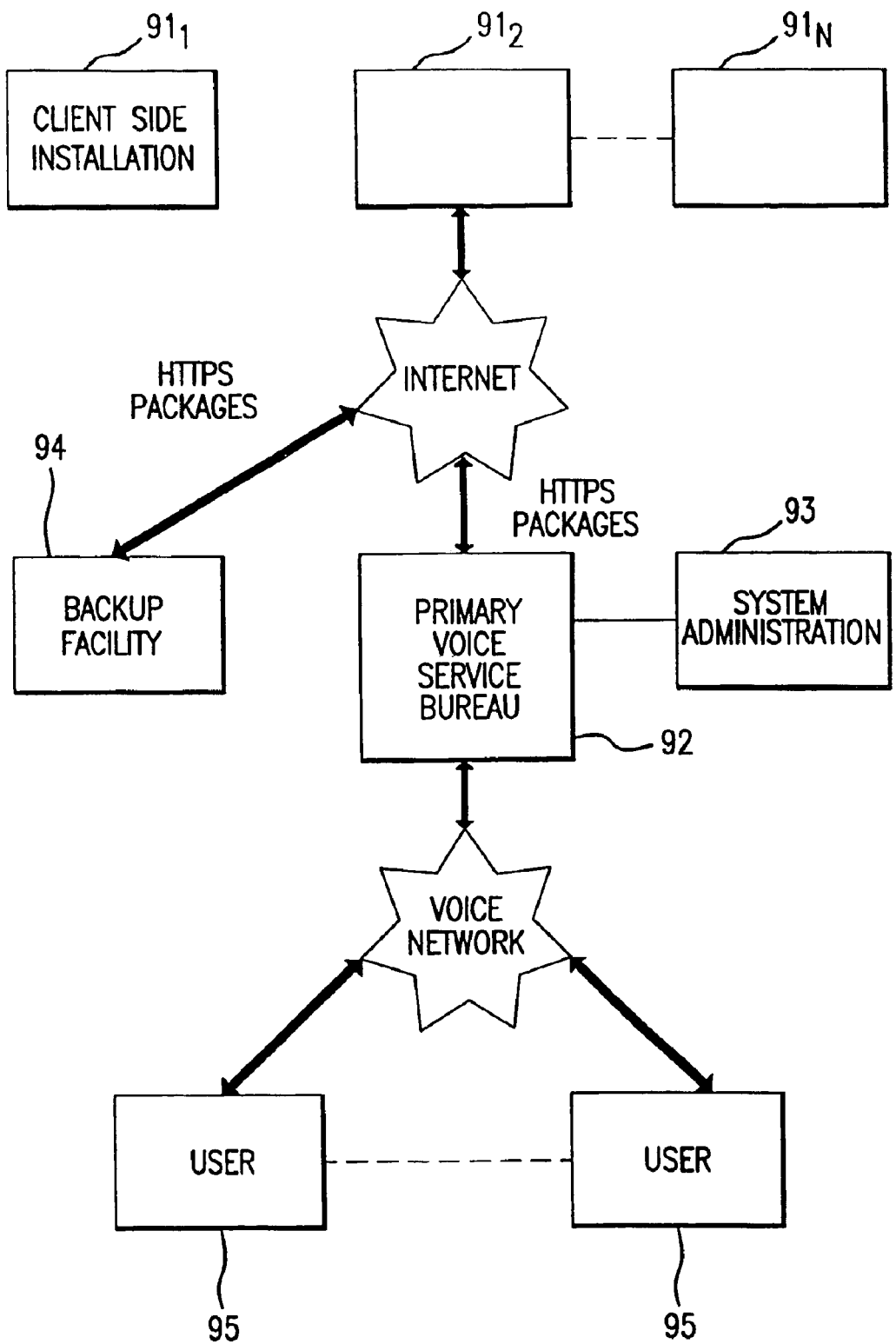
FIG. 6a is a schematic block diagram of a voice service system incorporating a voice service bureau according to one embodiment of the present invention.

One embodiment of a voice service bureau will now be explained in conjunction with FIGS. 6a–6c. FIG. 6a depicts a system comprising a plurality of client side installations 91, a primary voice bureau 92, a system administrator 93, a backup voice service bureau 94, and a plurality of users 95. Client side installations 91 communicate with voice service bureau 92 through a computer network. Voice service bureau 92 communicates with users 95 through a voice network. According to one embodiment, the computer network comprises the internet and client side installations 91 communicate with voice service bureau 92 using HTTPS as described above, and the voice network comprises a public telephone network.

According to one embodiment, client side installations 91 are substantially identical to the system shown in FIG. 4 except for the elimination of call server 18. In the system of FIG. 6a, the functionality of call server 18 is performed by VSB 92. As shown in this embodiment, VSB 92 can service multiple client side installations $91_1$ to 91n. According to another embodiment, client-side installation functionality may be included within VSB 92. According to this embodiment VSB 92 constitutes a fully functional voice service that is accessible through email, telephone or other interfaces.

According to this embodiment, when voice services have been assembled by intelligence server 16, a request to have the voice services transmitted is sent via a secure network connection through the computer network shown to primary voice bureau 92 and backup voice service bureau 94 as described above. According to one embodiment, the request comprises a mark-up language string that contains the voice service structure and content and personal style properties and other information. As described above, voice bureau 92 authenticates the request, queues the voice services and sends IVBs to users 95 through the voice network.

Figure 6B:
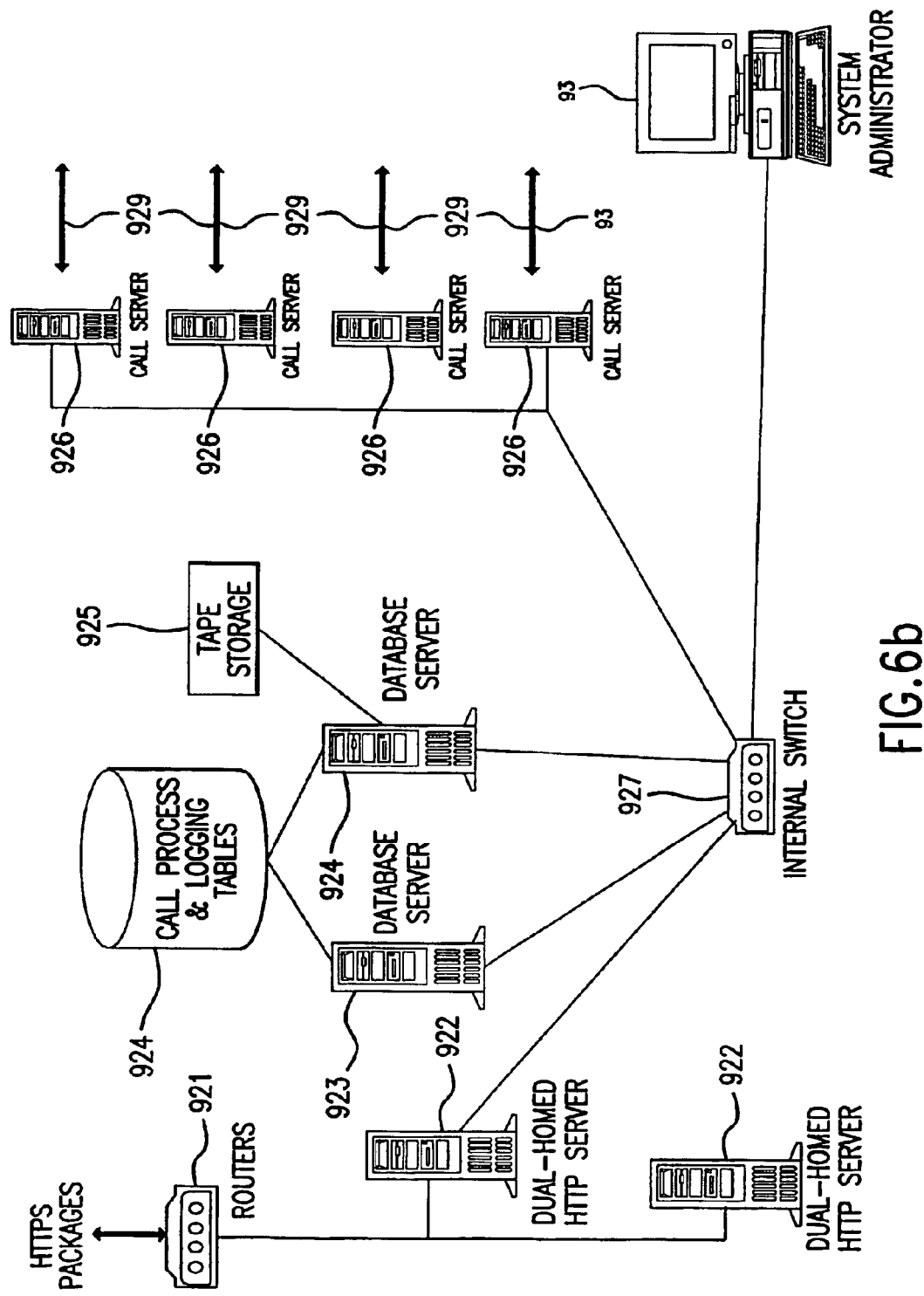
FIG. 6b is block diagram of a primary voice bureau according to one embodiment of the present invention.
Figure 6C:
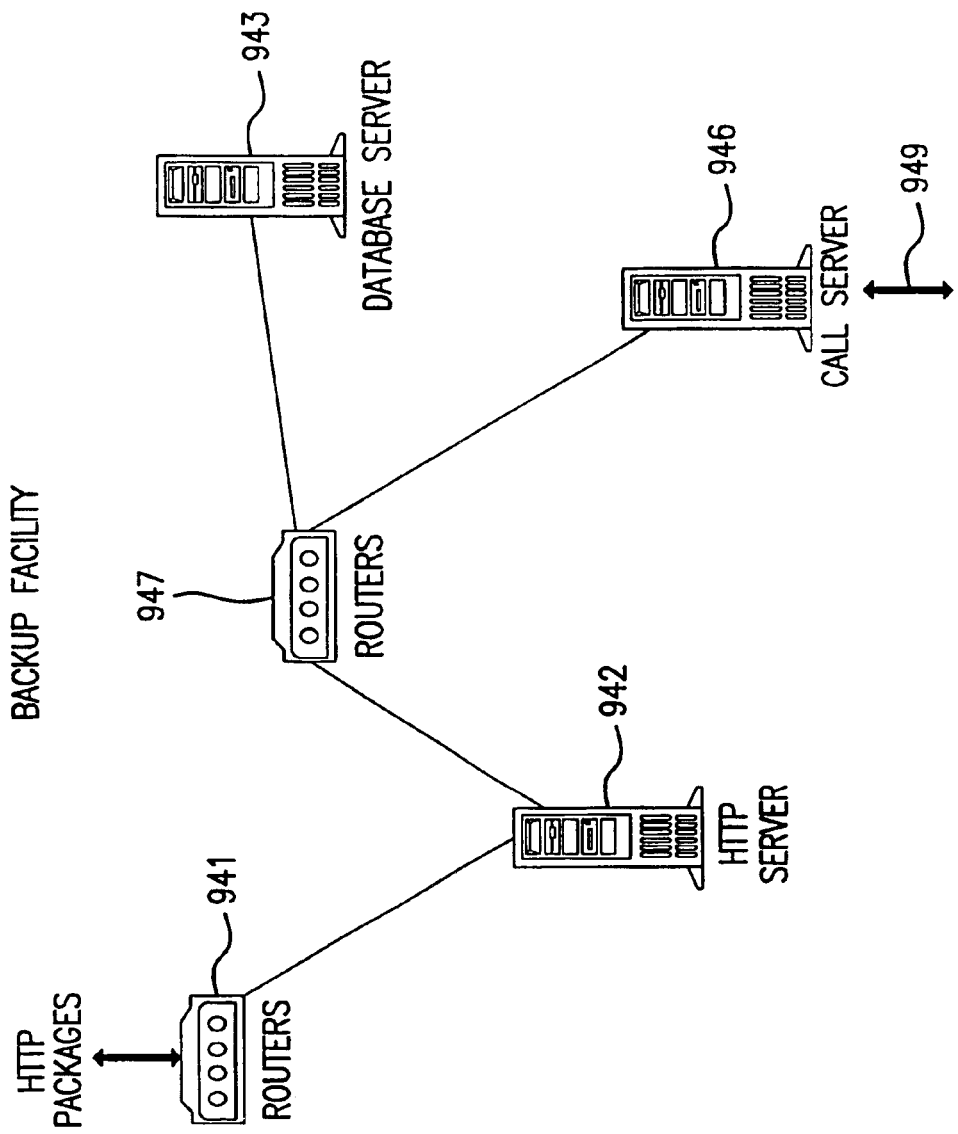
FIG. 6c is a block diagram of a backup voice bureau according to another embodiment of the present invention.

A block diagram of one embodiment of primary voice bureau 92 is shown in FIG. 6b. According to this embodiment, primary voice bureau comprises routers 921, dual-homed servers 922, database servers 923, call database 924, backup storage 925, call servers 926, internal switch 927, and system administrator 93. Routers 921 receive call requests via a computer network and pass them along to one of the two dual-homed servers 922. Router 921 monitors activity on servers 922 and forwards call requests to one of the two depending on availability.

Dual-homed servers 922 comprise servers configured to receive and send HTTPS email. As part of their receiving function, dual-homed servers 922 are configured to perform the authentication processing described above. According to one embodiment, dual-homed servers 922 determine whether the incoming request originated from a server with an active server certificate and also determine if the request contains a valid I.D./password combination. Once dual-homed servers 922 have authenticated the incoming request, they forward the request to be queued in call database 924. As part of their sending function, dual-homed servers 922 are configured to format and send HTTPS email. As discussed above, during an IVB a user may request that further information be accessed from a database or that some transaction be performed. According to one embodiment, these user requests are forwarded back to the originating system via HTTPS email by dual-homed servers 922. Dual-homed servers 922 are load balanced to facilitate optimal performance and handling of incoming call requests.

Database servers 923, call database 924, and backup storage 925 together comprise a call request queuing system. Primary voice bureau 92 is configured to handle a large number of call requests. It may not be possible to process call requests as they arrive. Therefore, call requests are queued in call database 924. According to one embodiment, call database 924 comprises a relational database that maintains a queue of all call requests that need to be processed as well as logs of calls that have been processed. According to another embodiment, primary VSB 92 may include a failover measure that enables another system server to become the call database if call database 924 should fail.

Database servers 923 are configured to control access to call database 924. According to one embodiment, database servers may be optimized to generate SQL statements to access entries in call database at high speed. Database servers 923 also control storage of call requests and call logs in call database 924.

Call servers 926 each are configured to format and send IVBs. According to one embodiment, each of call servers 926 is substantially identical to call server 18 shown in FIG. 3c. More specifically, each of call servers 926 receives requests for IVBs, parses the call content from the mark-language, establishes a connection with the user through phone lines 929, and receives user responses. According to one embodiment, call servers 926 comprise a clustered architecture that facilitates message recovery -in the event of server failure.

Primary voice bureau 92 is controlled by system administrator 93 and internal switch 927. System administrator controls switch 927 and thus controls the flow of call requests to call database 924 from dual homed servers 922 and to call servers 926 from call database 924.

System administrator 93 is also configured to perform a number of other services for primary voice bureau 92. According to one embodiment, system administrator 93 also comprises a billing module, a statistics module, a service module and a security module. The billing modules tabulates the number of voice service requests that come from a particular user and considers the billing plan that the customer uses so that the user may be appropriately billed for the use of voice bureau 92. The statistics module determines and maintains statistics about the number of call requests that are processed by voice bureau 92 and statistics regarding call completion such as, e.g., success, failed due to busy signal and failed due to invalid number. These statistics may be used, for example, to evaluate hardware requirements and modify pricing schemes. The security module monitors activity on voice bureau 92 to determine whether or not any unauthorized user has accessed or attempted to access the system. The service module provides an interface through which primary voice bureau 92 may be monitored, for example, to determine the status of call requests. Other service modules are possible. Moreover, although these services are described as distinct modules, their functionality could be combined and provided in a single module.

Backup voice service bureau 94 receives a redundant request for voice services. Backup voice service bureau 94 processes the requests only when primary voice service bureau is offline or busy. One embodiment of backup voice service bureau 94 is shown in FIG. 6c. Backup voice bureau 94 comprises routers 941, HTTP server 942, database server 943, call server 946 and routers 947. Each of these components performs a function identical to the corresponding element in primary voice bureau 92. Router 947 replaces switch 927. Communication lines 949 may replace phone lines 929. Router 947 controls the forwarding of call requests to database server 943 for queuing in an internal database, and the forwarding of call requests to call server 946 from database server 943.

The systems and methods discussed above are directed to outbound broadcasting of voice services. Nevertheless, in certain situations, for example when the out bound IVB is missed, it is desirable to for a voice service system to enable inbound calling. According to another embodiment, a method and system for providing integrated inbound and outbound voice services is disclosed.

Figure 7:
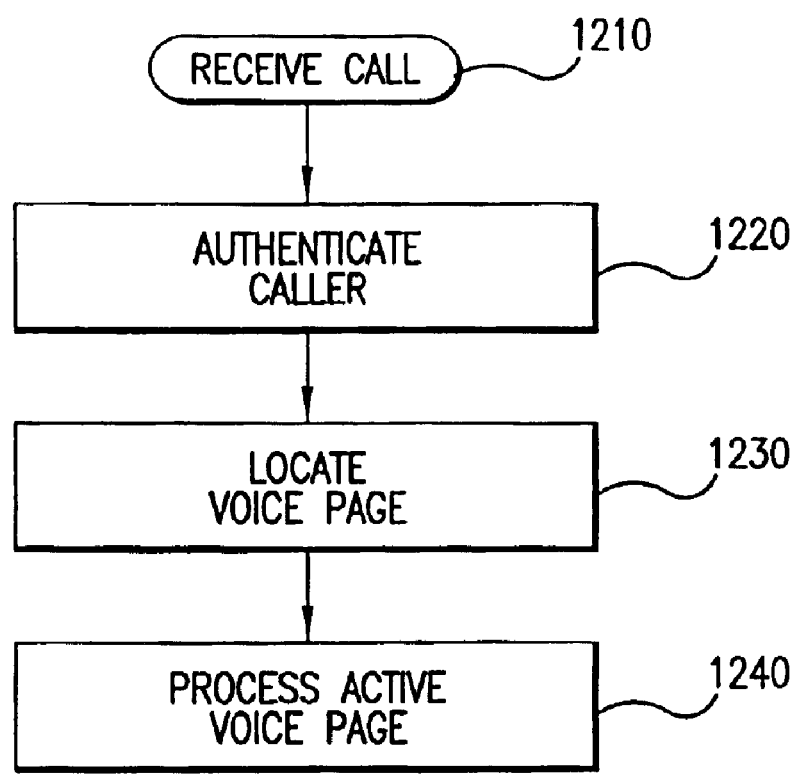
FIG. 7 is a flow chart illustrating a method for integrating inbound and outbound voice services.

A method for providing inbound access to voice services according to one embodiment of the present invention is shown in FIG. 7. According to FIG. 7, the method begins with receipt of a call requesting voice services in step 1210. To help ensure system integrity and to prevent unauthorized access, a call request is authenticated in step 1220. According to one embodiment, each incoming caller is automatically prompted to enter a login identifier and a PIN. According to another embodiment, an automatic number identification system is used, in addition to a login identifier and PIN system, to determine whether or not the user is calling from an authorized device. According to another embodiment, speaker recognition technology is utilized to identify a caller. According to this embodiment, voice prints for each user of the voice service system are stored as identifiers. When an inbound call is connected, pattern matching techniques are used verify the user's speech against the previously stored voice prints. Other security measures are possible.

In step 1230, a voice page is located. As explained above, an IVB of a voice service is driven by an active voice page. Accordingly, a user calling in to access voice services locates the desired active voice page. According to one embodiment, the user is automatically placed into an active voice page of a voice service that the user missed. That is, the system chooses an active voice page that it was unable to deliver. According to this embodiment, when a call is undeliverable (e.g., when an answering machine picks up), the active voice page for that call is placed in memory in a "voice site" table or as an active voice page on a web site and addressed using the user's identification. When the user calls in to retrieve the voice service, after the user logs in, the table or web site will be searched for an active voice page that corresponds to their identification. If such a page exists, it is executed by the call server.

Other possibilities exist for accessing active voice pages through inbound calling. According to another embodiment, the system maintains a log of all voice services sent and provides an inbound user an option to select one of their previous voice services. According to another embodiment, an inbound caller is automatically placed into an active voice page that presents the user with an option to select one of that user's most frequently used services. According to still another embodiment, the user is allowed to search for past active voice pages by date or content. For example, the user may be prompted to enter a date on or near which the desired voice page was executed. According to another embodiment, the user may use the telephone keys to enter a search term and search the content of any previously executed active voice page that they are authorized to access or that is not secure.

Once an active voice page is located, the user navigates through the active voice page in step 1240. As described above, a user navigates through an active voice by exercising options, responding to prompts and otherwise entering input to the system. An inbound calling system would thus have access to the full functionality of the voice service system described in conjunction with FIGS. 1–6.

Figure 8:
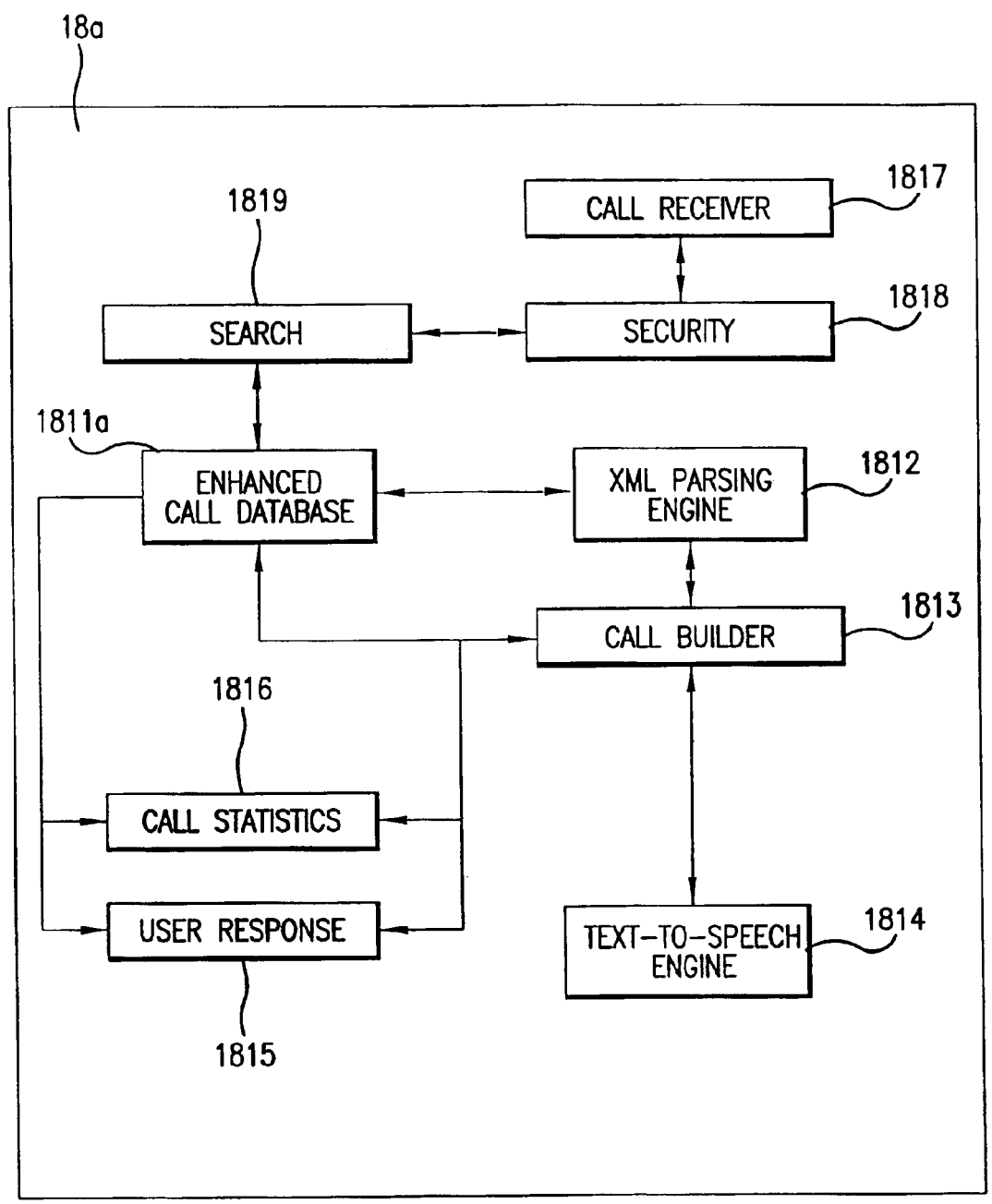
FIG. 8 is a block diagram of a call server configured to provide integrated inbound and outbound voice services.

FIG. 8 depicts a block diagram of a call server 18a that enables integrated inbound and outbound calling. In addition to the modules depicted in call server 18 of FIG. 3, call server 18a comprises call receiver module 1817, security module 1818 and search module 1819. Moreover, in the system for permitting inbound and outbound calling, call database 1811 has been replaced with an enhanced call database 1811*a*.

In order to receive inbound calls, call server 18*a* comprises call receiver module 1817. Although, call server 18 discussed above contains hardware permitting reception of calls as well as transmission of calls, it is not set up to receive calls. Call receiver module 1817 enables call server 18*a* to receive calls and routes the incoming calls to security module 1818. According to one embodiment, call receiver module comprises a software component designed to configure call server 18*a* to receive calls. Other embodiments are possible.

Received calls are forwarded to security module 1818 for authentication. According to one embodiment discussed above, incoming calls are authenticated using login I.D.'s and passwords. According to another embodiment, automatic number identification software is used to identify and authenticate callers. According to another embodiment, speech recognition and pattern matching techniques are used to identify a caller.

Authenticated calls may search for an active voice page using search module 1819. According to one embodiment, search module 1819 comprises a search engine designed specifically to search active voice pages. According to one embodiment discussed above, active voice pages utilize an XML-based language and search module 1819 comprises an XML-based search engine. According to another embodiment, search module 1819 comprises a SQL engine designed to make queries against a relational or other type of database.

The active voice pages that are being search are stored in enhanced call database 1811*a* In addition to its facilities to queue and log calls, enhanced call database 1811 includes facilities to catalog active voice pages. According to one embodiment, enhanced call database comprises a relational or other type of database. According to this embodiment, enhanced call database is used to store and categorize active voice pages and corresponding parameters, such as expiration dates for active voice pages. Other storage facilities are possible.

Various features and functions of the present invention extend the capabilities of previously known information delivery systems. One such system is MicroStrategy's Broadcaster version 5.6. The features and functions of the present invention are usable in conjunction with Broadcaster and other information delivery systems or alone. Other products may be used with the various features and functions of the invention including, but not limited to, MicroStrategy's known product suite.

Other embodiments, uses and advantages of the present invention will be apparent to those skilled in the art from consideration of the specification and practice of the invention disclosed herein The specification and examples should be considered exemplary only. The intended scope of the invention is only limited by the claims appended hereto.

What is claimed is:

1. A system for generating an active voice page that provides at least one interactive and real-time voice service to at least one user, the active voice page comprising at least one markup language document, the system comprising:
    a subscription interface that enables at least one user to subscribe to at least one voice service that is executed upon satisfaction of a predetermined condition to output personalized information to the at least one user, wherein the at least one user specifies preferences for the content and presentation of information to be output by the at least one voice service;
    an input module that receives data reports and a structure for the at least one voice service when the at least one voice service is executed;
    a markup language converting module that converts the data reports and the structure into a markup language;
    a blending module for blending the converted data reports and the converted structure into the active voice page;
    a module for generating a call request that receives the active voice page and one or more style properties that are unique to the at least one user and generates a call request for
    a call server for placing an outbound telephone call to a voice-enabled terminal device of the at least one user to initiate an interactive voice broadcast with the at least one user, wherein information personalized for the at least one user is presented to the at least one user from the active voice page during the interactive voice broadcast, and wherein the active voice page further comprises one or more user inputs that enable the at least one user to respond to the personalized information during the interactive voice broadcast.

2. The system of claim 1, wherein the markup language is extensible markup language.

3. The system of claim 1, wherein the markup language is TML.

4. The system of claim 1, wherein the data reports comprise online analytical processing (OLAP) system reports.

5. The system of claim 1, wherein the markup language converting module comprises a markup language generator that receives the structure and generates the at least one markup language document from the structure.

6. The system of claim 1, wherein the markup language converting module comprises a markup language transforming module that receives the data reports from the input module and transforms the data reports into the at least one markup language document.

7. The system of claim 6, wherein the markup language transforming module receives stylesheets from the input module and transforms the data reports into the at least one markup language document using the stylesheets.

8. The system of claim 1, wherein the predetermined condition comprises either a scheduled event or a triggering event, and is specified by the at least one user while subscribing to the at least one voice service.

9. A method for generating an active voice page that provides at least one interactive and real-time voice service to at least one user, the active voice page comprising at least one markup language document, the method comprising:
    enabling at least one user to subscribe to at least one voice service that is executed upon satisfaction of a predetermined condition to output personalized information to the at least one user, wherein the at least one user specifies preferences for the content and presentation of information to be output by the at least one voice service;
    receiving data reports and a structure for the at least one voice service when the at least one voice service is executed;
    converting the data reports and the structure into a markup language;
    blending the converted data reports and the converted structure into the active voice page;
    generating a call request for the at least one user from the active voice page and one or more style properties that are unique to that at least one user;

placing an outbound telephone call to a voice-enabled terminal device of the at least one user to initiate an interactive voice broadcast with the at least one user, wherein information personalized for the at least one user is presented to the at least one user from the active voice page during the interactive voice broadcast, and wherein the active voice page further comprises one or more user inputs that enable the at least one user to respond to the personalized information during the interactive voice broadcast.

10. The method of claim 9, wherein the markup language is extensible markup language.

11. The method of claim 9, wherein the markup language is TML.

12. The method of claim 9, wherein the data reports comprise online analytical processing (OLAP) system reports.

13. The method of claim 9, wherein converting comprises receiving the structure and generating the at least one markup language document from the structure.

14. The method of claim 9, wherein converting comprises receiving data reports and transforming the data reports into the at least one markup language document.

15. The method of claim 14, further comprising receiving stylesheets and transforming the data reports into the at least one markup language document using the stylesheets.

16. The method of claim 9, wherein the predetermined condition comprises either a scheduled event or a triggering event, and is specified by the at least one user while subscribing to the at least one voice service.

* * * * *

UNITED STATES PATENT AND TRADEMARK OFFICE
CERTIFICATE OF CORRECTION

PATENT NO. : 6,940,953 B1  Page 1 of 1
DATED : September 6, 2005
INVENTOR(S) : Hannes Eberle et al.

It is certified that error appears in the above-identified patent and that said Letters Patent is hereby corrected as shown below:

<u>Column 46,</u>
Line 11, change "request for" to -- request for the at least one user; and --.

Signed and Sealed this

Twenty-second Day of November, 2005

JON W. DUDAS
*Director of the United States Patent and Trademark Office*